United States Patent
Grocutt

(10) Patent No.: US 12,248,562 B2
(45) Date of Patent: Mar. 11, 2025

(54) DOMAIN TRANSITION DISABLE CONFIGURATION PARAMETER

(71) Applicant: Arm Limited, Cambridge (GB)

(72) Inventor: Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 278 days.

(21) Appl. No.: 17/756,949

(22) PCT Filed: Nov. 11, 2020

(86) PCT No.: PCT/GB2020/052855
§ 371 (c)(1),
(2) Date: Jun. 6, 2022

(87) PCT Pub. No.: WO2021/116654
PCT Pub. Date: Jun. 17, 2021

(65) Prior Publication Data
US 2022/0366037 A1    Nov. 17, 2022

(30) Foreign Application Priority Data

Dec. 11, 2019 (GB) ...................... 1918216

(51) Int. Cl.
*G06F 21/54* (2013.01)
*G06F 9/30* (2018.01)
(Continued)

(52) U.S. Cl.
CPC .......... *G06F 21/54* (2013.01); *G06F 9/30054* (2013.01); *G06F 9/30145* (2013.01);
(Continued)

(58) Field of Classification Search
CPC .... G06F 21/54; G06F 21/554; G06F 9/30145; G06F 9/30189; G06F 9/3861;
(Continued)

(56) References Cited

U.S. PATENT DOCUMENTS

2005/0160210 A1   7/2005  Watt et al.
2008/0250217 A1*  10/2008  Kershaw ............. G06F 12/1483
                                          711/E12.001
(Continued)

FOREIGN PATENT DOCUMENTS

TW      200411555       7/2004
WO    2013/117899 A1    8/2013
(Continued)

OTHER PUBLICATIONS

"ARM Cortex—A Series Programmer's Guide for ARMv8-A", [retrieved on Jun. 7, 2024], Retrieved from the Internet: <URL: https://developer.arm.com/documentation/den0024/a/> (Year: 2015).*
(Continued)

*Primary Examiner* — Sangseok Park
(74) *Attorney, Agent, or Firm* — NIXON & VANDERHYE P.C.

(57) ABSTRACT

A processing circuitry having a secure domain and a less secure domain. A control storage location stores a domain transition disable configuration parameter specifying whether domain transitions between the secure domain and the less secure domain are enabled or disabled in at least one mode of the process-ing circuitry. In the at least one mode of the processing circuitry, when the domain transition disable configuration parameter specifies that said domain transitions are disabled in said at least one mode, a disabled domain transition fault is signalled in response to an attempt to transition between domains in either direction. This can help support lazy configuration of resources for the secure domain or less secure domain for a thread expected only to need the other domain.

24 Claims, 18 Drawing Sheets

(51) Int. Cl.
*G06F 9/32* (2018.01)
*G06F 9/38* (2018.01)
*G06F 21/55* (2013.01)

(52) U.S. Cl.
CPC .......... *G06F 9/30189* (2013.01); *G06F 9/323* (2023.08); *G06F 9/38* (2013.01); *G06F 9/3854* (2023.08); *G06F 9/3861* (2013.01); *G06F 21/554* (2013.01)

(58) Field of Classification Search
CPC ............. G06F 9/30076; G06F 9/30116; G06F 9/30054; G06F 9/30; G06F 9/38; G06F 12/1441
See application file for complete search history.

(56) References Cited

U.S. PATENT DOCUMENTS

| | | | |
|---|---|---|---|
| 2013/0205125 A1* | 8/2013 | Grocutt | G06F 9/4812 712/244 |
| 2014/0075581 A1 | 3/2014 | Grocutt et al. | |
| 2014/0373171 A1* | 12/2014 | Grocutt | G06F 21/74 726/27 |
| 2015/0007318 A1 | 1/2015 | Van De Van et al. | |
| 2015/0331812 A1* | 11/2015 | Horman | G06F 11/073 711/163 |
| 2019/0042482 A1* | 2/2019 | Katragada | G06F 12/1491 |
| 2020/0074093 A1* | 3/2020 | Wallach | G06F 21/6209 |

FOREIGN PATENT DOCUMENTS

| | | |
|---|---|---|
| WO | 2014/053802 A1 | 4/2014 |
| WO | 2014/053803 A1 | 4/2014 |
| WO | 2014/053804 A1 | 4/2014 |
| WO | 2014/053806 A1 | 4/2014 |

OTHER PUBLICATIONS

Ngabonziza, Bernard, et al. "Trustzone explained: Architectural features and use cases." 2016 IEEE 2nd International Conference on Collaboration and Internet Computing (CIC). IEEE, 2016 (Year: 2016).*

Ngabonzi Za Bernard, et al., "TrustZone Explained: Architectural Features and Use Cases", 2016 IEEE 2ND International Conference on Collaboration and Internet Computing (CIC). IEEE, Nov. 2, 2016 (Nov. 2, 2016), pp. 445-451, XP033039413,DOI: 10.1109/CIC.2016.065; abstract; figures 1,2p. 445, right-hand column-p. 451, left-hand column.

Robert Bedichek, "Some Efficient Architecture Simulation Techniques", Department of Computer Science, FR-35 University of Washington, Seattle, Washington 98195; 1990.

Office Action for EP Application No. 20803637.6 dated Aug. 16, 2024, 4 pages.

Office Action for KR Application No. 10-2022-7023738 issued Oct. 29, 2024 and English translation, 9 pages.

Office Action for TW Application No. 109143577 issued Nov. 14, 2024 and English translation, 28 pages.

* cited by examiner

DOMAIN TRANSITION DISABLE CONFIGURATION PARAMETER

The present technique relates to the field of data processing.

Processing circuitry may have a number of security domains including a secure domain and a less secure domain. Memory access circuitry may control whether memory accesses are allowed based on the current domain of operation. Data or program code stored in secure regions of memory may not be allowed to be accessed by code operating in the less secure domain. This can help isolate secure applications from inappropriate access by less secure applications.

At least some examples provide an apparatus comprising: processing circuitry to perform data processing in one of a plurality of security domains including at least a secure domain and a less secure domain; memory access checking circuitry to check whether a memory access is allowed depending on a current security domain of the processing circuitry; and a control storage location to store a domain transition disable configuration parameter specifying whether domain transitions between the secure domain and the less secure domain are enabled or disabled in at least one mode of the processing circuitry; in which: in said at least one mode of the processing circuitry, when the domain transition disable configuration parameter specifies that said domain transitions are disabled in said at least one mode, the processing circuitry is configured to: trigger signalling of a disabled domain transition fault in response to an attempt to transition from the secure domain to the less secure domain; and trigger signalling of the disabled domain transition fault in response to an attempt to transition from the less secure domain to the secure domain.

At least some examples provide a data processing method, comprising: performing data processing using an apparatus comprising processing circuitry to perform data processing in one of a plurality of security domains including at least a secure domain and a less secure domain, and memory access checking circuitry to check whether a memory access is allowed depending on a current security domain of the processing circuitry; storing, in a control storage location, a domain transition disable configuration parameter specifying whether domain transitions between the secure domain and the less secure domain are enabled or disabled in at least one mode of the processing circuitry; and in said at least one mode of the processing circuitry, in response to an attempt a domain transition between the secure domain and the less secure domain, when the domain transition disable configuration parameter specifies that said domain transitions are disabled in said at least one mode, triggering signalling of a disabled domain transition fault regardless of whether the domain transition attempted is from the secure domain to the less secure domain or from the less secure domain to the secure domain.

At least some examples provide a computer program for controlling a host data processing apparatus to provide an instruction execution environment for execution of instructions; the computer program comprising: processing program logic to perform data processing in one of a plurality of security domains including at least a secure domain and a less secure domain; memory access checking program logic to check whether a memory access is allowed depending on a current security domain of the processing program logic; and configuration parameter setting program logic to set, in a control storage location, a domain transition disable configuration parameter specifying whether domain transitions between the secure domain and the less secure domain are enabled or disabled in at least one mode of the processing program logic; in which: in said at least one mode of the processing program logic, when the domain transition disable configuration parameter specifies that said domain transitions are disabled in the at least one mode, the processing program logic is configured to: trigger signalling of a disabled domain transition fault in response to an attempt to transition from the secure domain to the less secure domain; and trigger signalling of the disabled domain transition fault in response to an attempt to transition from the less secure domain to the secure domain.

A computer-readable storage medium may store the computer program described above. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing system having processing circuitry supporting different modes of operation;

INTERMODAL CALLING BRANCH INSTRUCTION

Figure 1:
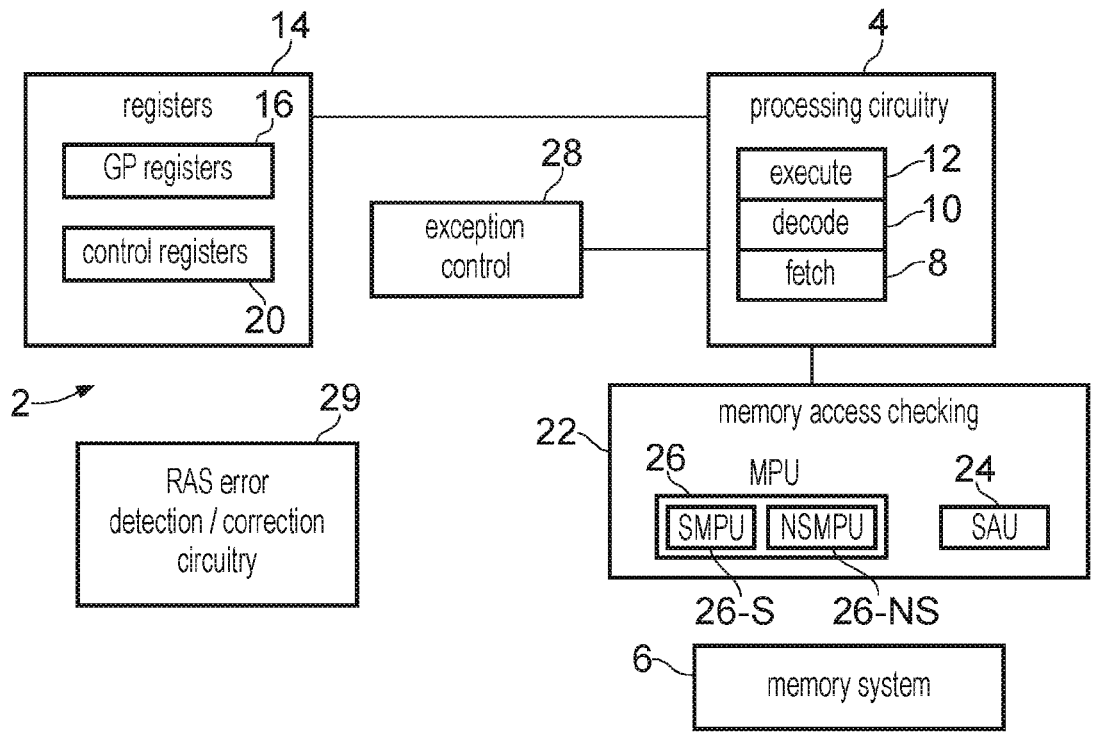

In a system in which the processing circuitry supports a handler mode and a thread mode, one generally expects the handler mode to be used for processing of exception handlers (e.g. associated with an operating system or other supervisory software) and the thread mode to be used for processing background code of threads managed by the operating system or supervisory software. However, sometimes there may be types of exceptions which are to be directed to a device which may not be trusted, such as a USB controller or a wireless network interface. Interrupts directed to such devices may be handled by exception handler code which is provided by a third party, different to the party providing the operating system which manages general operation of the processing system. The operating system provider may not trust the code provided by the other party and so may wish that the untrusted exception handler code for controlling such untrusted devices should not have the full privileges associated with the handler mode. Therefore there may be a desire to be able to "deprivilege" an exception so that the exception handler may not have the ability to access all registers or memory that code in the handler mode would normally be able to access. Also, in cases where all the software running on a device comes from the same vendor, there may be a desire to reduce the complexity of privileged software, and therefore the likelihood that a security vulnerability exists in privileged software. As such there may still be a desire to "deprivilege" exceptions even in cases where all the software comes from a single vendor, as part of a defence in depth strategy.

However, in a typical system having a handler mode and a thread mode, the mechanism to switch between the modes may be to use exceptions to switch from the thread mode to the handler mode and exception returns to switch back to the thread mode. It may not be appropriate to simply trigger an exception return back to the thread mode, as this would typically reduce the level of priority associated with the original exception leading to difficulties in appropriately prioritising different interrupts or exceptions. Hence, often a "fake" second exception may need to be generated, merely to set up exception return control information which on returning from the second exception causes the original exception being processed in the thread mode instead of the handler mode. This mechanism can be slow because calling the second exception may incur not only the performance cost of the operations for setting up the fake exception return operation, but also the cost of additional state saving and restoration operations, which are typically performed on exception entry and return to preserve the architectural state associated with the process executing before the exception. Hence, if an exception entry and return mechanism is used to deprivilege an exception handler, this may increase the overall interrupt/exception handling latency, which may be unacceptable in some systems, especially in systems intended for real time applications. Also, this approach can be difficult to code for a compiler, leading to possible errors.

In the examples described below, an intermodal calling branch instruction is provided which specifies a branch target address. In response to the intermodal calling branch instruction, at least when the processing circuitry is in the handler mode, an instruction decoder controls the processing circuitry to save a function return address to a function return address storage location, switch a current mode of the processing circuitry to a thread mode, and branch to an instruction identified by the branch target address specified by the branch instruction. Hence, a function calling mechanism is provided where an instruction can branch directly to a branch target address of an instruction which will then be processed in the thread mode instead of the handler mode. This provides a much faster and simpler mechanism for deprivileging exceptions, eliminating the need for a fake second exception as described above.

In addition to the handler mode and thread mode, the processing circuitry may also support data processing in one of the number of security domains including at least a secure domain and a less secure domain. Memory access checking circuitry may be provided to check whether a memory access is allowed depending on a current security domain of the processing circuitry. For example, the memory access checking circuitry may maintain tables providing security attributes which define respective address regions as either secure regions associated with the secure domain or less secure regions associated with the less secure domain. When operating in the secure domain, the processing circuitry may have access to both secure regions and less secure regions of memory, while in the less secure domain the processing circuitry may have access to the less secure regions but may not be permitted to access the secure regions.

The instruction decoder and processing circuitry may support an inter-domain calling branch instruction which specifies a branch target address. In response to the inter-domain calling branch instruction, the instruction decoder may control the processing circuitry to save a function return address to the function return address storage location, branch to an instruction identified by the branch targeted address and switch a current security domain of the processing circuitry. Hence, changes of security domain can also be made faster by permitting direct branching from one domain into another domain. In some systems, inter-domain calling branch instructions may be supported in both directions, both from secure domain to less secure domain and from less secure domain to secure domain. However, in other implementations it may not be necessary to provide inter-domain calling branch instructions for both directions of switching domains. For example, in some implementations the inter-domain calling branch instruction may be a secure-to-less secure calling branch instruction which triggers a switch from the secure domain to the less secure domain, and other mechanisms may be provided to transition from the less secure domain to the secure domain (e.g. instead a secure gateway instruction may cause the domain to be switched from the less secure domain to the secure domain, so that the valid locations at which the secure domain may be entered can be limited by requiring that the secure gateway instruction is present at the first address fetched from a secure region of memory after executing instructions from less secure regions of memory). Some implementations may use similar schemes to prevent code running in a less privileged state accessing areas of the memory marked as privileged only.

Hence, a number of calling branch instructions may be supported, which cause the processing circuitry to perform function calling operations of saving a function return address and branching to an instruction at a branched target address. These may include calling branch instructions which remain within the same mode and domain, as well as the intermodal calling branch instruction which triggers a switch to thread mode and the inter-domain calling branch instruction which triggers a change of security domain. However, combined switches of both mode and domain in response to the same calling branch instruction may be prohibited. Hence, in response to the intermodal calling branch instruction, the instruction decoder may control the processing circuitry to switch the current mode to the thread mode, without changing the current security domain of the processing circuitry. This can increase security by reducing the number of valid transitions of security domain which are permitted, making it simpler to verify that a change of security domain is safe.

In response to an intermodal function return instruction, the processing circuitry may switch the current mode of the processing circuitry back to the handler mode and branch to an instruction identified by a function return address previously saved by an intermodal calling branch instruction. Hence, when the deprivileged part of an exception handler is complete, the intermodal function return instruction can be used to trigger a switch back to the handler mode in which the processing circuitry was first executing when the corresponding exception was taken.

In some examples, the intermodal function return instruction could be a dedicated function return instruction having an encoding which is identified by the instruction decoder as requiring a function return operation.

However, this is not essential and in some cases whether an instruction causes an intermodal function return may depend on information stored in registers or memory at the time it is executed. For example, an intermodal function return may be triggered by an attempt to branch to a reserved non-executable address (referred to below as a dummy function return address, e.g. FNC_RETURN address 140 shown in FIG. 5, which will be described in more detail later). As the intermodal function return instruction may be part of the untrusted code within the deprivileged section of the exception handler, it can be useful if the intermodal function return instruction has the same instruction encoding as a non-intermodal function return instruction which would not be intended to trigger a switch back from thread mode to handler mode, as the deprivileged section of the exception handler may be provided by a third party who is unaware of its exception handler being deprivileged.

In some examples, in response to the intermodal calling branch instruction, the instruction decoder may control the processing circuitry to save a dummy function return address to the link register. The dummy function return address could be an address in a reserved range of addresses which is not a valid executable address. The dummy function return address may comprise an intermodal call indicating value to indicate that the dummy function return address was saved in response to the intermodal calling branch instruction. If an instruction attempts to branch to the dummy function return address, when the dummy function return address comprises the intermodal call indicating value, then the processing circuitry may treat that instruction as an intermodal function return instruction, and switch to handler mode as well as branching to the real function return address obtained from the stack. Hence, by storing an intermodal call indicating value within the dummy function return address, this can distinguish intermodal function returns from non-intermodal returns so that the same instruction encoding can be used for both types of function return. This means no modification of third party deprivileged exception handler code is needed to support the intermodal branching technique discussed above. Also, by using a non-executable dummy function return address in the link register to signal that, on function return, the real function return address should be accessed from the stack, this can hide the real function return address from the deprivileged code to be executed in the thread mode following an intermodal calling branch instruction.

The intermodal function return instruction could be one of a number of types of instruction which may cause a branch to the dummy function return address, e.g. a branch instruction, or a non-branch instruction (such as a register move instruction, load instruction, or stack pop instruction) which causes a program counter to be set to the dummy function return address. Hence, in some implementations it may be the processing circuitry (rather than the instruction decoder) which identifies that an intermodal function return should be performed, and therefore that this should also trigger a switch to the handler mode. In some examples, all types of branches could cause the function return processing if they specify the dummy function return address as the branch target address. In other examples, there may be some types of branch which would not cause the function return processing to be performed, even if they do specify the dummy function return address as the branch target address (e.g. branches specifying the target address using an immediate value may not cause the function return processing to be performed, because they should not need to perform a function return as the immediate-specified branch target address could not have been saved in response to a function calling instruction).

Unlike the intermodal calling branch instruction, for the intermodal function return instruction it may be desirable to permit combined switches of both domain and mode. Hence, in response to the intermodal function return instruction, the processing circuitry may be capable of performing a combined domain/mode switch from processing in a first security domain and the thread mode to processing in a second security domain and the handler mode. This can be useful to support tail calling, which is a performance optimisation used by some compilers in scenarios where a second function is called as the last action within code performed for a first function. As the second function could be processed in a different security domain from the first function, it can be useful for a intermodal function return instruction to support the combined domain/mode switch so that legacy code previously compiled with tail calls can still function correctly.

However, in some cases the combined domain/mode switch on a intermodal function return may be permitted if the first security domain is the secure domain and the second security domain is the less secure domain, but prohibited when the first security domain is the less secure domain and the second security domain is the secure domain. By prohibiting combined domain/mode switches on a function return if this would cause a transition to the secure domain, this can improve security by reducing the number of avenues available for valid entry into the secure domain.

As described further below, a domain transition disable configuration value may be provided to indicate whether transitions between the secure domain and less secure domain while in the thread mode are disabled or enabled. This can be useful for supporting lazy allocation of resources associated with one of the secure or less secure domains. As often the exception handler or other process which is executing an intermodal calling branch instruction may be aware of whether it has already configured the resources needed for operating in both domains, it can be useful to set the domain transition disable configuration value in response to the intermodal calling branch instruction. This improves performance by avoiding the need to execute a separate instruction to set the domain transition disable configuration value. One or more variants of the intermodal calling branch instruction. In response to a first variant of the intermodal calling branch instruction, the instruction decoder may control the processing circuitry to set the domain transition disable configuration value to indicate that transitions between the secure domain and the less secure domain while in thread mode are disabled. In response to a second variant of the intermodal calling branch instruction, the instruction decoder may control the processing circuitry to set the domain transition disable configuration value to indicate that transitions between the secure and less secure domains while in the thread mode are enabled. Some systems may support both variants of the intermodal calling branch instruction. Other systems may only support one of the first/second variants of the intermodal calling branch instruction.

In response to the intermodal calling branch instruction, the instruction decoder may trigger signalling of a fault when the current mode of processing circuitry is the thread mode. Since the intermodal calling branch instruction is intended to cause a handler mode to thread mode transition, executing it from thread mode may be an indication of an error. Raising a fault in this case prevents misuse. For example, as execution of the intermodal calling branch instruction could trigger saving of state which indicates that on a corresponding function return a transition from thread mode to handler mode should be made, there could be a temptation for an attacker running a process in the thread mode to use the intermodal calling branch instruction in an attempt to gain privilege on the corresponding function return. By preventing successful execution of the intermodal calling branch instruction in the thread mode and signalling a fault if this is attempted, this improves security by preventing that kind of attack being successful.

In general, a function return instruction may be any instruction which causes a branch to an instruction identified by a function return address previously set in response to a calling branch instruction. The intermodal function return instruction is a specific type of function return instruction which also triggers a switch at the current mode from the thread mode to the handler mode (e.g. the intermodal function return can be distinguished from non-intermodal function returns by information stored in a register or memory, or by the branch target being a reserved dummy function return address). If the intermodal function return instruction is encountered when the current mode is the handler mode, a fault may be signalled. This can improve security. On an intermodal function call some information may be saved in a stack frame on a stack data structure in memory. If the intermodal function return is attempted when the current mode is handler mode, this can be a sign that the function return transition is not the intended transition expected to use that stack frame, which could risk compromising security if the information on the stack frame is misused. By enforcing that the intermodal return branch instruction can only be successfully executed when in handler mode this reduces the vulnerability to such attacks.

A processor architecture may provide a link register which is designated for storing function return addresses in response to calling branch instructions. The link register could also be available for use as a general purpose register, but on function calls is used to store the function return address to which the processing is to branch on completion of the function. For at least one calling branch instruction other than the intermodal calling branch instruction, the link register may be used as the function return address storage location. However, for the intermodal calling branch instruction, the function return address storage location may be a location on a stack data structure stored in memory. The region of memory comprising the stack data structure could be a region which is inaccessible to the thread mode (e.g. because of memory protection data defining access permissions for the corresponding address region indicates that it is not accessible to code having the level of privilege associated with the thread mode, and/or because a stack pointer for pointing to the stack data structure is in a register which is inaccessible in thread mode). By saving the function return address to the stack instead of to the link register, this prevents the function return address being visible to deprivileged code executing in thread mode after the intermodal function call, improving security by reducing the opportunity for an attacker to see or modify information relating to the operation of more privileged code executing in the handler mode.

As mentioned above, in response to the intermodal calling branch instruction the dummy function return address may be saved to the link register. However, it should be noted that at the point when the corresponding function return instruction attempts to branch to the dummy function return address, this dummy function return address might not be stored in the link register anymore. Some compilers may generate code so that the dummy function return address is retained in the link register, and if another function is nested inside the previously called function, the compiled code may save the dummy function return address to a stack in memory and then once the nested function is complete, restore the dummy function return address to the link register, so that at the point of returning from the first function the dummy function return address is once more in the link register. However, this is not essential. Other compilers may compile code which on returning from the nested function call does not restore the dummy function return address to the link register, but instead improves performance by instead loading the dummy function return address direct from the stack into a program counter register when the corresponding function return is required, effectively causing a branch to the dummy function return address, which may then be detected as requiring the real function return address to be obtained from the stack. Hence, at the time of the function return it is not essential that the dummy function return address is still stored in the link register. Note that, in the case where the dummy function return address is saved to a stack to enable nesting of function calls, the stack used to store the dummy function return address may be a different stack data structure from the stack data structure used to store the real function return address when the intermodal calling branch instruction is executed. For example the stack used to store the real function return address in response to the intermodal calling branch instruction may be a main stack associated with the handler mode while if there is nesting of function calls within the deprivileged code executing in the thread mode then the dummy function return address previously in the link register may be saved to a process stack data structure associated with the thread mode.

The dummy function return address may include various pieces of information for controlling operation when a corresponding function return is attempted. For example the dummy function return address may be indicative of at least one of: whether a switch from thread mode to handler mode is to be requested in response to an instruction attempting to branch to the dummy function return address; whether a switch in current security domain of the processing circuitry is to be requested in response to the instruction attempting to branch to the dummy function return address; and which of a plurality of stack data structures should be used as the stack data structure from which the function return address is to be obtained in response to said instruction attempting to branch to the dummy function return address. Hence, on function return the processing circuitry may use the information in the dummy function return address to determine whether to switch modes, switch domains and/or determine which stack data structure to use for obtaining the function return address. In some examples the dummy function return address may indicate these three pieces of information using two bits: a first bit indicating whether the dummy function return address was set in response to an intermodal calling branch instruction, and a second bit indicating the security domain from which the intermodal function call was made from. Which stack data structure should be used can be inferred from these two bits, so may not need an explicit indication. However, it will be appreciated that this is just one way of encoding information within the dummy function return address and other approaches could take a different option. Also some implementations may not indicate all of the three types of information described above.

A predetermined portion of the dummy function return address may be indicative of whether a switch in the current security domain of the processing circuitry is to be requested in response to the instruction attempting to branch to the dummy function return address. For example, this predetermined portion could be the least significant bit of the dummy function return address. In response to a secure gateway instruction when the current security domain is the less secure domain, the processing circuitry may set a portion of a return address (e.g. the address in the link register) to a value indicative of the less secure state, where that portion is at the same relative position within the return address value as the portion indicating the switch of domain in the dummy function return address. This approach helps to improve security by mitigating against attacks based on less secure code passing a fake return address to secure code on calling a secure function from the less secure domain, in an attempt to make the corresponding return branch in the secure code jump to an arbitrary location in the secure domain instead of returning to an address in the less secure domain. The secure gateway instruction may be an instruction which triggers a switch from the less secure domain to the secure domain when executed from the less secure domain, and the processing circuitry may trigger signalling of a fault if the first instruction fetched from the secure domain after executing instructions in the less secure domain is not the secure gateway instruction. Hence, the secure gateway instruction may be expected to be present at valid entry points into the secure domain, so can sanitise the return address set by less secure code at the point of entering the secure domain, to indicate that the return address cannot be trusted to cause a branch to an arbitrary address in the secure domain. When a predetermined type of branch instruction is executed in the secure domain which specifies, as a branch target address, an address which has the portion set to the value indicative of the less secure state, this causes the processing circuitry to switch back to the less secure domain regardless of whether the target address corresponds to a secure region or less secure region in memory. Hence, secure code can be written to include the predetermined type of branch instruction at those branches which are expected to be using a branch target address controlled by less secure domain, so this provides protection against the type of attacks discussed above. The intermodal function return branches may be at risk of a similar attack, so by encoding the dummy function return address so that the portion used to signal whether a switch of security domain is requested at the same relative position as the portion indicating the less secure state in response to a secure gateway instruction, this also protects the intermodal function return branches against attack.

The link register may be a register which is accessible to code executing in the thread mode. Hence, while it is convenient to use the dummy function return address stored to the link register to provide the information indicating whether a corresponding function return should be treated as an intermodal call, the information placed in the dummy function return address may be vulnerable to be modified by less privileged code executing thread mode. To protect against attacks based on malicious modification of the dummy function return address, in response to the intermodal calling branch instruction, the instruction decoder may control the processing circuitry to save a cross-checking value in at least part of a first relative location in a stack frame saved to the stack data structure. The stack data structure in which the cross-checking value is saved may be a stack which is inaccessible to code executing in the thread mode. In response to at least one type of instruction attempting to branch to the dummy function of an address, the processing circuitry may compare a portion of the dummy function return address for encoding the intermodal call indicating value and a value in at least part of the first relative location in the stack frame obtained from the stack data structure, to determine based on the comparison whether to trigger signalling of a fault. Hence, while the dummy function return address may signal whether it is necessary to access the stack frame on the stack data structure at all, the cross-checking value in the stack frame may provide a double check that any information indicating a change of mode on the function return can be trusted, to increase security. Similar checks can be made for the security domain indication in the dummy function return address.

In response to at least one type of calling branch instruction other than the intermodal calling branch instruction, the instruction decoder may control the processing circuitry to save a value other than the cross-checking value in at least part of the first relative location within the stack frame saved to the stack data structure. Hence, the cross-checking may also protect against attacks which try to use the intermodal function return as a mechanism for returning from code which was entered into via a non-intermodal calling branch instruction. This type of mismatched function call and function return could lead to vulnerabilities based on mismatching stack frames in memory. Hence if an attempt to modify a dummy function return address to indicate an intermodal function return is made but the corresponding stack data structure in memory was actually saved to memory by a non-intermodal calling branch instruction, then the cross-check may fail and so a fault may be triggered.

In response to the intermodal calling branch instruction, the instruction decoder may control the processing circuitry to save a value indicating the handler mode in at least part of a second relative location in the stack frame saved to the stack data structure. The second relative location could be the same address as the first relative location (in which case the cross checking information for the intermodal call indicating value and the value indicating the handler mode could be in different portions of bits within the same data word on the stack), or could be a different relative offset within the stack frame corresponding to a different address to the first relative location. In response to the at least one type of instruction attempting to branch to the dummy function return address when the dummy function return address comprises the intermodal call indicating value, the processing circuitry may trigger signalling of a fault when a value in the relevant part of the second relative location in the stack frame does not indicate the handler mode. Hence, if the dummy function return address indicates a thread mode to handler mode function return, but the stack frame in memory indicates that the corresponding function call was not originally from handler mode, then a fault may be triggered. Again this protects against some forms of attack.

Some implementations may provide both the cross-checking value at the first relative location and the handler mode indicating value at the second relative location on the stack. Other implementations may omit one of these types of cross-check and may only provide either the cross-checking value or the handler mode indicating value.

In response to the at least one type of instruction attempting to branch to the dummy function return address when the dummy function return address comprises the intermodal call indicating value, the processing circuitry may perform a check of the function return address obtained from the stack data structure. Before switching the current mode of the processing circuitry to the handler mode, the processing circuitry may check whether the function return address obtained from the stack data structure is in a predetermined range of reserved addresses from which instruction execution is prohibited. When the function return address is in the predetermined range of reserved addresses, a fault attributed to program code executing the thread mode may be triggered. This type of check can be useful because when the intermodal calling branch instruction is executed the function return address may be saved to a third relative location within a stack frame saved to the stack data structure, and for at least one type of exception transition triggered by an exception condition, exception control circuitry may store a stack frame which includes one of the predetermined range of reserved addresses stored at the third relative location within the stack frame. Hence, by checking on an intermodal function return whether the function return address is one of the predetermined range of reserved addresses, this protects against attacks based on attempting to perform a function return based on a stack frame which was actually saved in response to an exception entry transition not a function call transition, which could otherwise lead to unpredictable results compromising security. The checking of the function return address may also help prevent other types of attack. For example if the beginning of a stack is sealed with another reserved value (from the predetermined range of reserved addresses) in the third relative location within a stack frame, then attempts to underflow the stack (i.e. use a stack frame when the stack is empty) will also be detected and signal a fault.

It may seem redundant to check whether the function return address is in the reserved range of addresses as part of the checks for the intermodal function return instruction, as one would expect that faults caused by an attempt to execute an instruction from the predetermined range of reserved addresses should be triggered at the point when an instruction is attempted to be fetched from one of the reserved addresses. However, the inventor recognised that, for the intermodal function return, if the intermodal function return is allowed to complete successfully so that the mode is switched to the handler mode, and then the fault is subsequently triggered on attempting to fetch the next instruction from the function return address, this fault may be attributed to the code executing in the handler mode, rather than the program code executing in the thread mode before switching to the handler mode. This could be a problem because the handler code may be associated with the operating system, so this fault could lead to the operating system operation being suspected as being faulty, which may require relatively invasive action to be performed such as a full system reset. Therefore, with this approach, this could provide a way for an attacker to perform denial of service attacks aimed at disrupting the correct functioning of the processing system (by repeatedly triggering function returns based on exception stack frames).

In contrast, with the approach described here where an early check of whether the function return address is in the reserved range of addresses at the time of processing the intermodal function return instruction (before triggering any switch of mode from the thread mode to the handler mode), the fault can be attributed to the thread mode code and hence the fault handling action can have much lower impact on system functioning (for example, just killing and restarting a single thread), reducing the opportunity for denial of service attacks and hence improving security.

For reliability and safety purposes, some implementations may have error detection/correction circuitry for detecting transient or permanent errors caused by hardware faults or temporary glitches. For example, the error detection/correction circuitry could include circuitry which uses error detection/correction codes to detect errors in data stored in registers or memory, which may be caused by particle strikes or by storage elements becoming stuck at 0 or 1 for example. The error detection/correction circuitry could also include redundant processing logic which may perform the same operation two or more times so that errors can be detected from the comparison of the redundant outcomes of those operations. The particular form of the error detection/correction circuitry may vary significantly from system to system depending on the needs of that system. For a similar reason to the denial of service attack scenario described above, it can be useful to be able to attribute any errors that have been detected to a particular data processing context, so that resolution of the error can be made more efficient (for example by avoiding the need to kill the operating system and perform an intrusive system reset if the error actually occurred within data processing associated with a particular thread).

To enable isolation of errors, in response to the intermodal calling branch instruction the instruction decoder may control the processing circuitry to perform an error synchronisation barrier operation to isolate detection of errors associated with data processing performed before the error synchronisation barrier operation from detection of errors associated with data processing performed after the error synchronisation barrier operation. Similarly, for the intermodal function return instruction this may also trigger an error synchronisation barrier operation. For example the error synchronisation barrier operation may comprise processing being halted until any outstanding operations have completed and the results of any error checking for any operations performed before the error synchronisation barrier operation are available and it is known whether the outcome of the earlier processing is correct. Hence, this allows any errors arising to be better pinpointed to the particular code in which the error occurred. In some systems, the intermodal calling branch instruction and intermodal function return instruction could always trigger the error synchronisation barrier operation. Other systems (for example those not having any of the reliability/safety error checking circuitry) may not support the error synchronisation barrier operation. In other examples, some configuration state data may be provided which controls whether an intermodal calling branch instruction and intermodal function return instruction triggers an error synchronisation barrier operation. By allowing the presence of the error synchronisation barrier operations to be configured by software, a single chip may better address the needs of different markets, for example where performance is more important than error isolation or vice versa.

Some implementations may provide two or more stack pointer registers which include a process stack pointer register per security domain and a main pointer register per security domain (in systems with only one security domain, there may be only a single process stack pointer register and a single main stack pointer register, while in systems supporting multiple security domains the stack pointer registers may be banked per security domain). Selection circuitry may select, for each security domain, which stack pointer register should be used to provide a stack pointer for accessing a stack data structure in memory. In the handler mode the selection circuitry may select the main stack pointer register for the current security domain. In the thread mode, the selection circuitry may select between the main stack pointer register and the process stack pointer register for the current domain based on the stack pointer selection value for the current domain. The provision of separate main and process stacks for handler mode and thread mode respectively can make developments of exception handler code simpler as it means that any data which exception handlers may leave on the main stack data structure may not generally be accessible to the thread running in thread mode after exception return. In some implementations, using separate stacks for thread and handler mode may also help to guard against certain types of attacks based on faking of false exception return stack frames. However, in some scenarios (for example where there is limited memory available) it may be desirable to allow the thread mode code to share a main stack identified by the main stack pointer with handler mode, instead of thread mode using a separate process stack. Therefore a stack pointer selection value may be provided (controlled by more privileged code) to define which stack should be used in the thread mode.

In response to the intermodal calling branch instruction, the instruction decoder may control the processing circuitry to set the stack pointer selection value for the current security domain to indicate that the process stack pointer register should be selected when in thread mode. This can prevent the deprivileged section of the exception handler to be executed after the intermodal function call accessing information which more privileged code may have left on the main stack structure, improving security.

A simulator computer program may be provided for controlling a host data processing apparatus to provide an instruction execution environment for execution of instructions from target program code. The computer program may have processing program logic, exception control program logic and instruction decoding program logic which emulates the functionality of the processing circuitry, exception control circuitry and instruction decoder described above. This includes support for an intermodal calling branch instruction as described above. Hence, such a simulator computer program may present, to target code executing on the simulator computer program, a similar instruction environment to that which would be provided by an actual hardware apparatus even though there may not be any actual hardware providing these features in the host computer which is executing the simulator computer program. This can be useful for executing code written for one instruction set architecture on a host platform which does not actually support that architecture. Also, the simulator can be useful during development of software for a new version of the instruction set architecture, when the software development is being performed in parallel with development of hardware devices supporting the new version of the instruction set architecture, so that the software being developed can be tested on the simulation so that software development can start before the hardware devices supporting the new version of the instruction set architecture are ready.

Domain Transition Disable Configuration Parameter

As mentioned above, the processing circuitry may have a number of security domains including at least a secure domain and a less secure domain, and memory access checking circuitry may be provided to check whether a memory access is allowed depending on the current security domain of the processing circuitry. For example this memory access checking may be based on attribute data which defines whether memory regions are considered secure or less secure, and when operating in the less secure domain access to secure regions may be prohibited.

A control storage location may be provided to store a domain transition disable configuration parameter specifying whether, in at least one mode at the processing circuitry, domain transitions between the secure domain and the less secure domain are enabled or disabled. In that at least one mode, when the domain transition disable configuration parameter specifies that the domain transitions are disabled, the processing circuitry may trigger signalling of a disabled domain transition fault in response to an attempt to transition from the secure domain to the less secure domain, and may trigger signalling of the disable domain transition fault in response to an attempt to transition from the less secure domain to the secure domain. This approach may be counter intuitive since, while one may expect it may be useful for security reasons to be able to prevent transitions from the less secure domain to the secure domain, one may question why it is useful to be able to selectively disable transitions from the secure domain to a less secure domain. However, the inventor recognised that this provides a way to contain a particular thread of processing to a single one of the secure and less secure domains, which can be good for performance because some of the performance intensive operations which may be needed if a thread crosses both domains can be supressed if it is known that an attempt to switch domains will trigger the disable domain transition fault. This then permits those performance intensive operations to be performed lazily, only being performed if needed when there is an attempt to switch domains, to avoid the performance cost of performing these operations speculatively for all threads regardless of whether the threads will cross domains. Hence, the provision of a domain transition disable configuration parameter which disables transitions in both directions between the secure and less secure domains when the processing circuitry is in at least one mode can be beneficial for performance.

This technique can be particularly useful in cases where in the secure domain the processing circuitry controls access to memory using information stored in at least one secure configuration register, and in the less secure domain the processing circuitry controls access to memory using information stored in at least one less secure configuration register. For example the secure/less secure configuration registers could include stack pointer registers which store stack pointers for accessing respective secure or less secure stack data structures in memory, registers within a memory protection unit (MPU) which define memory protection attributes for defining access permissions to regions of memory, and/or MPU pointer registers which provide a pointer to a table in memory providing the memory protection region attributes. For ensuring isolation between the secure and less secure domains, it may be desirable to define separate sets of MPU attributes or stack data structures for use by the secure and less secure domains respectively. However, the operations for configuring stack pointers, allocating space in the memory address space for the stack data structures, and/or configuring the MPU region attributes for the secure and less secure domains may be relatively performance intensive, and so it may be desirable to avoid performing these operations for one of the secure and less secure domains for a thread which only needs to operate in the other domain. This may be especially important when time critical operations like interrupt handling need to be performed. Hence, by providing the domain transition disable configuration parameter, this provides a fault which can be used to detect cases when a thread for which these configuration operations have not been performed tries to switch to the other domain, so that these configuration operations can then be performed lazily on demand. In one example, the resources configured may include stack pointer registers which store stack pointers for pointing to stack data structures, including at least one stack pointer register associated with a secure domain and at least one stack pointer register associated with the less secure domain.

In response to an attempt to perform at least one type of transition from the less secure domain to the secure domain in the at least one mode, the processing circuitry may perform disabled domain transition checking using the domain transition disable configuration parameter to determine whether to trigger signalling of the disabled domain transition fault. This disabled domain transition checking may, for an attempt to transition from the less secure domain to the secure domain, be performed before performing at least one other security check to determine whether the attempt to transition from the less secure domain to the secure domain is allowed. It is possible that at least part of the at least one other security check may depend on information or resources which have not yet been configured for a thread which was not expected to switch domains, such as the MPU configuration or stack data structures referenced by stack pointer registers. Hence, if the other security check is performed before the disabled domain transition checking, this could lead to that security check failing simply because the relevant data to check had not been configured yet, rather than because some other security risk is identified. As the security checks may be associated with a fault handler which triggers more drastic action than the fault handler associated with the disabled domain transition fault (which may merely trigger the lazy configuration of resources), it may be desirable to perform the disabled domain transition checking first, so that if the resources are not available then they can be configured before then continuing to perform the other type of security check. For example, some implementations may perform security checks that cause a secure fault to be raised if the check fails. To ensure the integrity of the secure state, the exception handler associated with the secure fault may terminate execution of the entire less secure state. Such a fault could be deliberately triggered by software running in the less secure and less privileged state as a means to perform a denial of service attack on an operating system running in the less secure state.

For transitions attempted from the secure domain to the less secure domain, disabled domain transition checking may also be performed using the domain transition disable configuration parameter. However, as this transition is from the secure domain to the less secure domain then it may not be necessary to perform other security checks, so the ordering between the disabled domain transition checking and the other security check may not be relevant. Alternatively, some systems may still perform security checks on returning from secure domain to less secure domain, in which case the order between the disabled domain transition checking and the other security checks may depend on whether any information configured in response to a disabled domain transition fault is expected to be used in that other security check.

The disabled domain transition checking may be triggered by an attempt to perform at least one type of transition from the less secure domain to the secure domain or from the secure domain to the less secure domain. Sometimes, the disabled domain transition checking could be triggered by an event or instruction which may not necessarily actually cause a transition between the secure and less secure domains. For example, in some cases the disabled domain transition checking could be performed when an event or instruction is encountered which could potentially cause a transition between the security domains, but before the point at which it is identified whether that event or instruction actually triggers a change of domains. Hence, while the domain transition disable configuration parameter is at least checked in response to an actual attempt to change domains, this does not exclude that it may sometimes also be checked on events which would not actually cause a change of domain if the disabled domain transition checking passes and determines that the domain transition would be enabled.

The domain transition disable configuration parameter may be modifiable in both the secure domain and the less secure domain. In some implementations, other conditions may also be imposed on whether a particular piece of program code is allows to modify the domain transition disable configuration parameter. For example, in systems having a privileged state and a less privileged state the domain transition disable configuration parameter could be modifiable only in the privileged state. Nevertheless, the processing circuitry may be allowed to modify the domain transition disable configuration parameter even if the current security domain is the less secure domain. This may seem counterintuitive as normally configuration parameters which restrict changes of security domain would be expected to be configured from the secure domain. However, as the triggering of the disabled domain transition fault may be used as a mechanism to improve performance rather than security then it may be acceptable for the domain transition disable configuration parameter to be modified form the less secure domain. This exploits the fact that there may be little benefit for a thread to enable changes of security domain if it has not had the proper secure resources established for it, as in that case if it attempted to switch to the secure domain then processing would fail because any such resources would not have been established.

As discussed above, the processing circuitry may have a thread mode and a handler mode. These modes may be orthogonal to the security domains, in that in the secure domain the processing circuitry may operate in either the thread mode or the handler mode and similarly in the less secure domain the processing circuitry may operate in either the thread mode or the handler mode. The at least one mode of the processing circuitry described above may be the thread mode. Hence, when in thread mode then the domain transition disable configuration parameter may selectively disable transitions of security domain. However, the at least one mode may exclude the handler mode, so that in the handler mode the processing circuitry may determine whether the domain transitions are permitted independent of the domain transition disable configuration parameter.

Hence, even if the domain transition disable configuration parameter indicates that transitions between secure and less secure domains are disabled in the thread mode, such secure/less secure domain transitions may still be permitted in the handler mode. It is more likely that in a system having secure and less secure domains, handler code executed in the handler mode (which may be associated with an operating system for example) may involve both secure and less secure processing and so needs the resources from both domains, so the value of disabling secure/less secure domain transitions in the handler mode is less. Also, the handler code executing in the handler mode may be the code which steps in and lazily configures the resources for the other domain in cases where thread mode code has triggered the disabled domain transition fault, so it can be useful to permit the handler mode to continue operating in both domains even if the thread mode has disabled domain transitions.

As discussed earlier, the instruction decoder may support an intermodal calling branch instruction which, in addition to saving a function return address and branching to a branch target address also switches a current mode of the processing circuitry from the handler mode to the thread mode. It can be useful to also set the domain transition disable configuration parameter in response to such an instruction, to specify whether domain transitions are enabled or disabled. At least one of first and second variants of the intermodal calling branch instruction may be defined, with the first variant causing the domain transition disable configuration parameter to be set to specify that the domain transitions are disabled in the at least one mode and the second variant causing the parameter to be set to specify that the domain transitions are enabled in the at least one mode. Systems supporting both variants can be particularly useful as this enables the handler code to signal, in the same intermodal calling branch instruction which calls a deprivileged section of exception handler code, whether it has already configured the resources for the deprivileged section to operate in both domains.

Similarly, for an intermodal function return instruction as discussed earlier, this may also trigger the domain transition disable configuration parameter to be set. For the function return it can be particularly useful for the domain transition disable configuration parameter to be set to a value specifying that the domain transitions are enabled in the at least one mode. This is useful because as mentioned above one use case for the intermodal function calling branch and intermodal function return can be to allow an exception handler to call a function to be deprivileged in the thread mode, and this code could be provided by a third party provider. The more privileged code in the handler mode may execute "wrapper" code to be executed before and after the deprivileged section of code. By setting the domain transition disable configuration parameter to a default value in response to the intermodal function return instruction, this means the wrapper code at the end of the deprivileged section always executes with a consistent known state, regardless of whether the deprivileged section actually used both secure and less secure domains. Also, by using the "enable" indication as the default value set following an intermodal function return rather than a "disable" indication, this means that subsequent legacy code written for systems which do not support the domain transition disable configuration parameter (which would expect that thread mode domain transitions would be allowed) can still function without triggering additional faults.

Also, in response to the intermodal function return instruction, as well as updating the domain transition disable configuration parameter to indicate that domain transitions are enabled in the at least one mode, the processing circuitry could also record an indication of whether, prior to executing the intermodal function return instruction, the domain transition disable configuration parameter specified that the domain transitions were enabled or disabled in the at least one mode. This indication of the previous state of the domain transition disable configuration parameter can be useful for allowing subsequent handler code to determine whether information in a configuration register belonging to the other security state (such as MPU state or stack pointers) could have been changed by code executed between the intermodal call and intermodal function return, so that if the configuration registers for the other security state have not been changed, then any operations to restore previous configuration can be omitted to improve performance.

If, following a check of the domain transition disable configuration parameter, the disabled domain transition fault is signalled when attempting to transition from a first security domain to a second security domain, then exception control circuitry may control the processing circuitry to process an exception handler in the first security domain. Hence, if the fault is triggered by an attempt to switch from the less secure domain to the secure domain then the fault would be processed in the less secure domain and if the attempt was to transition from the secure domain to the less secure domain then the fault would be processed in the secure domain. This is useful because typically the domain in which the corresponding thread was operating before the domain switch would be the domain in which the thread was first initialised and hence the domain associated with a managing process which manages that thread. For example secure threads created in the secure domain may be managed by a secure operating system and less secure threads created in the less secure domain may be managed by a less secure operating system, and so it can be desirable for any disabled domain transition fault to be directed to the managing process associated with the thread which attempted the disabled domain transition. While the fault may be handled in the first security domain, the configuration of resources performed by the exception handler in response to the fault may be of resources associated with the second security domain. Since the domain the disabled domain transition fault targets is different from the state whose resources need to be lazily configured, close coordination between the program code operating in the less secure state and the secure state may be required in handler mode. Thus it may be advantageous to exclude handler mode from the at least one mode where disabled domain transition checking is performed.

On occurrence of an exception condition, the exception control circuitry may update the domain transition disable configuration parameter to specify that the secure/less secure domain transitions are enabled in the at least one mode. Again, this provides exception handlers with a safe, known, default state, so that exception handlers can function in a consistent manner regardless of the value of the domain transition disable configuration parameter associated with background code being processed at the point when the exception is taken. Also, by defaulting to enabling the transitions in response to an exception condition this improves compatibility with legacy code in exception handlers which may have been written for a system which did not support the domain transition disabling functionality.

When an exception condition occurs, the exception control circuitry may trigger some state saving to save architectural state associated with processing performed before the exception condition occurred. It is not necessary for the hardware of the exception control circuitry to save all architectural state associated with that previous processing, and in some cases the hardware may only save a subset of architectural state. It may be the responsibility of the subsequent exception handler to save other architectural state not saved in hardware, if the registers that other state resides in will be overwritten by the exception handler.

When performing such state saving in response to an exception, the architectural state saved in the state saving may include the domain transition disable configuration parameter. Hence, the domain transition disable configuration parameter may be automatically preserved by hardware when an exception occurs so that once exception handling is complete and processing returns to the previous processing being performed before the exception occurred, the domain transition disable configuration parameter can be restored to the control storage location so that subsequent processing of the background code may function in the same way as if the exception never occurred.

In some implementations, the domain transition disable configuration parameter could, in response to an exception condition, be saved as part of a stack frame which is saved to a stack data structure, with the stack frame also including other architectural state such as general purpose register contents or an exception return address for example. However, in some implementations there may be little spare space within the stack frame for encoding the domain transition disable configuration parameter, and it may be preferred to preserve any spare encoding space for other purposes.

Hence, in some examples, during the state saving the exception control circuitry may save to a stack data structure a first stack frame which includes an exception return address and the first subset of architectural state, but a value indicative of the domain transition disable configuration parameter may instead be saved to a predetermined register instead of being included in the first stack frame (e.g. the predetermined register may be the link register). This avoids needing to expend extra bits within the stack frame. Note that the saved value indicative of the domain transition disable configuration parameter need not have an identical encoding to the domain transition disable configuration parameter itself—any value can be saved to the stack which enables determination of what value the domain transition disable configuration parameter had at the time of the exception occurring.

However, the predetermined register may be accessible to an exception handler to be executed in response to the exception condition. At least for exceptions which cause a transition from the secure domain to the less secure domain, it may not be desirable to allow the less secure code executing after the exception to modify the value indicating whether the security domain transitions have been disabled in the processing being performed before the exception.

To protect against this scenario, at least in response to an exception condition which triggers a transition from the secure domain to the less secure domain, the exception control circuitry may save to the stack data structure not only the first stack frame described above but also a second stack frame including a second subset of architectural state and cross-checking information for checking the value indicative of the domain transition disable configuration parameter. At least on an exception return transition from the less secure domain to the secure domain, the exception control circuitry may compare the value indicative of the domain transition disable configuration parameter with the cross-checking information in the second stack frame, and trigger signalling of a fault if a mismatch is detected in the comparison. Note that while the value indicative of the domain transition disable configuration parameter may have been saved to the predetermined register in response to initial exception, at the point of performing the exception return transition, the domain transition disable configuration parameter may no longer be in the predetermined register but could be within a value loaded from a stack data structure in memory, or in a field within a dummy non-executable address that is branched to to trigger the exception return. By providing cross-checking information in the second stack frame, this can allow an attempt by a less secure exception handler to modify the saved value of the domain transition disable configuration parameter initially placed in the predetermined register to be detected to prevent security violations. While this approach may seem more complex, the second stack frame may record additional state saved to memory to hide it from less secure exception handlers, and may have more spare capacity for additional information than the first stack frame providing a subset of state saved for all exception entries. Therefore, recording the cross-checking information in the second stack frame means that for those exceptions for which only the first stack frame is required then there is no need to incur the memory cost and interrupt latency of saving any additional stack state for preserving in the domain transition disable configuration parameter (as it is safe to rely on the predetermined register in this case), but on those secure to less secure exception transitions which require the second stack frame to be saved then a cross-check can be saved to the stack to increase security.

There may be a number of ways in which the processing circuitry may permit a domain transition between the secure domain and the less secure domain to be performed, and the checking of the domain transition disable configuration parameter may be performed in slightly different ways depending on which route is used to transition between the security domains.

As mentioned earlier, one way of switching domains is to use an inter-domain calling branch instruction which requests a transition from the secure domain to the less secure domain, in response to which an instruction decoder may control the processing circuitry to perform an inter-domain calling branch operation which comprises saving a function return address to a function return address storage location (e.g. a stack data structure in memory), saving a dummy function return address to a predetermined register (e.g. a link register), switching the processing circuitry to the less secure domain, and branching to an instruction identified by a branch target address specified by the inter-domain calling branch instruction. By permitting direct function calls from the secure domain to the less secure domain, this avoids the need to call an exception handler or monitor code to supervise the domain transition, providing improved performance.

For the inter-domain calling branch instruction, the domain transition disable configuration parameter can be checked, and when the domain transition disable configuration parameter specifies that inter-domain transitions are enabled in the at least one mode then the inter-domain calling branch operation may be performed. Also, regardless of the value of the domain transition disable configuration parameter, if the processing circuitry is currently in a mode other than the at least one mode (e.g. when the current mode is the handler mode) then the inter-domain calling branch operation can be performed. Conversely, when in the at least one mode (e.g. the thread mode) and the domain transition disable configuration parameter specifies that the domain transitions are disabled in that at least one mode, then signalling of the disabled domain transition fault may be triggered.

Another way of transitioning between domains may be to attempt to execute a inter-domain return branch instruction, which requests a transition from the secure domain to the less secure domain and branches to an instruction identified by a branch target address specified by the inter-domain return branch instruction. The attempt to execute the instruction may trigger the domain transition disable configuration parameter to be checked, and when the domain transition disable configuration parameter specifies that inter-domain transitions are enabled in the at least one mode then the inter-domain return branch operation may be performed. Also, regardless of the value of the domain transition disable configuration parameter, if the processing circuitry is currently in a mode other than the at least one mode (e.g. when the current mode is the handler mode) then the inter-domain return branch operation can be performed. Conversely, when in the at least one mode (e.g. the thread mode) and the domain transition disable configuration parameter specifies that the domain transitions are disabled in that at least one mode, then signalling of the disabled domain transition fault may be triggered.

Another way of transitioning between domains may be to attempt to branch to a dummy function return address which was set up by an earlier function calling branch instruction as discussed earlier. When an inter-domain calling branch instruction is executed requesting a transition from the secure domain to the less secure domain, the function return address for the function call may be saved to a stack data structure to protect it from being visible from less secure code, and the dummy function return address may be saved to a link register visible to the less secure code. The dummy function return address could include information indicating that on the corresponding function return a domain transition should be performed to return to the secure domain. Hence, when there is later an attempt to branch to the dummy function return address and the dummy function return address indicates an inter-domain function return, the processing circuitry may trigger signalling of the disabled domain transition fault if the processing circuitry is currently in the at least one mode and the domain transition disable configuration parameter specifies that the domain transitions should be disabled in that at least one mode.

Another way of transitioning from the less secure to the secure domain may be when an instruction is fetched from a secure address region. Security attribute data maintained by memory access checking circuitry may define address regions as either less secure address regions or secure address regions. Instructions stored in secure address regions of memory may only be executed from the secure domain. When currently in the less secure domain, if an attempt is made to fetch an instruction having an address in a secure address region, then this may require some security checks to be performed to check whether a transition to the secure domain may be permitted. For example, the check may include checking whether the instruction at the address in the secure address region is a certain type of secure gateway instruction which marks a valid entry points into the secure domain. In some cases, if the instruction at the address in the secure address region is the secure gateway instruction, then the decoding of the secure gateway instruction may trigger the change of security domain from the less secure domain to the secure domain. In other cases a transition from the less secure domain to the secure domain may only be permitted if the attempt to fetch an instruction targets a particular type of secure memory, which may be less secure callable secure memory. Some implementations may perform both secure gateway instruction checking and less secure callable secure memory checking.

However, as mentioned earlier, for a transition from the less secure domain to the secure domain, the security checks may depend on resources which may not have been configured for a thread which was expected to remain within a single security domain (e.g. the checks could depend on memory protection unit attributes for the secure region being set so that the instruction fetched from the secure region can be fetched and decoded). Therefore, the security checks may themselves fall down if a thread expected to reside only in the less secure domain attempts to switch states. To prevent those security checks falling down then it may be desirable to perform the check of the domain transition disable configuration parameter as early as possible.

Hence, this check may be performed in response to an attempt to fetch an instruction having an address in a secure address region, rather than waiting until that instruction is fetched and decoded. By performing the check of the domain transition disable configuration parameter at an early stage of the pipeline, this reduces the chances of the security checks failing due to lack of resources configured. At the point when this check is done, it may not yet be known whether the instruction being fetched is actually an instruction which would have triggered a transition to the secure domain (for example if the fetched instruction was not a secure gateway instruction, it may not have triggered entry to the secure domain). Hence, the checking of the domain transition disable configuration parameter may be conservative in that it may be checked regardless of the type of instruction fetched, if an instruction is being fetched from an address in a secure address region and the current domain is the less secure domain. It will be appreciated that in some implementations the position of the various checks within the pipeline may vary, but that the same effect of performing the domain transition disable checks first can be achieved by performing this check later in the pipeline, but prioritising the signalling of any resulting domain transition disable faults over the signalling of other faults.

As for the intermodal calling branch instruction described earlier, the domain transition disable configuration parameter can be used in a simulation environment where a simulation computer program executing on a host data processing apparatus simulates an equivalent instruction execution environment to the one expected if target program code was executed on a real hardware device which had the features of the control storage location storing the domain transition disable configuration parameter and the associated logic for setting and using the parameter as described above. Hence, a computer program may have processing program logic, memory access checking program logic and configuration parameter setting program logic which emulates the functionality of the processing circuitry, memory access checking circuitry and circuitry for maintaining the domain transition disable configuration parameter in the control storage location as described above.

DESCRIPTION OF SPECIFIC EXAMPLES

FIG. 1 schematically illustrates an example of a data processing system 2 including processing circuitry 4 for performing data processing in response to instructions fetched from a memory system 6. The memory system 6 may include caches (e.g. one or more levels of data caches and/or instruction caches) as well as main memory. The processing circuitry 4 includes a processing pipeline including a number of pipeline stages including, for example, a fetch stage 8 for fetching the instructions to be executed from the memory system 6, a decode stage 10 for decoding the fetched instructions to generate control signals for controlling the remaining pipeline stages to perform the data processing, and an execute stage 12 for executing the decoded instructions to perform data processing operations. Registers 14 are provided for storing input operands for the instructions processed by the pipeline 4. The registers 14 include a number of types of registers including general purpose (integer) registers 16 for storing integer values, and control registers 20 for storing control parameters for controlling the execution of instructions by the processing circuitry 4 and other operations such as exception handling, security checking, etc. Other types of registers could also be provided, e.g. floating point registers for storing floating point values or vector registers for storing vector operands comprising multiple independent data values.

It will be appreciated that the pipeline stages shown in FIG. 1 are a simplified representation, and other types of pipeline stages could also be provided, such as a rename stage for performing register renaming, an issue stage for queueing instructions awaiting execution and issuing them for execution when their required operands are available, and a write back stage for handling commitment of instructions and writing back results to the registers 14. The pipeline could be an in order or out of order pipeline.

Reliability, availability and serviceability (RAS) error detection/correction circuitry 29 is provided for performing error detecting or correcting operations for detecting or correcting hardware faults arising randomly in operation of the processing system. For example hardware faults may arise due to particle strikes causing a stored bit of state or a signal on a processing logic path to flip between 0 and 1. Also, hardware faults may cause due to physical deterioration of the electronic circuits over time, e.g. electromigration may eventually cause a storage element to become stuck at 0 or 1 regardless of the bit value written to it. To detect such faults, the RAS could include one more error detection/correction mechanisms. For example, one mechanism could be to provide redundant processing logic to redundantly execute the same operations as the processing circuitry 4, and comparison logic to compare the outcomes of the main and redundant processing to detect any faults. Another mechanism could be to manage setting and checking of error detecting codes or error correcting codes which are stored in association with data written to memory, so that on reading the data back from memory the corresponding error detecting/correcting code can be recalculated and compared with the stored error detecting/correcting code to detect (and if possible, correct) the error. If a RAS error is detected, if possible the error is corrected and processing continues with forward progress (e.g. this may be possible with triple core lockstep techniques or with use of error correcting codes). Alternatively, if the error is not correctable, a fault may be signalled which may cause a thread of processing to be terminated and restarted. It will be appreciated that any known technique for error detection/correction and recovery can be used.

The system 2 also includes memory access checking circuitry 22 for checking whether accesses to the memory system 6 are permitted based on attribute data specified for various regions of a memory address space. The memory access checking circuitry includes a security attribute unit (SAU) 24 for storing security domain defining data which defines a security domain associated with each respective region of the memory address space. Based on the security attribute data, the security attribute unit 24 may check whether a memory access is allowed depending on a current security domain of operation of the processing circuitry and on the security domain associated with the region including the target address of the memory access. In other embodiments the SAU may not directly store the security domain defining data, but instead access security domain defining data stored elsewhere in order to perform the memory access checks. In some systems the security domain defining data may be stored in the memory system 6, or may be configuration registers elsewhere in the system 2. The processing circuitry 4 may operate in a current security domain of operation, which may generally correspond to the security domain associated with the address of the instruction currently being executed (although there may be some exceptions, e.g. when handling transitions between domains). When an instruction branches from an address in a region specified by the SAU 24 as being in one domain to an address in a region associated with a different domain, this may trigger a transition of the current security domain in which the processing circuitry 4 is operating. In other embodiments such a branch may not directly trigger a transition of the current security domain, but instead trigger additional security checks, such as whether a gateway instruction is present, in these embodiments it may be the gateway instruction itself that triggers the change in the current security domain. In general, while operating in a secure domain, the processing circuitry may have access to data in memory regions associated with both the secure domain and a less secure domain, while when operating in the less secure domain the processing circuitry may have access to the data in regions associated with the less secure domain but may not be permitted to access data in regions of the address space which the SAU 24 specifies as being associated with the secure domain. This enables protection of sensitive data against unauthorised access from code operating in the less secure domain.

Also, the memory access checking circuitry may include a memory protection unit (MPU) 26 which checks whether memory accesses to the memory system 6 satisfy access permissions which may specify, for example, which privilege levels of the processing circuitry 4 are allowed to access a given region of memory, or may specify whether a memory region of the address space can be accessed by both read and write operations or is a read only region for which writes are prohibited. The access permissions used by the MPU 26 may for example be specified by a more privileged process (such as a hypervisor or an operating system) to control which regions of memory a less privileged process (such as an application) is allowed to access, and how (read only or read/write, and whether the memory is executable). In some implementations the MPU 26 may also apply checking of which regions of memory a privileged process is allowed to access, and how (read only or read/write, and whether the memory is executable). The MPU 26 may allow different permissions to be specified for less privileged vs privileged accesses. The permissions provided by the MPU 26 may be orthogonal to those provided by the SAU 24, so that for a given memory access to be allowed, it should pass the checks based on the access permissions defined for both the MPU 26 and the SAU 24. The MPU 26 may comprise separate secure and less secure MPUs 26-S, 26-NS, each associated with one of the security domains, so that different memory access permissions can be specified for a given region of memory depending on whether the current domain is the secure domain or the less secure domain (e.g. a region could be read only in the less secure domain but both readable and writable in the secure domain).

Figure 2:
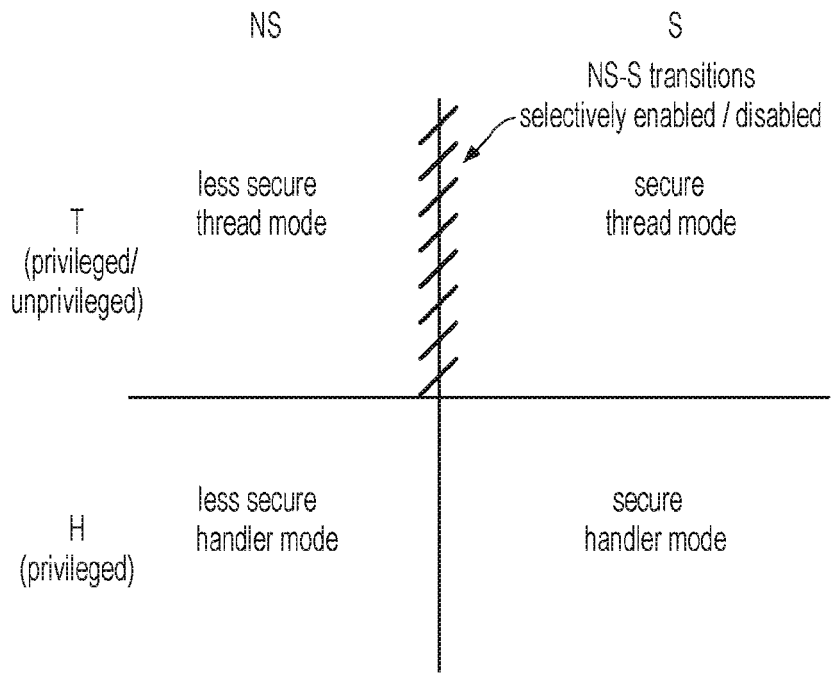
FIG. 2 shows an example of different domains and modes of operation of the processing circuitry.

Hence, as shown in FIG. 2, the processing circuitry 4 may support performing data processing in one of a number of security domains including at least a secure domain (S) and a less secure domain (also known as non-secure domain, NS). Although FIG. 2 shows a system with only two security domains, it would be possible to provide three or more domains associated with different levels of security, in which case the S and NS domains shown may be any two of the three or more domains provided.

Also, within a given security domain, as shown in FIG. 2 the processing circuitry may perform data processing in one of a number of modes, including a handler mode (H) for exception processing and a thread mode (T) for background processing. As shown in FIG. 1, exception control circuitry 28 may be provided to control exception handling operations, including exception entry transitions and exception return transitions, and any saving/restoring of architectural state during such transitions. The separation of exception handling into a dedicated handler mode H can be useful to simplify management of which registers are allowed to be accessed by the processing circuitry (e.g. some registers used for exception handling may be accessible in the handler mode H but may not be accessible in the thread mode T). In general, when operating in the handler mode H then the processing circuitry 4 may by default be assumed to have a more privileged mode of operation so that access to memory and registers is controlled according to a certain level of privilege level other than the least privileged level, while in the thread mode T the processing circuitry may have one of a number of different privilege levels depending on other architectural state stored in the control registers 20.

Hence as shown in FIG. 2, the combination of the security domain and the mode in which the processing circuitry 4 is operating may determine aspects of how processing is carried out by the processing circuitry 4. FIG. 2 shows four different combinations of these modes, including:
  secure thread mode (shorthand for the combination of the secure domain and the thread mode)
  less secure thread mode (combination of the less secure domain and the thread mode)
  secure handler mode (combination of the secure domain and the handler mode) and less secure handler mode (combination of the less secure domain and the handler mode).

As discussed below, in response to exception conditions, and exception return conditions, the actions carried out may depend on the particular transition being made between these respective combinations of security domain and mode. The attributes in the secure attribution unit (SAU) 24 police the boundary between the secure and less secure domains. The attributes in the secure MPU 26-S can be used to police the boundary between different threads operating in secure thread mode, and between these threads and a secure operating system. The attributes in the less secure MPU 26-NS can be used to police the boundary between different threads operating in less secure thread mode, and between these threads and a less secure operating system.

Figure 3:
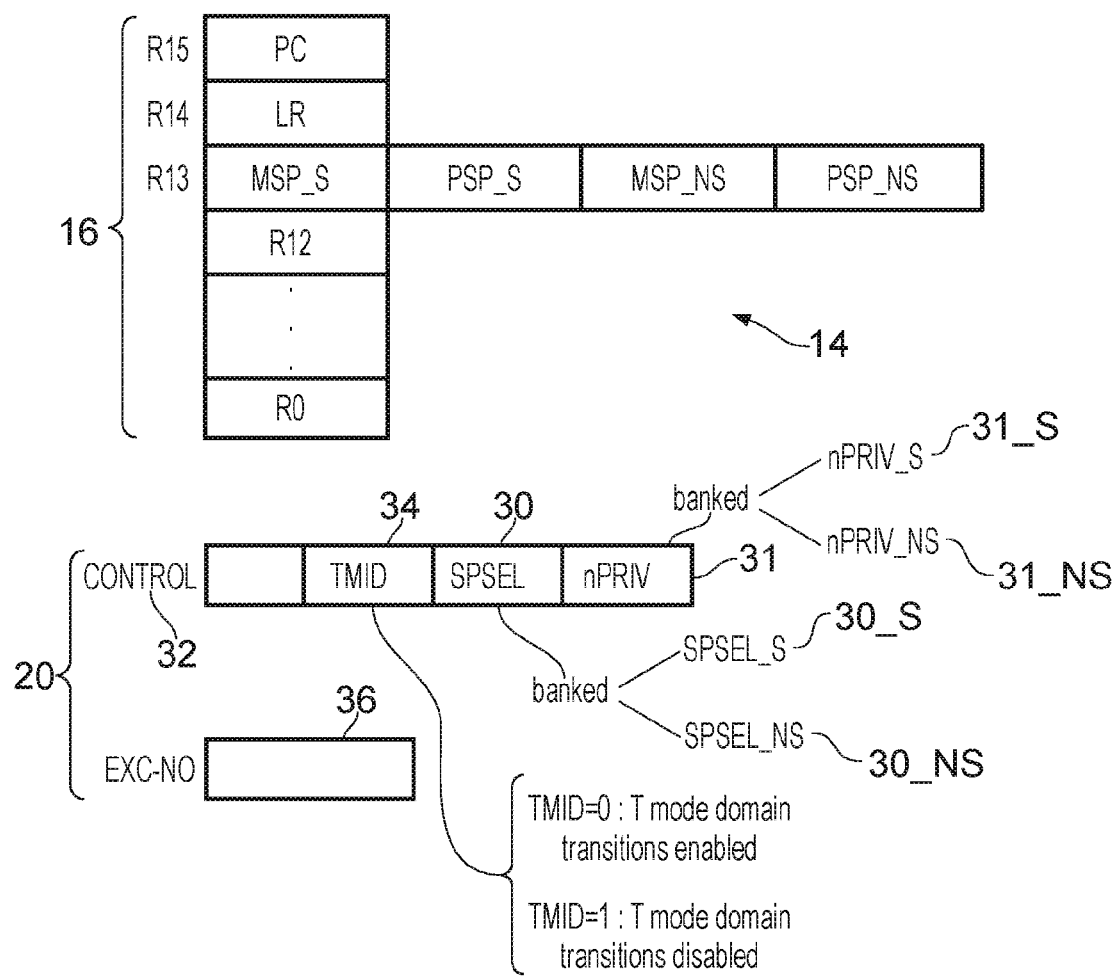
FIG. 3 shows an example of registers of the processing circuitry.

FIG. 3 shows some of the registers 14 of the processing system. It will be appreciated that this representation does not show all of the possible registers which may be provided, and many other registers may also be provided. As shown in FIG. 3, the registers 14 include the general purpose registers 16, and a number of control registers 20 (only some of the control registers are shown in FIG. 3—others can also be provided). In this example there are 16 general purpose registers provided, labelled R0 to R15. In some embodiments, the general purpose registers 16 may also include a program status register (XPSR) that may hold condition flag values and other information related to the current context.

Among the general purpose registers R0 to R15, registers R0 to R12 are used for storing general purpose operands, such as the input operands for arithmetic or logical instructions or the operands used to derive addresses for load/store instructions for accessing the memory system 6. It may be possible to use the general purpose registers R13 to R15 for such general purpose operands, but they also serve other control functions.

Register R15 is used as a program counter (PC) register which stores a program counter which provides an indication of the current point of the program reached by the processing circuitry 4. The program counter register can be used by the fetch stage 8 to determine which instructions to fetch from the memory system.

Register R14 is used as a link register (LR) which is used for storing function return addresses when a function is called so that when the processing associated with the function is complete then the address in the link register can be used to redirect the program flow back to the next instruction after the function calling instruction. Also the link register can be used on occurrence of an exception to store an exception return value which provides information for controlling unstacking of architectural state when the corresponding exception return condition is encountered. Similarly the link register may also be used store a dummy function return address when an intermodal or inter-domain function call is performed. These will be discussed in more detail below.

Register R13 is used as a stack pointer register which provides a stack pointer indicating an address of a stack data structure in memory. The stack data structure can be used for saving architectural state when an exception condition occurs and for restoring architectural state when an exception return condition occurs. As shown in FIG. 3, register R13 is banked so that a number of different physical registers are provided in hardware, each accessible using the register specifier R13, how a particular banked register is selected when R13 is specified may depend on a number of factors, including the current security domain and mode of the processing circuitry, and also the value of configuration registers.

For example the banked stack pointer registers may include a secure main stack pointer register (MSP_S), a secure process stack pointer register (PSP_S), a less secure main stack pointer register (MSP_NS) and a less secure process stack pointer register (PSP_NS). In general the secure stack pointer registers MSP_S and PSP_S are accessible to the processing circuitry 4 when in the secure domain S but are inaccessible when in the less secure domain NS. The less secure stack pointer register MSP_NS and PSP_NS are accessible in the less secure domain. Some implementations may provide additional ways of accessing the banked stack pointers, which may give the secure domain access to the stack pointers associated with the less secure domain (MSP_NS and PSP_NS). In general, the process stack pointers PSP_S or PSP_NS are expected to be used within thread mode T, and the main stack pointers MSP_S or MSP_NS are expected to be used within handler mode H. The provision of separate main and process stacks for handler mode and thread mode respective can make development of exception handler code simpler, as it means that any data which exception handlers may leave on the main stacks is not generally accessible to the thread running in thread mode after exception return. This can simplify development of exception handler code as the exception handler does not need to include instructions for clearing all of its data from the main stack data structure. However, it is possible for processes in thread mode T to use the main stack pointer, with a stack pointer selection value 30 stored in a control register 32 controlling whether the main stack pointer or the process stack pointer should be used when in thread mode T. Hence, which stack pointer should be used may be determined based not only on the combination of the current mode (thread or handler) and current domain (secure or less secure) but also on the stack pointer selection value 30. As shown in FIG. 3, the stack pointer selection value 30 may be banked between the security states, so that the secure and less secure domains can independently control whether secure and less secure thread mode respectively use the main stack pointer or process stack pointer, using separate secure and less-secure versions 30-S, 30-NS of the stack pointer selection value 30. The current security domain controls which banked version 30-S, 30-NS is read/written.

In general, within the body of an exception handler operating in handler mode H or the thread operating in thread mode T, the choice of secure or non-secure stack pointer may depend on the current security domain in which the processing circuitry 4 is executing code. For exception entry and return, the stacking and unstacking of state is performed from the stack identified by the stack pointer which is associated with the security domain of the background code which was running before the exception occurred.

The control register 32 may also include a privilege control value (nPRIV) 31 which controls whether code executed in thread mode is privileged or unprivileged. The privilege control value could be set differently for the secure and less secure domains (e.g. secure thread mode could be unprivileged while less secure thread mode could be privileged, or vice versa). Alternatively both secure and less secure thread mode could operate at the same level of privilege. It will be appreciated that the privilege control value 31 is just one example, and there may be other ways of using architectural state stored in a control register to control the level of privilege assigned to code in secure/less secure thread mode. In the example of FIG. 3, the privilege control value 31 is banked so that separate secure and less-secure privilege control values 31-S and 31_NS are provided for controlling the privilege level used by thread mode in the secure and less secure domains respectively. However, another approach could be to provide a single control bit which is switched on domain transitions.

As shown in FIG. 3, the control register 32 also includes a thread mode interstating disable (TMID) parameter 34, also referred to as domain transition disable configuration parameter, for controlling whether transitions between the secure and less secure domains in thread mode are enabled or disabled. This will be discussed in more detail below. Unlike the stack pointer selection value 30 and privilege value 31, the TIMID 34 value is shared between security states. The TMID parameter 34 can be used to disable transitions between secure and less secure domains in thread mode, which as described further below can be useful for enabling lazy configuration of resources for one of the secure/less secure domains as the disabling of the domain transitions (triggering a fault if an attempt is made to perform a disabled domain transitions) means that threads can be confined to a single domain.

As shown in FIG. 3, the control registers 20 also include a register providing an exception number 36. The exception number 36 may not be the only value stored in this control register—other state could be stored in the same register. The exception number identifies the exception associated with the currently executing exception handler when the system is in handler mode. When the system is in thread mode then the exception number 36 is set to a certain default value (e.g. 0) which indicates that no exception is currently being processed. Hence, the exception number 36 effectively also is an indication of whether the system is currently in thread mode or handler mode, since if the exception number registered 36 specifies the special value (e.g. 0) then the system is in thread mode and if any other value is specified then the system is in handler mode and the particular non-zero value identifies the current exception being handled. Hence, there may be no need for a separate register indicating the current mode in which the system is operating. While not shown in FIG. 3, there may be a control register which indicates whether the current domain is the secure or less secure domain. Alternatively, such a register may not be necessary as it may be implicit from the determination of whether the address of an instruction being processed is in the secure region or less secure regions of memory as defined by the SAU 24.

Figure 4:
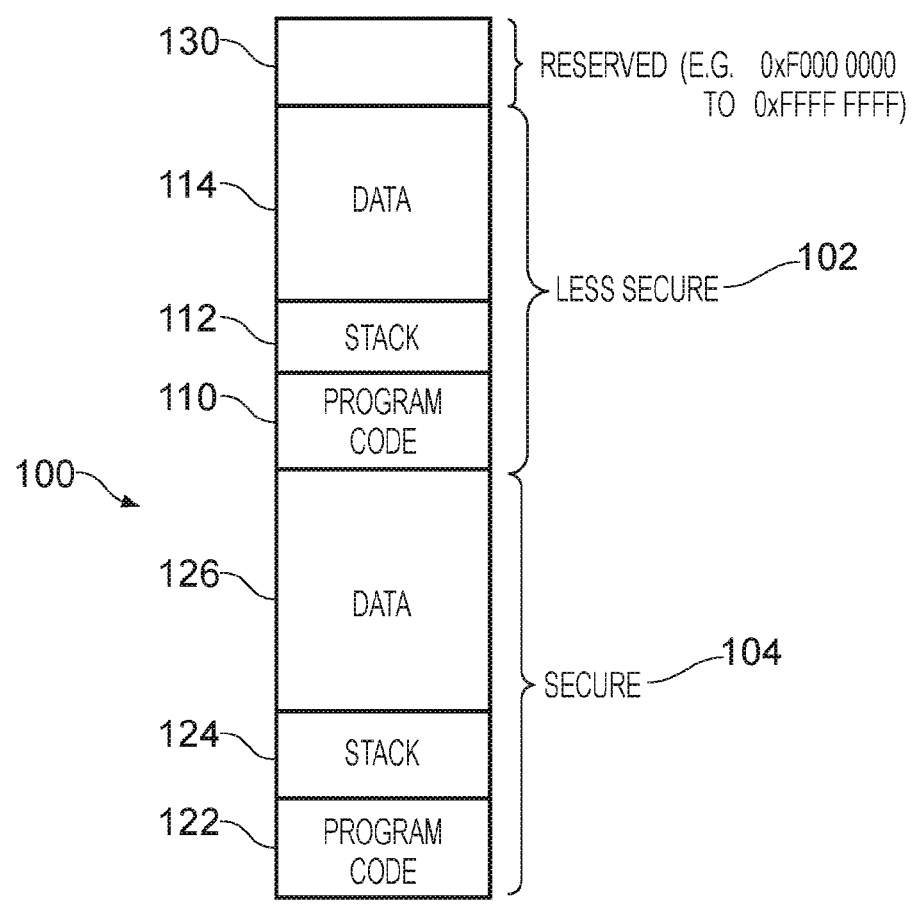
FIG. 4 illustrates the provision of a reserved address range which cannot be used for executable instructions.

FIG. 4 shows an example of the memory address space used to address the memory system 6. The memory address space 100 may include one or more less secure regions 102 which are accessible both in the secure and less secure domains and one or more secure regions 104 which are accessible in the secure domain and inaccessible in the less secure domain. Although for ease of explanation FIG. 4 only shows one less secure region 102 and one secure region 104, there may be multiple regions of each type and these regions may be interspersed with each other so it is not necessary for all of the secure regions to be in a continuous block and all of the less secure regions to be in a continuous block. The less secure regions may include less secure program code 110, stack data structures 112 (accessed using the less secure stack pointers MSP_NS and PSP_NS) and less secure data 114. Similarly the secure regions 104 may include secure program code 122 stack data structures 124 (accessed using the secure stack pointers MSP_S and PSP_S) and secure data 126. Again, it is not necessary for the program code, stacks and data within the secure region 104 or the less secure region 102 to be organised in continuous blocks as shown in FIG. 4 and in practice the stacks and program code may be distributed at a number of discontinuous blocks interspersed with other data. The particular allocation of memory within the executable range of addresses may be chosen by software executing on the processing system and is not fixed by the hardware.

As shown in FIG. 4, the memory address space 100 includes a reserved region 130, which in this example comprises addresses greater than or equal to 0xF0000000 (represented in hexadecimal—it will be appreciated that other examples could choose a different address range as the reserved region 130). The reserved region 130 represents a range of addresses which are not allowed to provide executable instructions. Some of these reserved addresses may be assigned for special purposes, such as indicating a function return or an exception return as described further below. If an attempt is made to fetch an instruction from one of the reserved addresses 130, then the instruction fetch stage 8 may signal a fault. These reserved addresses may provide opportunities for future versions of the architecture to allocate additional addresses for special purposes so that an attempt to fetch an instruction form one of these addresses may be interpreted as signalling that a given event is be processed.

Figure 5:
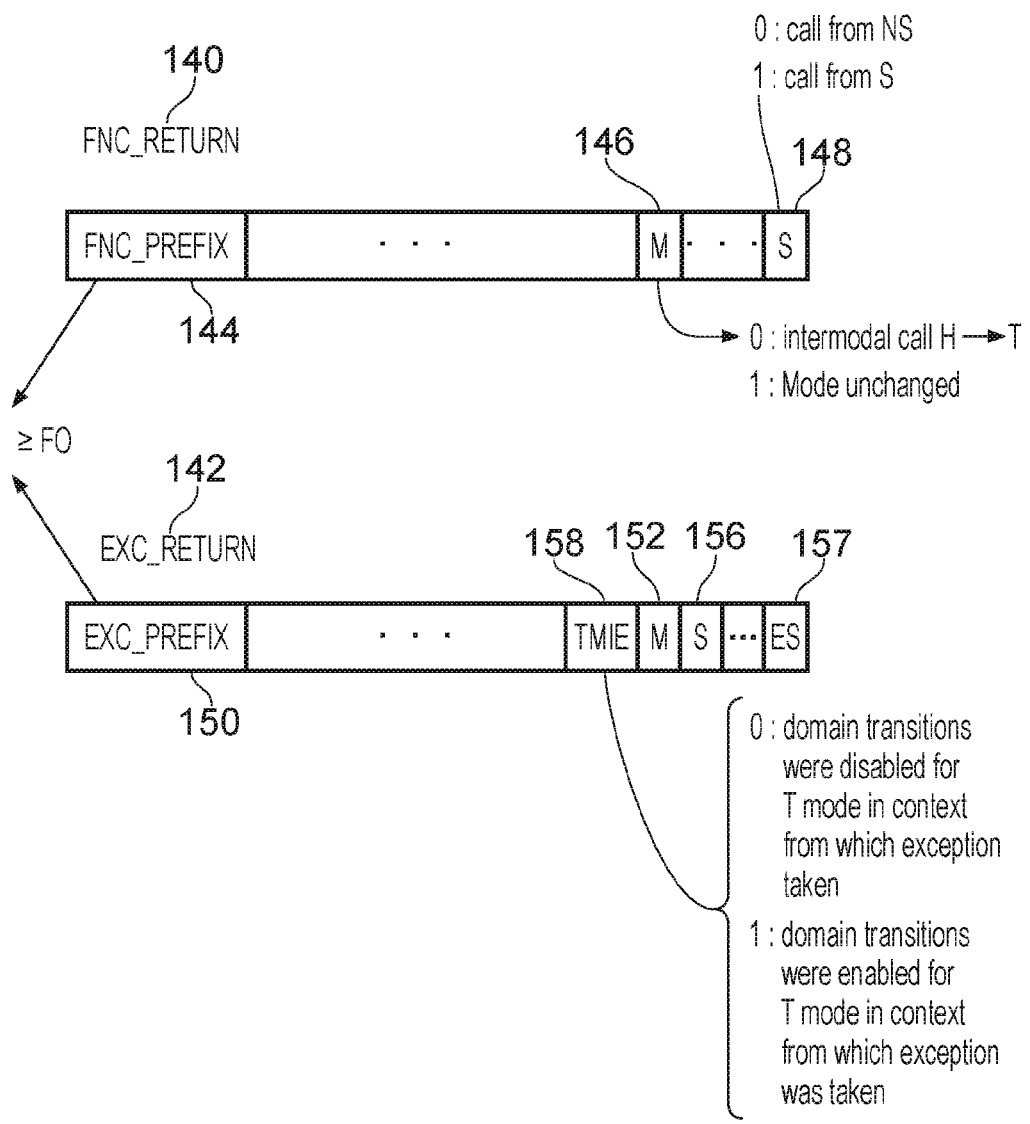
FIG. 5 illustrates a dummy function return address and a dummy exception return address.

As shown in FIG. 5, some of the reserved range of addresses are allocated to represent a special dummy function return address 140 and dummy exception return address 142 which are used to indicate function return for certain domain/mode transitions and exception return operations. The dummy function return address 140 is any of a group of addresses within the reserved range 130 which has its most significant portion of bits 144 set to a certain function return prefix value 144. In this example, the function prefix has a value greater than or equal to 0xF0 so that the dummy function return address is in the reserved range 130. The dummy function return address is used to signal that, if an attempt is made to fetch or execute an instruction from that dummy function return address, then a function return operation should be performed. In some implementations it may be that at attempt to set the program counter (PC) (either by a branch, or some other instruction like a load that targets the PC) to the dummy reserved address triggers the function return operation, instead of the instruction fetch. To simplify the hardware it may be that only a subset of instructions (those typically used to perform function returns) that can set the PC can actually trigger the function return operation. This provides a mechanism for avoiding the need to expose the real function return address for an intermodal or inter-domain function call in the link register R14, so that it cannot be accessed by less secure or less privileged code.

The dummy function return address 140 includes a number of pieces of status information which can be set on performing an intermodal or inter-domain function call, to indicate properties of the function call and/or information about how the corresponding function return is to be handled. In this example, the dummy function return address 140 includes an intermodal call flag (M) 146 which indicates whether the dummy function return address was set in response to an intermodal function call from handler mode to thread mode or a non-intermodal call which remained within the same mode (either remaining in handler mode or remaining in thread mode). In this example the intermodal call flag 146 is encoded so that if it has a value of 0 then this indicates the intermodal call and if the flag 146 is 1 then this indicates that the mode remained unchanged during the corresponding function call. The intermodal call flag 146 can be used on function return to determine whether the current mode should be switched back from thread mode to handler mode or should remain unchanged.

Also, the dummy function return address 140 includes a security domain indicator (S) 148 which indicates whether the corresponding function call was made from the less secure domain or the secure domain. In this example, the security domain indicator is encoded so that it is set to 1 if the call was made from the secure domain and 0 if the call was made from the less secure domain. It will be appreciated that the particular encoding of the flags 146, 148 shown in the dummy function return address 140 are just one example and other approaches could use a different encoding. Also, the dummy function return address could include additional status flags not shown in FIG. 5. In some implementations a secure gateway instruction is placed at the start of secure functions that are callable from the less secure domain. This secure gateway instruction may cause the processing circuitry to perform the transition from the less secure domain to the secure domain. So a subsequent function return can determine whether the function was called from the secure or the less secure domain, and therefore which domain execution should return to, the secure gateway instruction may clear the least significant bit of the return address in the link register if the secure gateway instruction performed a transition from the less secure to the secure domain. As will be discussed later on, placing S 148 in the least significant bit of the dummy function return address, and encoding the S 148 indicator such that 0 indicates the less secure domain, may provide additional security protection when used in combination with the secure gateway instruction behaviour described above. It will be appreciated that while in the implementation described above, the value 0 of S 148 is indicative of the less secure state, and that the secure gateway instruction clears the least significant bit of the return address, the desired behaviour can also be achieved with other encoding of the S 148 field. For example if a value of 1 for S 148 was indicative of the less secure state then the secure gateway instruction would set the least significant bit of the return address to 1.

The dummy exception return address 142 is saved to the link register in response to certain exception entry transitions, and in a similar way to the dummy function return address 140 provides a mechanism for enabling the actual exception return address to be saved to (and subsequently restored from) the stack to hide it from less secure processes being executed following the exception. The dummy exception return address 142 includes an exception return prefix 150 in the most significant bit portion of the dummy exception return address 142, which again has a value greater than or equal to 0xF0 to ensure the exception return address is in the reserved range 130. The exception return prefix 150 is different from the function prefix 144 so that the dummy function/exception return addresses 140, 142 can be distinguished from each other.

The dummy exception return address 142 includes a mode flag 152 to indicate the mode (thread or handler) from which the exception was taken, and a security domain flag (S) 156 to indicate the security domain (secure or less secure) from which the exception was taken. In some implementations there may also be an exception security domain flag (ES) 157 indicating which security domain (secure or less secure) the exception was originally taken to. Also, the exception return value includes a thread mode interstating enabled (TMIE) value 158 which indicates whether, prior to taking the exception, the TMID flag 34 indicated that domain transitions were disabled or enabled in thread mode in the context from which the exception was taken. For backwards compatibility reasons (so that legacy code expected to set the bit corresponding to 158 to 1 will represent the TMIE flag 158 as enabling domain transitions in thread mode), the TMIE flag 158 in the dummy exception return address has the opposite encoding to the TMID flag 34 in the control register 32 so that the value of the TMID flag for the current security domain is inverted when setting the TMIE flag 158 in the dummy exception return address 142. The TMIE flag 158 is not itself needed to control an exception return operation, but saving the TMIE flag 158 to the dummy exception return address effectively provides context saving/restoration functionality so that on returning form the exception the value of the TMID flag 34 in the control register 32 for the process being returned to can be restored to the state it was in before the exception was taken. On returning from an exception, the value of the TMIE flag 158 is again inverted, and the inverted value is written to the TMID flag 34 in the control register 32. While FIG. 5 shows a particular encoding for the TMIE flag 158, this encoding is not essential and other ways of representing the value to be restored to TMID 34 could be used.

Note that as the status information 146, 148, 152, 156, 157, 158 recorded in the dummy function return address 140 and dummy exception return address 142 can take different values, this means there are multiple different addresses in the reserved range 130 which each behave as a dummy function return addresses 140, and multiple different addresses which each behave as the dummy exception return address 142. Hence, the particular dummy address saved to the link register R14 on calling a function or entering an exception is selected based on the information to be encoded in the status flags.

Figure 6:
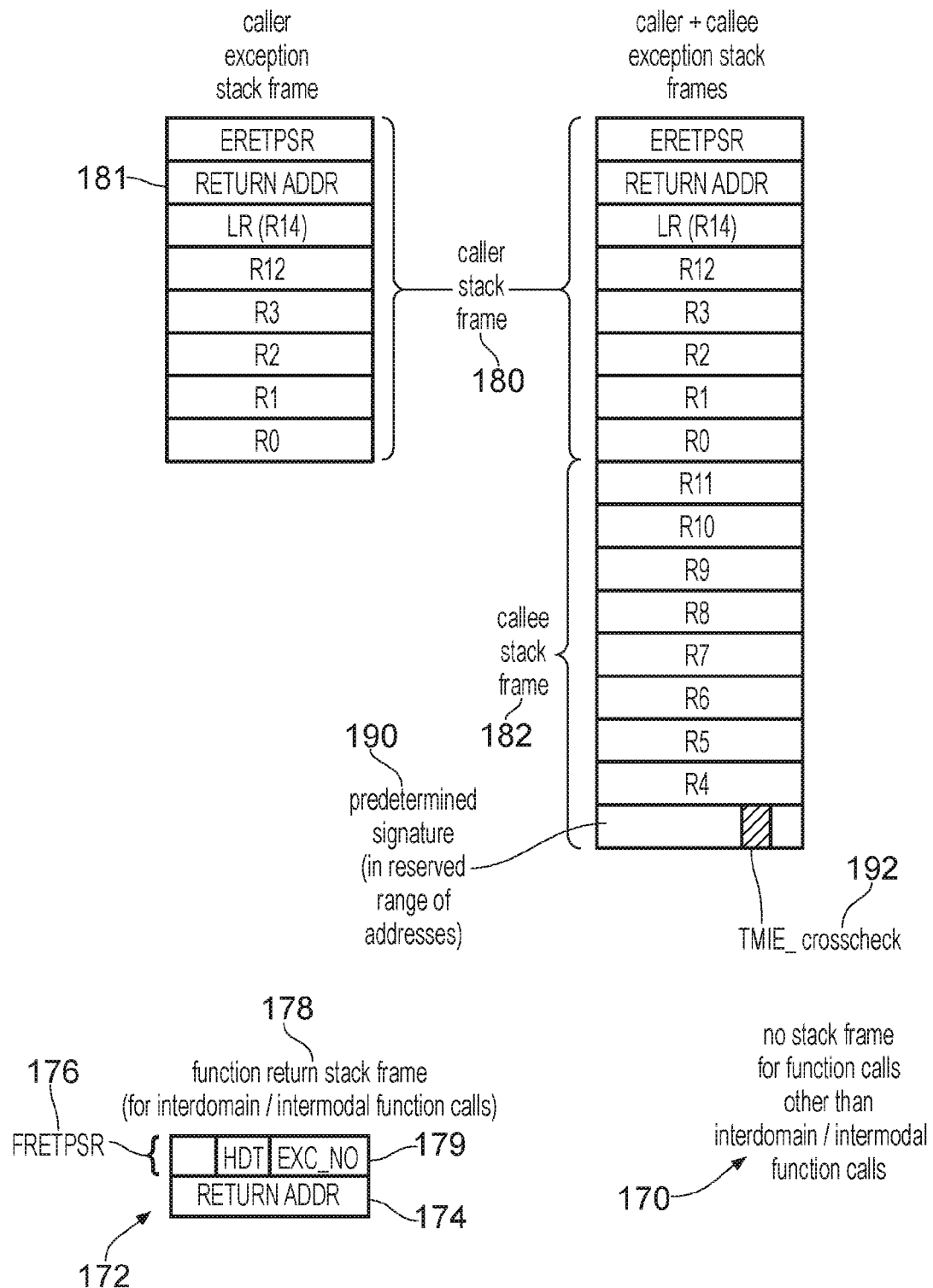
FIG. 6 illustrates different stack frames which may be saved to a stack in response to function calls or exceptions.

FIG. 6 shows examples of different stack frames that may be saved to a stack data structure in memory on performing an intermodal or inter-domain function call, or on entry to an exception. The particular stack data structure to which the stack frame is saved depends on the current mode and security domain at the time of the function call or exception, and if currently in thread mode then the stack selected also depends on the stack pointer selection value 30 associated with the current domain as described earlier.

As shown in part 170 of FIG. 6, for function calls other than interdomain/intermodal function calls (which do not trigger any transition of mode or domain), no stack frame needs to be stored to the stack, as for function calls within the same mode and domain the real function return address can simply be saved to the link register R14 and there is no need to hide the function return address from the code being executed after the function call.

For interdomain function calls or intermodal function calls from the secure domain to the less secure domain, a function return stack frame 172 is saved to the stack. For interdomain function calls from the secure domain to the less secure domain, the stack frame 172 is saved to the secure stack indicated by one of the secure stack pointers. If the interdomain function call is made from handler mode then this will be the secure main stack pointer MSP_S while if the interdomain call is made from thread mode then the stack frame is saved to the one of the secure main stack (MSP_S) and secure process stack (PSP_S) whose pointer is indicated by the stack pointer selection value 30-S for the secure domain. For intermodal function calls, these are by default made from handler mode, and so the main stack pointer associated with the current security domain is used.

As shown in FIG. 6, the function return stack frame 172 includes a return address 174 which represents the real function return address to which processing is to return when returning from the function that was called. The real function return address can be set to the address of the next instruction which follows sequentially from the address of the function calling branch instruction. Also, the function return stack frame includes a status data word 176 (FRETPSR) which provides information for determining how to handle the corresponding function return. In this example, this includes a handler deprivileged to thread mode (HDT) flag 178 which indicates whether the function return stack frame 172 was saved in response to an intermodal function call made from handler mode to thread mode. For example the HDT flag may have a value of 0 if the function call was not an intermodal function call and so did not result in handler mode being deprivileged to thread mode, and may have a value of 1 if the function call was an intermodal function call. Also the status data word 176 includes an exception number value 179 which corresponds to the value of the exception number register 36 at the time the function was called. This acts as a "handler mode indicating value" which indicates whether the function return stack frame was saved in response to a function called from the handler mode or the thread mode. It will be appreciated that other information could also be stored within the function return status word 176, or within other parts of the function return stack frame 172.

Examples of exception stack frames 180, 182 are shown in the upper part of FIG. 6. In response to an exception, one or both of a first (caller) stack frame 180 and a second (callee) stack frame 182 is saved to the stack. For performance reasons, it can be useful to divide the registers which may need to be saved in response to exception entry events into two groups, referred to as "caller" registers and "callee" registers. The caller registers are registers for which the exception control circuitry 28 implemented in hardware has responsibility for saving to the stack. Hence, there is no need for software of the exception handler to include instructions for saving the caller registers to the stack data structure.

As shown in FIG. 6, the caller registers (included in the caller stack frame 180) may include a subset of the general purpose registers. In this example, the caller state includes general purpose registers R0, R1, R2, R3 and R12, the link register LR (R14), an indication of the return address 181 to which processing is to be returned after processing of the exception (which can be set to a value derived from the program counter register R15 at the time the exception was taken), and an exception return program status value (ERETPSR) which is set based on values in a program status register XPSR which may provide condition codes for controlling outcomes of conditional instructions and other status information relating to the current state of processing. ERETPSR may also specify the exception number 36 of the processing being performed prior to the exception being taken, which may have a default value of 0 if the processing circuitry was operating in thread mode prior to the exception being taken. It will be appreciated that this is just one particular example of which register state could be included in the caller register state. Some examples may also include floating point register state in the caller stack frame, and it may be configurable whether or not the floating point register state should be included or not (e.g. depending on whether the thread being executed has floating point state enabled).

For exceptions where only the caller stack frame 180 is saved to the stack, after the caller stack frame 180 has been saved to the stack by the exception control circuitry 28 in response to the exception event, the execution of the exception handling code may start, and then the exception handler software may save state from additional callee registers onto the stack, if it knows it will be overwriting this state during its execution. However, this state saving by the exception handler is performed by controlling a load/store unit of the processing circuitry 4 to save the relevant data off to memory in response to load/store instructions provided in the exception handler code, which may be slower than if the exception control circuitry 28 controlled the stacking in hardware. However, it can be beneficial to allow a partition between the caller and callee register state, so that the software executing after the exception has been entered can influence which registers are needed to be saved. If the exception handler will never access a particular callee register (general purpose register R7, for example) then the exception handler does not need to save the corresponding architectural state and the energy and time associated with having done this state saving in exception control circuitry 28 and hardware has also been avoided. Writers of code for exception handlers, or compilers of such code, could be encouraged to first use the caller registers before using the additional callee registers, to reduce the chance that additional state saving in software is needed.

However, if the exception entry causes a transition from the secure domain to the less secure domain and the original background processing being performed in the secure domain before the exception, then if only the caller registers are saved to memory by the exception control circuitry 28 this may leave the callee registers accessible within the register bank 14 to the less secure exception handler to be executed after the latest exception. This may be undesirable as the callee registers could include information derived from secure regions of the memory address space which the SAU 24 would otherwise prevent the less secure exception handler accessing.

Therefore, for certain transitions from the secure domain to the less secure domain where background processing was previously performed in the secure domain, the exception control circuitry 28 may, in addition to saving of the caller registers, also save the callee registers to the relevant stack data structure and may clear contents of the registers that have been saved (including caller and callee registers). Hence by performing additional state saving in hardware, this means that the less secure software which would normally save the callee registers in this case cannot gain access to potentially secure information stored in these registers before the exception occurred.

Hence, for certain exception entry transitions, in addition to storing the caller stack frame 180, a second (callee) stack frame 182 may also be saved to the stack (under hardware control by the exception control circuitry 28, i.e. without needing explicit load/store instructions to be executed by the processing circuitry 4). Note that while in FIG. 6 the callee stack frame is referenced as a separate stack frame from the caller stack frame, others may view the callee stack frame as an extension of the caller stack frame, so that the combination of 180, 182 is viewed as a single stack frame. Both approaches can be viewed as equivalent.

The callee stack frame 182 includes the additional callee state including registers R4-R11 which were not saved in the caller stack frame 180. Optionally floating point context could also be included in the callee stack frame 182. The additional state saved by the hardware may also include a predetermined integrity signature 190. The integrity signature 190 is included in the callee stack frame 182 when both caller and callee state is saved by the exception control hardware 28, but is missing from the caller exception stack frame 180. The integrity signature 190 has a value corresponding to one of the reserved range of non-executable addresses 130, so that a fault would be signalled if there is an attempt to fetch an instruction from it. The integrity signature 190 may have a value which cannot match any valid dummy function return address 140 or dummy exception return address 142. The integrity signature 190 can be used to detect certain forms of attack which may be mounted on the processing circuitry to try to circumvent the security protections provided by the hardware enforcing the partitioning between the secure and less secure domains. One possible avenue for attack can be that the attacker attempts to perform an exception entry transition to enter into processing of the exception, but then later fakes a different type of return transition to the one expected to return from the exception entry, such as performing a function return transition. The signature 190 is located at the same relative position on the stack frame as the relative position used in the function return stack frame 172 to store the function return address 174. Hence, if it is detected on a function return that the return address 174 matches the integrity signature 190 (or that it corresponds to any of the non-executable reserved address 130), a fault can be triggered, as it means that the stack frame being used to perform the function return was actually saved to the stack in response to an exception entry event, which could be an indicator that an attack is being performed. Also, on returning from an exception for which the additional architectural state associated with the callee registers is present on the stack, part of the security checking may be checking whether the value at the relevant offset in the stack corresponding to the integrity signature 190 has the expected value, as the lack of the signature may indicate that an exception return event is being performed based on a stack frame saved to memory in response to a function call, which again could risk a security violation.

As shown in FIG. 6, as part of the predetermined signature value 190, a TMIE crosscheck value 192 may be stored within one of the bits of the predetermined signature 190 (so effectively there may be two or more valid values of the predetermined signature 190 which each are within the reserved range 130 of addresses, but separate from the addresses used for the dummy function return and dummy exception return values). When taking an exception for which the callee stack frame 182 is saved, the TMIE crosscheck value 192 is set to a value indicative of the state of the TMIE flag 158 written to the dummy exception return address 142 in the link register (e.g. the crosscheck value 192 could be equal to the TMIE flag 158, or could be inverted relative to the TMIE flag 158, or use another encoding to represent the state of the TMIE flag). In cases when the callee stack frame 182 is saved to the stack, this indicates that the exception is being taken from secure domain to less secure domain in cases where the original background processing performed before the exception was in the secure domain, so there could be a risk that the less secure code executed following the exception could modify the TMIE value in the dummy exception return address 142 in an attempt to prevent the secure code functioning correctly following exception return. The TMIE cross check value 192 provides a cross check to detect tampering with the TMIE value 158.

In some system implementations, it may sometimes be desirable for certain types of exception to have their exception handlers executed in an unprivileged state. This can be useful because for certain types of exceptions associated with devices controlled by library code provided by an untrusted third party, it may not be desirable to allow the exception handler provided with the untrusted third party to have the full privileges available to the handler mode, as they cannot be trusted not to modify certain state information for example. However, as shown in FIG. 2 the handler mode operates in the privileged state by default and so for an exception handler to operate in an unprivileged state this would require a switch back to the thread mode. However, in typical implementations the mechanism for switching from handler mode to thread mode would be via an exception return. It would generally be undesirable for the original exception to trigger an exception return (after modifying the return address so the return goes to the unprivileged library code instead of the previous background processing), as this would drop the execution priority of the original exception. Dropping the execution priority in this way can prevent exception handling routines from being correctly prioritised. Hence, it would be preferable if it was possible for the handler code which is handling the original exception to be able to switch to thread mode without triggering an exception return.

Figure 7:
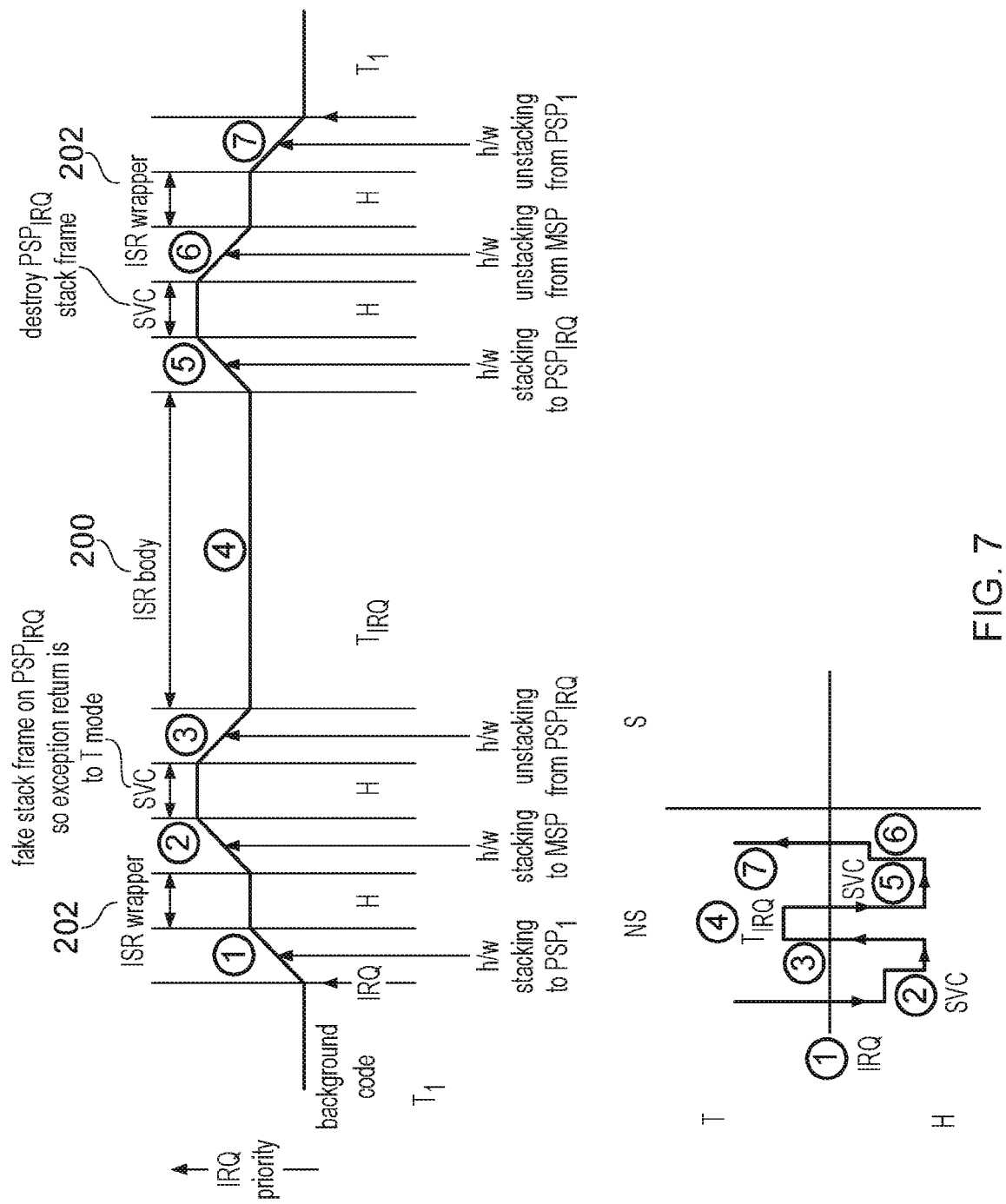
FIG. 7 shows, for comparison, an example of exception deprivileging if intermodal calling branch instructions were not supported.

In typical systems, as the only mechanism for switching from handler to thread mode is via an exception return, then as shown in FIG. 7, to be able to deprivilege the exception handler for handling the original exception, then this would require a further exception to be generated (for example a supervisor call exception, SVC), so that an exception return stack frame can be set up in memory which does not represent real processing context being performed before the exception, but is faked so as to ensure that when the SVC exception is returned from then the processing will switch to the thread mode so that the body of the previously occurring exception can be handled in the thread mode in an unprivileged state.

For example, as shown in FIG. 7, when processing some background code in a thread $T_1$ in the thread mode, an interrupt IRQ occurs which is of a type which is to be passed to an unprivileged library. At step 1 of FIG. 7, the interrupt causes the exception control circuitry 28 to trigger stacking of register state to the process stack, to preserve the register state of thread $T_1$. The interrupt causes a transition from the thread mode to the handler mode, since exceptions are to be taken by default in the handler mode initially. While the main body 200 of the exception handler for dealing with the IRQ exception is to be executed by an untrusted library, the exception handler for dealing with the IRQ exception is provided with wrapper code 202 to be executed before and after the main exception handler body 200, with the wrapper code being executed in the handler mode and controlling the operations for generating the SVC exception for ensuring that the main body can be handled in the thread mode.

Hence at step 2 in FIG. 7 the wrapper code in handler mode generates the SVC exception which is not really dealing with the original IRQ interrupt but is generated solely to enable the IRQ handler to switch to thread mode. The SVC exception causes the exception control circuitry 28 to perform stacking of register state to the main stack pointed to by the main stack pointer MSP associated with the current domain (since the current mode is handler mode, the main stack is used). The SVC exception handler executed in response to the SVC exception switches the process stack pointer to point to a different stack structure $PSP_{IRQ}$ which is associated with a thread $T_{IRQ}$ which is to execute the main exception handler body 200 for dealing with the original IRQ exception. The SVC exception handler fakes a stack frame on the process stack which indicates, in its exception return status information (ERETPSR), an exception number of zero to indicate that the corresponding exception return should return to thread mode. Note that this value is fake because the processing being performed before the SVC exception was actually in handler mode.

When the SVC exception handler is completed it causes a branch to a fake dummy exception return address that triggers an exception return using the fake exception return stack frame created on the stack pointed to by $PSP_{IRQ}$ rather than the exception stack frame created on the main stack in step 2. The exception return is then performed by the exception control circuitry 28, which at step 3 of FIG. 7 causes hardware unstacking from the $PSP_{IRQ}$ stack. The hardware detects that the M bit 152 in the fake dummy exception return address 142 indicates that the return should be to the thread mode, and therefore at step 4 the subsequent main body of the exception handler 200 for dealing with the IRQ exception can be executed in thread mode by the unprivileged library. Note that this has been done without returning from the original IRQ exception, and therefore the priority of the exception handler for dealing with the IRQ exception has not been reduced.

Once the main exception handler body 200 completes, then at step 5 another SVC exception call is made (SVC is a type of exception which can be triggered by software voluntarily, rather than a type of exception triggered by an unexpected or faulty event), which again causes further hardware stacking to the process stack pointed to by $PSP_{IRQ}$ and the called SVC handler then destroys the stack frame that has just been created on the process stack pointed to by $PSP_{IRQ}$ and then updates the process stack pointer for the current security domain to restore the previous stack pointer $PSP_1$ which was associated with the background thread $T_1$. At step 6 of FIG. 7 the SVC exception generates an exception return, which then triggers further hardware unstacking from the main stack using MSP (i.e. unstacking the stack frame created during step 2) and then after executing any remaining wrapper functions 202 in the handler mode, then at step 7 a further exception return is generated which causes hardware unstacking of the register state associated with thread $T_1$ from the process stack pointed to by $PSP_1$ (i.e. unstacking the stack frame created during step 1). Processing then continues in the background code of thread $T_1$ executing in thread mode.

The process shown in FIG. 7 enables certain types of exceptions to be deprivileged so that their exception handlers operate in thread mode. However, it has a number of disadvantages. Firstly, it is difficult to generate the software code for controlling this process due to the faking of exception stack frames that is required, and so may be prone to errors by programmers, which can provide vulnerabilities which an attacker may exploit or which may stop the system functioning correctly, or to provide a way for an attacker to extract secret values such as encryption keys.

Another disadvantage is that for this approach to work the exception priority of the SVC exceptions (performed at the beginning and end of the main exception handler body 200 to create the fake stack frame and clean up before the returning from the original exception) must be higher than the priority of every interrupt IRQ that needs to be deprivileged. This can make the design of real time systems much more complex because the SVC exceptions are always taken to the same priority and so the worst case interrupt latency for other IRQ exceptions is lengthened by the duration of the longest SVC call. This may be undesirable.

Also, the approach shown in FIG. 7 is very slow, which is a major blocker to the use of unprivileged libraries that have critical interrupt latencies. This poor performance is due to multiple factors, including the manual creation of exception stack frames when processing the SVC exception between steps 2 and 3 of FIG. 7 and the fact that two different SVC exceptions are required which triggers four additional register state stacking and unstacking events at steps 2, 3, 5 and 6 of FIG. 7, which represent memory access latency which would not be needed if the exception handler for dealing with IRQ was simply executed in the handler mode. Hence, the performance cost may mean that some system designers may feel they simply cannot use devices such as wireless network interfaces or USB controllers associated with untrusted library code, which may limit the flexibility in system design. As shown in the bottom part of FIG. 7, the entire deprivileging process is performed in the less secure domain in this example, but it will be appreciated that the process may also be performed within the secure domain.

Figure 8:
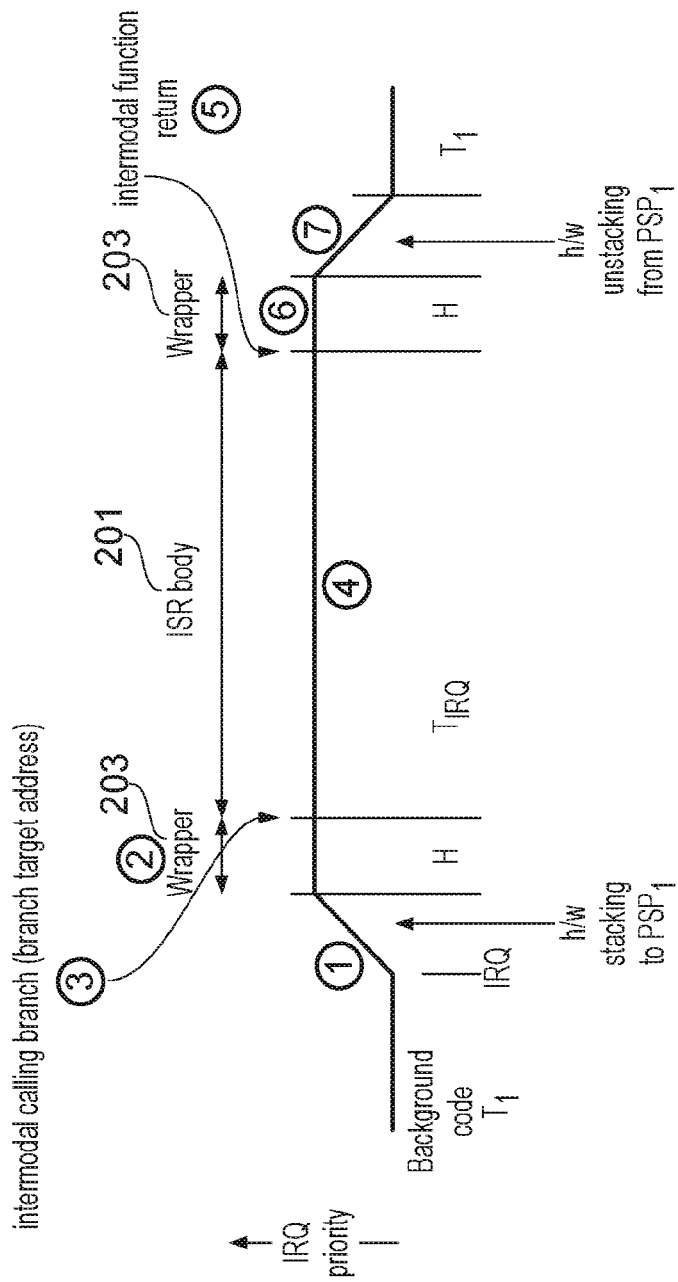
FIG. 8 shows an example of exception deprivileging using an intermodal calling branch instruction.
Figure 8:
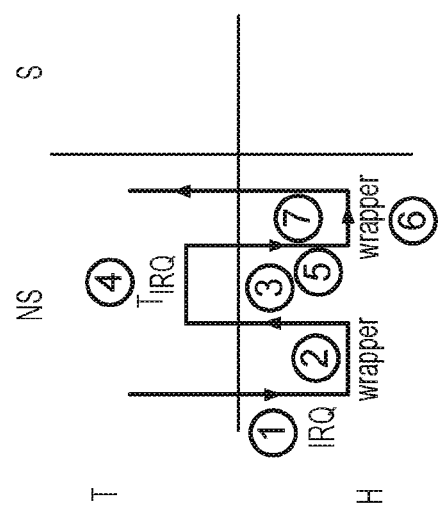

FIG. 8 shows an alternative approach which uses an intermodal calling branch instruction as described in this application to improve the performance of exception deprivileging. By providing an intermodal calling branch instruction which is able to branch to an instruction at a target address specified by the instruction and set a function return address to indicate an address to which processing should return once the function is complete, as well as triggering a switch from the handler mode to the thread mode, this means that interrupts can be deprivileged much faster and reduces the performance hit, complexity and other issues described above associated with the approach shown in FIG. 7. With this approach, the response to the IRQ exception which is to be handled in an unprivileged state can be much simpler.

Step 1 of FIG. 8 is the same as in FIG. 7. At step 2 some wrapper code 203 for preparing for execution of the main interrupt handler body 201 is executed, which has as its last instruction before the main interrupt handler body 201, an intermodal calling branch instruction specifying as a branch target address the address of the first instruction to be executed in the main exception handler body 201. In some operating systems the wrapper 203 may be identical to the wrapper 202 except that it executes an intermodal branch instruction instead of triggering an SVC exception. In some implementations the intermodal calling branch instruction may be a dedicated instruction encoding which is different to the instruction encoding for a non-intermodal calling branch instruction which does not transition from handler to thread mode. Hence, at step 3 of FIG. 8, the execution of the intermodal calling branch instruction triggers a switch from the handler mode to the thread mode and then the main exception handler body 201 continues to execute at step 4 of FIG. 8 in the thread mode. There is no need for the SVC exception to be called.

On making the intermodal function call, information may be stored in the dummy function return address 140 to indicate (using the intermodal call indicator 146) that the function call was an intermodal call, so that when a corresponding function return is triggered at step 5 of FIG. 8 then the processing circuitry 4 can detect the indicator 146 and detect that, in addition to branching to the function return address 174 associated with the previous function call (stored in the function return stack frame 178), the current mode should also be switched back from thread mode to handler mode. Some remaining wrapper code 203 then executes in handler mode at step 6 of FIG. 8, followed by step 7 where an exception return is performed to return from the handler into the background thread $T_1$ which was being executed before the IRQ exception occurred. In some systems the main interrupt handler body 201 (in FIG. 8) may be identical to the main interrupt handler body 200 (in FIG. 7) exception that instead of triggering an SVC exception to return from the unprivileged main interrupt handler body, the return can be requested by simply branching to the dummy function return address 140 placed in the link register at step 3 of FIG. 8. As such the main interrupt handler body 201 (in FIG. 8) may be a standard C function, and does not require any special handling.

Hence, with this approach the only hardware stacking and unstacking operations required are those for saving and restoring the register state associated with the background code $T_1$ and there is no need for the further hardware stacking and unstacking operations associated with the two SVC exceptions. Also, this approach is much easier to code for compilers or programmers, reducing the chance of errors, and does not require SVC exceptions to have a higher priority than all exceptions to be deprivileged.

Figure 9:
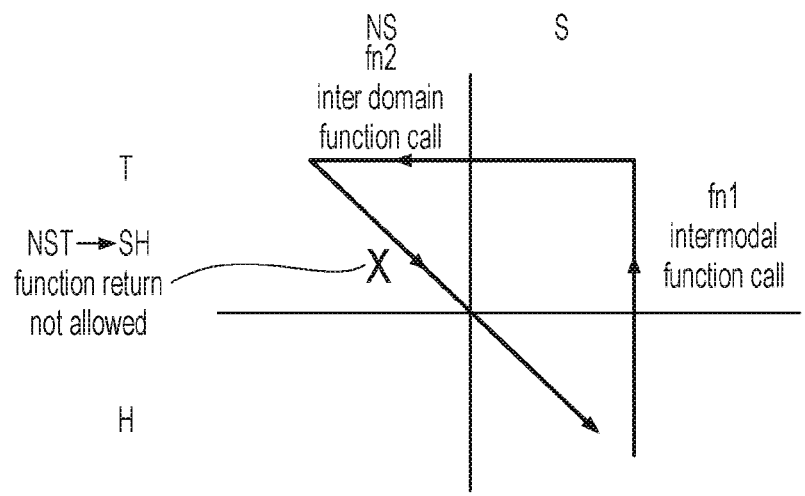
FIG. 9 shows an example of a prohibited combined domain/mode switch.

To improve security by limiting the number of opportunities for switching security domains, intermodal function calls may not be allowed to change security domains but can only change between the modes. Hence, when executing an intermodal function call branch instruction, the processing circuitry 4 may keep the current security domain the same as prior to execution of the intermodal function calling branch instruction. As shown in FIG. 9 a combined domain/mode function return transition from less secure thread mode to secure handler mode may be prohibited to preserve security. This can be enforced by an explicit check of whether a return to the secure domain is being requested on an intermodal function return, and a fault can be triggered if this is detected, as described with reference to FIG. 15 below.

Figure 10:
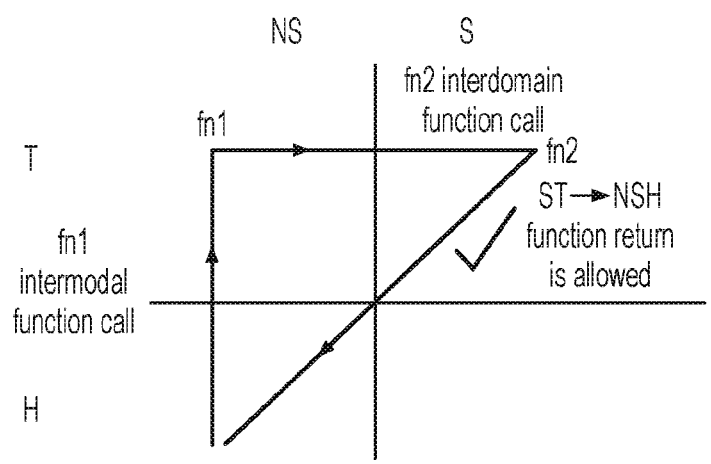
FIG. 10 shows an example of a permitted combined domain/mode switch.
Figure 11A:
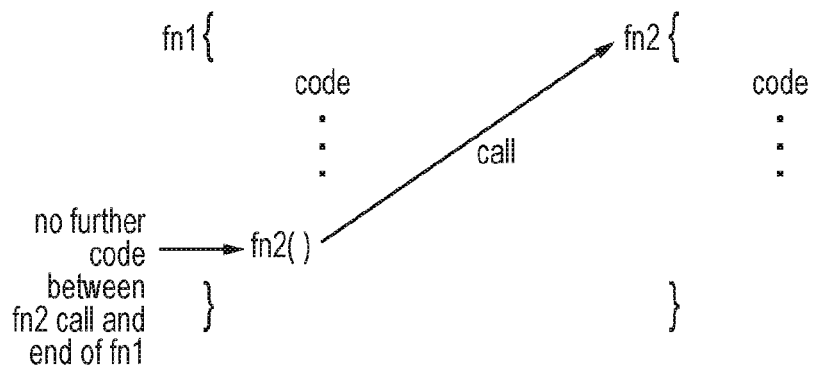
FIGS. 11A to 11C illustrate an example of tail calling for which the combined domain/mode switch of FIG. 10 may be useful.

However, for intermodal function returns, as shown in FIG. 10 it may be desirable to permit combined mode/domain transitions, at least for the case when the intermodal function return is from the secure thread mode to the less secure handler mode. This can enable compilers to use a technique known as tail calling as illustrated in FIGS. 11A to 11O. In some implementations, for security reasons, tail calling may already be prohibited for secure to less secure function calls. As such, although there may be a need to support the secure thread to less secure handler intermodal return transition shown in FIG. 10, there may be no need to support the less secure thread to secure handler intermodal return transition shown in FIG. 9.

As shown in FIG. 11A, some high level code (to be compiled into assembly code supported by the instruction decoder 10 of the processing system) may include nested function calls where a second function fn2 is called inside a first function fn1, and the position of the call to function fn2 is such that there are no further instructions of fn1 between the end of fn2 and the end of fn1.

Figure 11B:
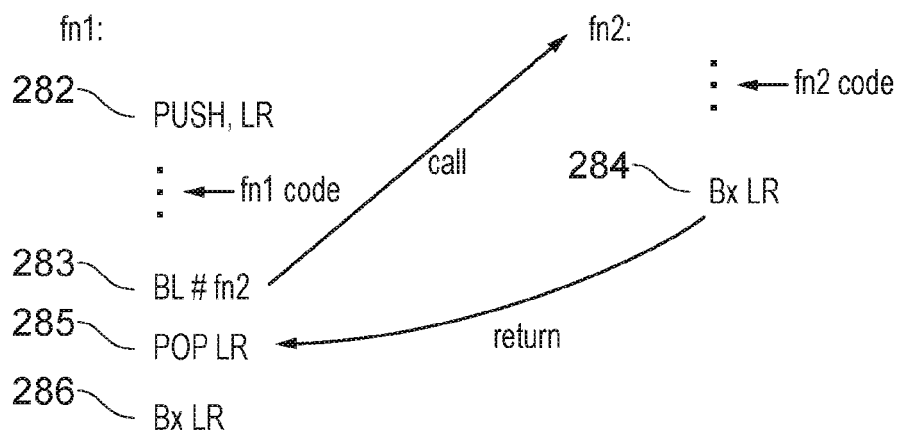

In this scenario, as shown in FIG. 11B, one option for a compiler generating the assembly code may be to generate, for each of the calls to fn1 and fn2, a calling branch instruction (BL, also known as a branch-and-link instruction) which triggers saving of a function return address to the link register LR (R14) and branching to a target address representing the start of the function code for that function, followed by a function return instruction (indirect branch instruction BX which specifies as its address operands the link register) indicating that processing should return to the return address previously saved to the link register. The calling branch instruction for calling fn1 is not shown in FIG. 11B, because it would be part of the code that called fn1, and FIG. 11B only shows the function code for fn1 and fn2. Hence, for fn1 the compiler generates BL instruction 283 (to call fn2) and BX instruction 286 (to return from fn1 to the code that called fn1). For fn2 the compiler generates a BX instruction 284 for returning from fn2 to fn1. To ensure the return address for fn1 is preserved when calling fn2, the fn1 code also includes a push instruction 282 to push the contents of the link register to a stack before calling fn2, and a pop instruction 285 for restoring the link register from the stack before returning from fn1. In practice, as fn2 is the last activity to be performed within fn1, this pushing and popping of function 1's link register to and from the stack introduces some unnecessary memory are performance overhead.

Figure 11C:
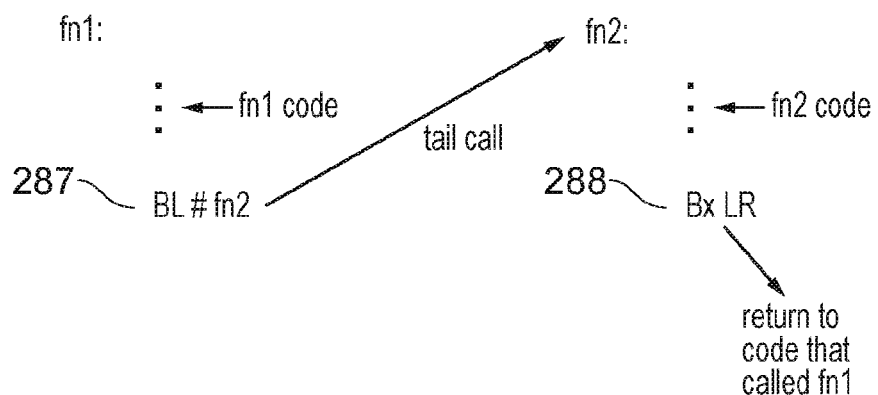

Hence, as shown in FIG. 11C an alternative approach for compiling the functions may be to call the code associated with fn2 using a non-calling branch instruction 287 which does not update the link register, effectively passing the return address saved in link register for fn1 to fn2. This means that when the final return branch 288 is executed then the processing returns back to the background code being processed before fn1. This approach is known as tail calling and can improve performance by avoiding the need for the PUSH 282, POP 285, and BX 286 instructions.

However, in a scenario where function 1 is in the less secure thread mode and called by an intermodal function call as shown in the example of FIG. 10 and function 2 is in the secure thread mode and called with an interdomain function call (calling from the less secure domain NS to the secure domain S), this means that to support the tail calling the subsequent return branch instruction 288 would need to trigger a return direct from the secure thread mode to the less secure handler mode. If a combined domain/mode transition was not supported then tail calling would not be possible which may require much existing legacy code to be recompiled, so it can be more efficient to support the combined domain/mode transition when it is from the secure thread mode to the less secure handler mode. Nevertheless, by prohibiting an intermodal function return going from less secure domain to secure domain then this improves security because this limits the avenues by which the secure domain can be entered. As explained earlier, there may be no demand for this combination of transitions because tail calling from the secure to the less secure domain may already be prohibited in legacy code.

Figure 12:
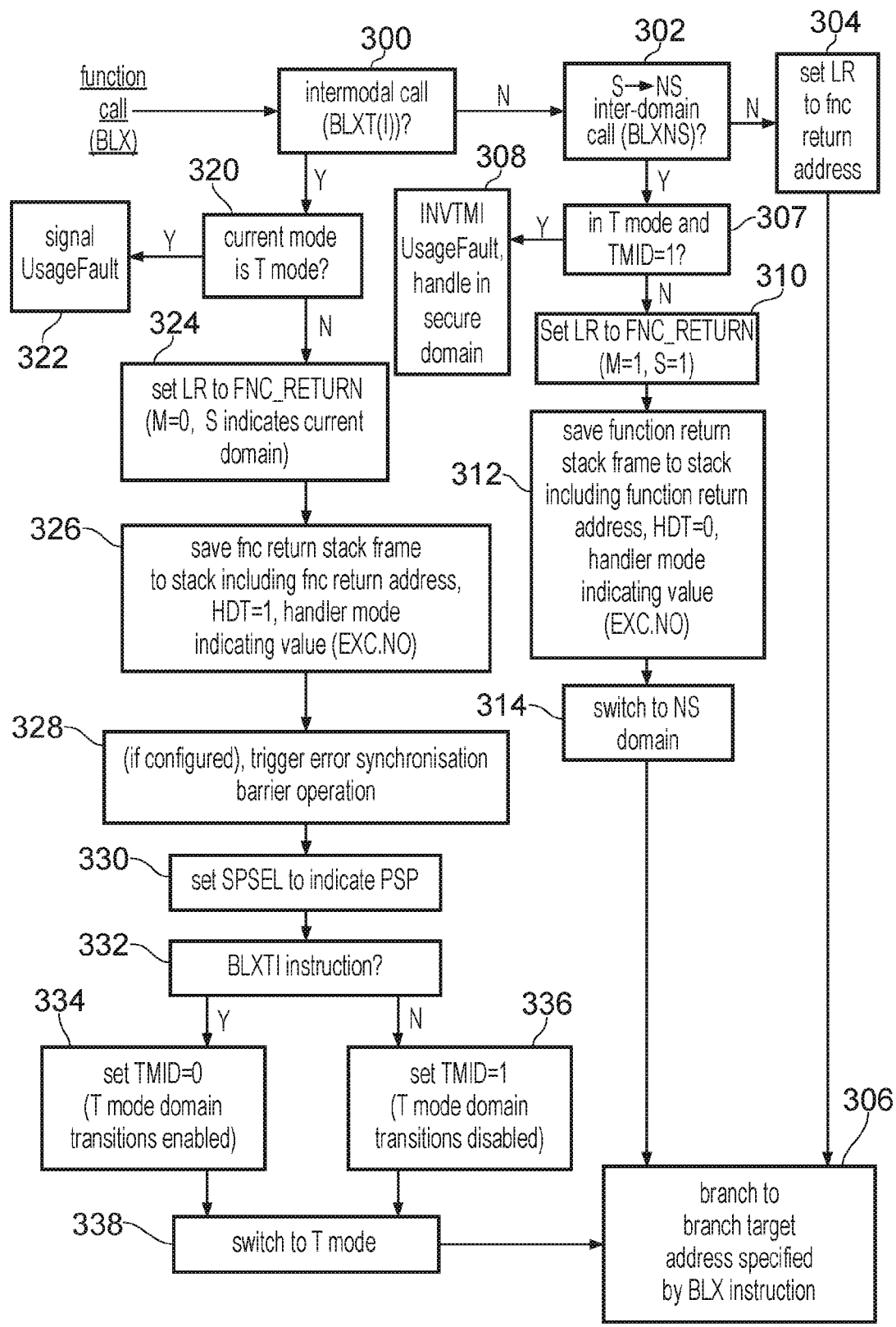
FIG. 12 is a flow diagram showing steps performed when a function is called.

FIG. 12 is a flow diagram illustrating steps performed in response to a function calling branch instruction (BLX). The steps are performed by the processing circuitry 4 under control of the instruction decoder 10, in response to decoding of an instruction identified as a function calling branch instruction. At step 300 it is determined whether the function calling branch instruction is an intermodal calling branch instruction, which is a specific type of function calling branch instruction, distinguished by a different instruction encoding to other types of function calling branch instruction. For example the intermodal calling branch instruction could have a different opcode from non-intermodal calling branch instructions, or could have the same opcode but have a separate parameter specified in the instruction encoding which distinguishes whether it is an intermodal calling branch instruction. In the example embodiment shown in FIG. 12 there are two variants of intermodal calling branch instructions, BLXT and BLXTI, which both trigger intermodal function calls but differ in the way in which they set the TMID parameter 34 in the control register 32. It will be appreciated that some system implementations may not support both variants of the intermodal calling branch instruction and could only have one of the BLXT and BLXTI variants. Also some implementations may have further variants of intermodal calling branch instructions.

If the function calling branch instruction is not an intermodal calling branch instruction then at step 302 the processing circuitry 4 (under control of the instruction decoder 10) determines whether the function call is an inter-domain function call from the secure domain to the less secure domain. In some implementations, such a secure to less secure inter-domain call may be signalled by yet another variant of function calling branch instruction, BLXNS which has a dedicated instruction encoding distinguishing it from other types of function calling branch. Also, in some implementations, whether the BLXNS instruction triggers an inter-domain call could also depend on the branch target address specified by the instruction, in particular whether the least significant bit of the branch target address is 0. In some examples, on a valid function call or a branch into the secure domain from less secure code, the least significant bit of the function return address may be sanitised to 0 in response to a secure gateway instruction executed as the first instruction in the secure code after the function call, to ensure that a subsequent function return then returns to the less secure domain so that less secure code cannot trick the secure code into branching to an arbitrary location within the secure address regions defined by the SAU 24 by providing a function return address which is in a secure region. Since sanitising the least significant bit of a branch target address may be used to ensure the security of secure to less secure inter-domain function returns (using a BXNS instruction), it may be convenient to use a similar scheme to ensure the security of secure to less secure inter-domain function calls (using a BLXNS instruction) Hence, on detecting that there is an inter-domain calling instruction BLXNS with the least significant bit of the branch target address being set to 0, this may be treated as a secure to less secure inter-domain call. In some implementations the secure to less secure inter-domain calling instruction (BLXNS) may only be available in the instruction set (and therefore detectable by the decoder stage 10) when the processing circuitry 4 is operating in the secure domain. In such an implementation an attempt to execute the BLXNS instruction from the less secure state may result in the decode stage 10 not recognising the instruction as a valid instruction for the current state, and therefore processing would not reach step 300.

If the function call is not a secure to less secure inter-domain call then at step 304 the function call can be handled without any specific security implications and at step 304 the link register (R14) is set to a function return address. The function return address has the value of the address of the instruction after function call instruction in the address space 100 (i.e. the address of the function call instruction plus the length of the function call instruction opcode). At step 306 the program counter register R15 is updated based on the branch target address specified by the function calling branch instruction so that processing then branches to be instruction at the branch target address. This represents the normal case of branch handling for function calls which do not trigger any change of domain or change of mode.

If at step 302 it was determined that the function calling branch is a secure to less secure inter-domain call then at step 307 the processing circuitry 4 determines (based on whether the exception number 36 is the special thread mode value of 0) whether the current mode is thread mode and also determines whether the thread mode interstating disable (TMID) parameter 34 indicates that domain transitions are disabled in the thread mode. If the current mode is thread mode and inter-domain transitions are disabled in thread mode then at step 308 the processing circuitry signals a fault. The particular type of fault signalled may be a dedicated fault type used only for exceptions triggered by an attempt to switch security domains in the thread mode when the TMID flag 34 indicates that this is disabled. Alternatively the fault may be a directed to an exception handler that is used to handle a variety of fault conditions, and in such cases a syndrome flag associated with the inter-domain transition disable checking may be set so that the exception handling routine can easily identify the cause of the fault, and the subsequent actions that need to be performed. In FIG. 12 this is indicated as an INVTMI (invalid thread mode interstating) UsageFault, although the exact naming convention for this type of fault may of course vary. For a secure to less secure inter-domain call, the INVTMI fault is handled in the secure domain (the current domain before attempting the call), which is useful because the process for managing the thread which would have requested the secure to less secure transition would be a secure operating system managing a secure thread, which may be better placed to handle the INVTMI fault so that any required resources for that thread to operate in the less secure domain can be configured.

If at step 307 it was determined that either the current mode is the handler mode (e.g. when the exception number 36 is non-zero) or the TMID parameter 34 is 0 to indicate that domain transitions are enabled in thread mode, then at step 310 the processing circuitry sets the link register R14 to one of the valid dummy function return address values 140 as shown in FIG. 5. In the dummy function return address 140, the intermodal flag (M) 146 is set to 1 to indicate that this was not an intermodal function call, and also the security domain flag (S) 148 is set to 1 to indicate that the call was made from the secure domain. At step 312, the function return stack frame 172 is saved to the stack data structure pointed to by either the secure main stack pointer MSP_S or the secure process stack pointer PSP_S (depending on whether the current mode is handler mode or thread mode and if in thread mode, depending on the stack pointer selection value 30 for the secure domain 13_S). The saved function return stack frame 172 specifies the HDT flag 178 as equal to 0 to indicate that this is not an intermodal function call. Also the exception number field 179 in the function return stack frame 172 is set equal to the current value of the exception number 36 in control registers 20, to indicate whether the call is made from handler mode or thread mode. This exception number field 179 acts as a handler mode indicating value indicating whether the current mode is handler mode. The function return stack frame also includes the function return address 174 which is set in the same way as at step 304, but this time it is saved to the stack instead of to the link register so that the less secure code to be executed after the inter-domain call cannot learn what instruction was being executed in the secure code before the function call. At step 314 the processing circuitry then switches the current domain to the less secure domain and then the method proceeds to step 306 where a branch to the branch target address specified by the function calling branch instruction is carried out in the same way as previously described.

Referring again to step 300, if the function calling branch instruction is an intermodal calling branch instruction, then at step 320 the processing circuitry determines whether the current mode of operation is the thread mode, and if the current mode is the thread mode then at step 322 a usage fault is signalled. This may be a different type of usage fault to the INVTMI UsageFault. As the intermodal calling branch instruction is intended to trigger a switch from handler mode to thread mode to support interrupt deprivileging, an attempt to execute it from the thread mode is an error. Suppressing instruction execution of the intermodal calling branch when in thread mode avoids potentially unpredictable results caused by potentially setting the wrong stack frame in response to the calling branch, which may lead to security vulnerabilities. Hence, the intermodal calling branch instruction can only be executed from the handler mode.

If at step 320 it is determined that the current mode is the handler mode then the method proceeds to step 324 where the link register is set to one of the special dummy function return address values 140, but unlike at step 310 the intermodal flag (M) 146 is set to 0 at step 324 to indicate that the corresponding function return should be treated as an intermodal function return. Also, the security domain flag (S) 148 in the function return value 140 indicates the current domain of operation at the time the intermodal calling branch instruction was executed (the intermodal call could be made from either the secure domain or the less secure domain).

At step 326, the processing circuitry saves the function return stack frame 172 to the stack selected based on the domain and mode of operation prior to executing the intermodal calling instruction and the stack pointer selection value 30. The function return stack value again includes the function return address 174 (set in the same way as at steps 304 or 312), and the handler mode indicating value which corresponds to the current value of the exception number 36. As the intermodal call is made from handler mode then it is expected that the exception number field 179 will be non-zero. For the intermodal call, the HDT flag 178 in the function return stack frame is set to 1 to indicate that this function return stack frame was saved in response to an intermodal call, which can provide cross-checking information to check, on a corresponding function return using the dummy function return address 140, whether the intermodal flag 146 is correct or has been tampered with by untrusted code. Note that following the saving of the function return stack frame at either step 312 or 326, the corresponding stack pointer would also be updated to point to the location at which further stacked information should be saved to the stack if further stacking is required before the currently saved stack frame has been unstacked.

At step 328, optionally the processing circuitry triggers an error synchronisation barrier operation to be performed in response to the intermodal calling branch instruction. For example, the error synchronisation barrier operation could involve the processing circuitry 4 suspending further execution of instructions until it is determined that the results of at least some types of error detection or correction operations for checking the validity of any previously executed instructions have completed and it is confirmed that those operations were either error free, involved an error which can be corrected, or involved an error that can be correctly attributed to the execution of instructions before the change from handler to thread mode. The error synchronisation barrier operation is an operation to ensure that at least some types of errors detected by the reliability, availability, and serviceability (RAS) error detection/correction circuitry 29 can be attributed to code being executed before the mode change caused by the intermodal calling branch instruction and distinguished from errors which arise when processing code executed after the mode change caused by the intermodal calling branch instruction. For the intermodal calling branch, it can be useful to be able to pinpoint exactly whether a detected RAS error affected the more privileged code executing before the mode change caused by the intermodal function call or the less privileged code executing after the mode change. This is because often resolving errors associated with less privileged code may incur a much lower impact on the system availability than resolving errors associated with the more privileged code. For example the more privileged code could be an operating system and so dealing with errors attributed to the operating system may require a full system reset, whereas an error attributed to less privileged code associated with an individual thread can be dealt with simply by killing that thread but leaving other threads and the operating system unaffected. Hence, by performing the error synchronisation barrier operation in response to the intermodal call this can improve the availability of the system by limiting the impact of dealing with any detected errors in cases where it can be safely attributed to the less privileged code executing after the mode change caused by the intermodal function call. It will be appreciated that there may be some types of errors that may be outside the scope of error synchronisation barriers, and therefore may not be containable by the use of such barrier. These uncontainable errors may still require a full system reset. However the use of error synchronisation barriers may increase the likelihood of an error being attributable to a single thread, and therefore reduce the likelihood that a full system reset will be required.

It is not essential for the error synchronisation barrier operation to be triggered in all scenarios. Some systems may prefer the performance for regular program execution to be improved by not artificially holding back execution of subsequent instructions executed after the intermodal function call. For example, for certain real time-critical interrupts the interrupt handling latency may have to be as short as possible and so it may be preferred not to trigger the error synchronisation barrier operation, at the expense of greater performance cost if an RAS error is detected, whereas for other types of interrupts with less real-time-critical requirements, or that are related to safety critical behaviour, then it may be preferred to trigger the error synchronisation barrier operation so that, although the regular interrupt latency may be slightly slower due to holding back execution of instructions after the intermodal call until the error detection/correction results are available, if an error is detected then the location of the error can be pinpointed and the full impact of a system reset can be avoided where possible. Hence, in some implementations the control registers 20 may store a configuration parameter which specifies whether the error synchronisation barrier operation should be triggered in response to the intermodal call instruction. In some systems the configuration parameter which specifiers whether the error synchronisation barrier operations should be performed is banked between the security domains, such that the less secure and secure domains can independently choose whether the barrier operations should be performed.

Regardless of whether the error synchronisation barrier operation is performed or not, at step 330 in response to the intermodal calling branch instruction the processing circuitry also sets the stack pointer selection value 30-S or 30-NS for the current security domain to indicate that the process stack pointer should be selected for the subsequent operations performed in thread mode after the intermodal function call. This ensures that the less privileged part of the exception handler to be executed after the intermodal call cannot access or corrupt the main stack pointer used by a more privileged section of the wrapper code executed in handler mode prior to the intermodal call instruction, even if thread mode code executing prior to the exception being handled by that exception handler did have access to the main stack pointer.

At step 332 the processing circuitry 4 determines whether the intermodal calling branch instruction being executed is the BLXTI variant of the instruction. If so, then at step 334 the TMID parameter 34 is set to 0 to indicate that domain transitions between the secure and less secure domains are enabled in thread mode. This corresponds to a second variant of the intermodal calling branch instruction as mentioned earlier. If the intermodal calling branch instruction is the BLXT variant (first variant) then at step 336 the TMID parameter 34 is set to 1 to indicate that domain transitions in thread mode are disabled. The programmer can select whether to use the BLXT or BLXTI variant depending on whether resources for both secure and less secure domains have already been established for the thread to be executed following the intermodal function call. The BLXTI variant can be selected in cases where the resources for both domains have already been established so that it is safe to switch between secure and less secure domains if necessary, while the BLXT variant can be selected in cases where resources for only one of the S/NS domains have been configured. These resources may include MPU configuration within the relevant one of the secure and less secure MPUs 26-S, 26-NS (where the MPU configuration could include one or both of some memory region attributes defining access permissions to respective memory regions and/or a pointer to a table in the memory system 6 which provided those memory attributes). Also the resources could include the stack pointers in secure or less secure stack pointer registers (banked versions of R13 as shown in FIG. 3), and if a suitable stack structure in memory is not already available, may also include allocation of the corresponding stack structures stored in the memory. By providing the ability to disable domain transitions in thread mode this enables a thread to have its resources configured only for one domain and then the resources for the other domain only need to be allocated lazily if there is an attempt to switch domains, with a fault otherwise being triggered as shown in step 308 above, or as described earlier for other types of inter-domain transitions. By using the BLXTI or BLXT instruction to also set the thread most interstating disable parameter 34 this avoids the need for a separate instruction to separately set the flag.

Regardless of which variant of the intermodal calling branch instruction is executed, at step 338 the processing circuitry updates the exception number 36 to indicate the non-exception handling value (e.g. 0) and so the processor switches to thread mode. Again, the method then proceeds to step 306 to branch to the branch target address specified by the function calling branch instruction. Subsequent program execution will then continue from the instruction stored at the branch target address. It will be appreciated that the branch target address could be specified by the function calling branch instruction in a number of ways. For indirect branches, the branch target address may be defined using an operand to select a register containing the target address. A direct branch could specify the target address using an immediate value directly encoded in the instruction encoding. A program counter-relative branch (which could be indirect or direct) could specify an offset to be added to the current program counter value to obtain the branch target address.

Figure 13:
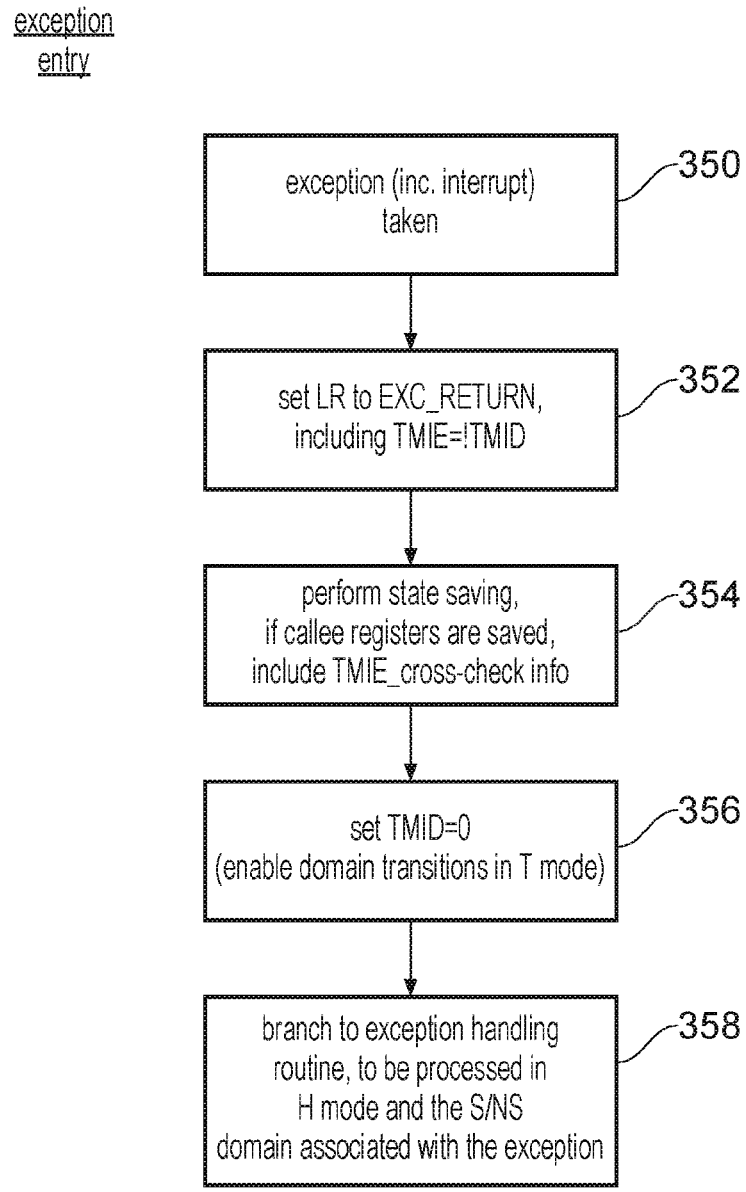
FIG. 13 is a flow diagram showing steps performed on exception entry.

FIG. 13 illustrates steps performed on entry to an exception. At step 350 an exception is taken. The exception could be a software-triggered exception, such as a supervisor call (SVC) or an exception caused by the occurrence of a fault caused directly by the software, such as an attempt to execute an undefined instruction, an attempt to fetch an instruction from the reserved address range 130, or an access to memory which triggers an address fault due to failed memory permission checks at the memory access checking circuitry 22. Also, the exception could be a hardware-triggered interrupt caused by receipt of a signal or message from an external device or peripheral.

Regardless of the cause of the exception, when an exception is taken then at step 352 the processing circuitry 4 is controlled by the exception control circuitry 28 to set the link register R14 to the special dummy exception return value 142 described earlier. More particularly, one of several dummy exception return values is selected with the values of the current mode and current domain flags 152, 156 being selected based on the current mode and domain of operation at the time the exception occurred. Also, the thread mode interstating enabled (TMIE) flag 158 is set to the inverse of the current value of the TMID flag 34 in the control register 32. This preserves the information in the TMID flag during the exception processing so that it can be restored on exception return. It will be appreciated that the implementation which inverts the TMID flag to set the TMIE flag is just one possible implementation and other examples could encode the TMIE value with the same encoding as the TMID value and simply copy it across directly, or could use a completely different encoding which need not be represented with a single bit flag but could use a multi-bit value.

At step 354 the exception control circuitry 28 triggers hardware-triggered state saving of register state from the registers 1 to a stack data structure in memory identified by one of the stack pointers in the banked stack pointer registers. The particular stack pointer to select depends on the current domain and mode and the stack pointer selection value 30 in use prior to the exception occurring. The state saving may involve storing only the caller stack frame 180 shown in FIG. 6 or storing both the caller stack frame 180 and the callee stack frame 182. The decision on whether to save only the caller stack frame or both caller and callee stack frames may depend on the current domain of operation at the time the exception was taken and the domain in which the exception is to be processed, and in some cases based on state data stored in a control register 20.

If the exception is taken from background code which is not itself processing an exception, and any previously occurring exceptions have already been dealt with, and the background code is processed in the less secure domain, then only the caller stack frame 180 needs to be saved and there is no need to save the callee stack frame 182. Also, if the background code was processed in the secure domain but the exception is to be taken in the secure domain then again there is no need to save the callee stack frame 182.

In the event that the exception is taken from background code processed in the secure domain but the exception is to be processed in the less secure domain, then there would be a risk that the less secure exception handler is able to access the register state placed in the registers 14 by the secure code operating prior to the exception. Therefore, in this case both caller and callee stack frames 180, 182 would be saved to the secure stack identified by one of the secure main stack pointer and secure process stack pointer, and the general purpose registers 16 may be cleared to hide the secure data from being accessed from the less secure handler.

The previous paragraph describes the general principles of determining whether to save the additional callee stack frame when taking an exception from background code. However when a further exception pre-empts an earlier exception which has not yet completed its exception handler, or when tail chaining of exceptions is performed where on completing one exception another exception is taken before returning to the background code, then there may be more complex decisions on whether to save the caller stack frame and/or the callee stack frame. Examples of decision processes for determining which of the caller and callee state to save in response to an exception are described in published PCT applications WO 2013/117899 A1 and WO2014/0538048 A1, the contents of which are incorporated by reference and can be used for deciding which registers to stack can be applied at step 354 in FIG. 13 of the present application. See in particular FIG. 12 of WO 2013/117899 A1 and the related description.

At step 354, if it is decided that the callee stack frame 182 is to be saved to the stack, then within the predetermined signature 190, the TMIE crosscheck information 192 is specified, which is set to the same value as the TMIE flag 158 within the dummy exception return address set at step 352 (or in alternative implementations, to another value which can be used to check whether the TMIE flag 158 has been set correctly). This provides some protection against the risk that less secure code operating following the occurrence of the exception could tamper with the TMIE flag 158 in the dummy exception return address in a way that could risk the secure code being processed after returning from the exception receiving the wrong value of the interstating disable flag TMID 34 once the TMIE flag 158 is used to restore the TMID flag 34 to the control register 32. This protects against denial of service attacks caused by spurious faults being generated based on TMID 34 set based on a tampered with TMIE flag 34.

One may question why the TMIE crosscheck value 190 is specified in the callee stack frame 182 instead of the caller stack frame 180, as one might think that if the value preserving the TMID flag 34 for the background code was saved into the caller stack frame 180 then it could be kept secure without being accessible to the exception handler in the link register as in the case with the TMIE flag 158 in the exception return value 142. However, in practice the caller stack frame 180 may not have much spare capacity for extra information as the status field ERETPSR may already have a lot of information to be encoded and so there may not be space for the cross-checking information 192. In some implementations it may be that there is enough space in the ERETPSR value for the addition of the TMIE flag, but that the remaining space in the ERETPSR value is still limited and it is preferable to reserve that space for future additions to the architecture. The callee stack frame 182 is not saved for all types of exceptions and so cannot be relied upon to store the main copy of the TMIE value 158 which indicates the value to be restored to TMID flag 34 on exception return. Therefore the approach shown in FIGS. 5 and 6 where the TMIE flag 158 is placed in the link register as part of the dummy exception return address, but cross-check information 190 is included in the callee stack frame 182, enables all types of exceptions to preserve the value of the TMID flag 34 despite the lack of space in the caller stack frame 180, but for those scenarios where there is a risk of the TMIE flag 158 being tampered with, these are also the same scenarios where register state is being protected by saving the additional callee stack frame 182, and so the cross-checking information 192 saved to the callee stack frame 182 protects the TMIE flag 158 against tampering.

At step 356, as part of the exception entry transition, the exception control circuitry 28 triggers the processing circuitry 4 to set the TMID flag 34 in the control register 32 to 0, to indicate that domain transitions are enabled in the thread mode. This ensures that all exception handlers see a consistent view of whether domain transitions are enabled in thread mode, regardless of whether domain transitions were disabled for code executing prior to the exception. Enabling domain transitions in thread mode in this way may be required for backwards compatibility with software written before the TMID flag 34 was created.

At step 358 the exception control circuitry 28 controls the processing circuitry 4 to branch to an exception handling routine. The address of the instruction to be executed at the start of the exception handling routine may be determined based on exception vector tables which map different types of exceptions to respective exception handling routine addresses. The exception handling routine is processed in the handler mode, so if the processing circuitry 4 was currently in the thread mode then in response to the exception being taken the current mode is switched to the handler mode. If the current mode at the time the exception was taken was already the handler mode, then no change to the current mode is made. Hence, it is not possible to take an exception to the thread mode initially, although after processing some code in the handler mode it is possible to perform an intermodal function call as described earlier to switch to the thread mode.

Also, on exception entry the exception control circuitry 28 may optionally trigger the processing circuitry 4 to switch security domains if necessary. Different exceptions may be associated with different security domains. Some exceptions may always need to be taken in a particular domain, such as the secure domain or the less secure domain. Other exceptions may be taken in the current domain at the time the exception occurred. Hence, if the exception is to be handled in a different domain from the current domain then as well as branching to the exception handling routine the exception control circuitry 28 may also trigger a change of security domain.

Figure 14:
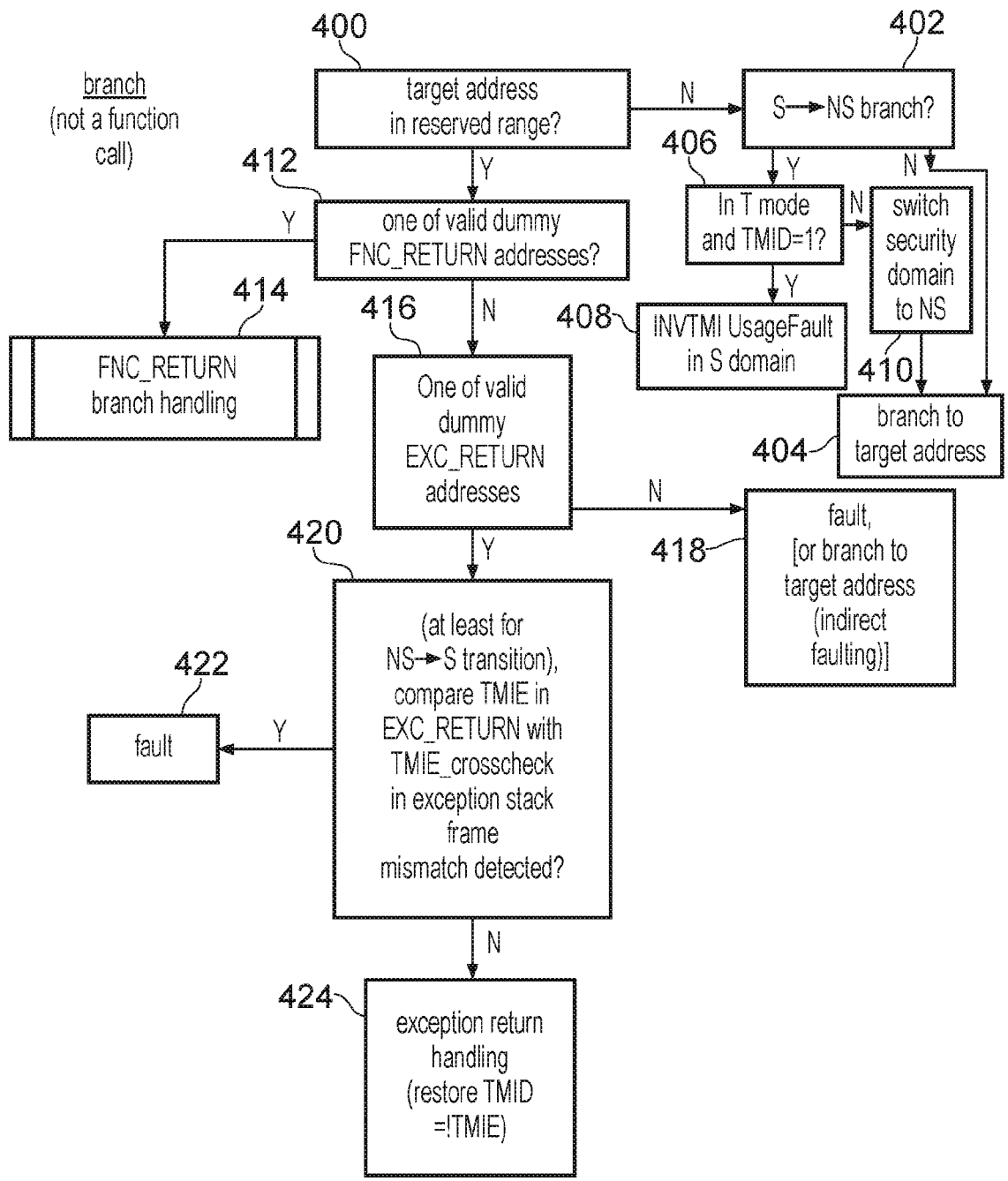
FIG. 14 is a flow diagram showing steps performed in response to a branch instruction other than a function call.

FIG. 14 is a flow diagram illustrating steps performed in response to a branch instruction which is not a function calling branch instruction of the type shown in FIG. 12. At step 400 the processing circuitry checks whether the target address is in the reserved address range 130. If not, then this is a regular branch instruction to an address of an executable instruction. At step 402 it is detected whether the branch is requesting a transition from the secure domain to the less secure domain. This can be identified by checking the current domain of operation of the processing circuitry 4 and checking the least significant bit of the branch target address. If the least significant bit of the branch target address is 0 then it indicates a branch back to the less secure domain. Alternatively in some implementations a branch requesting a transition from the secure to the less secure domain may be indicated by the use of a dedicated domain transitioning branch instruction (which may be called a BXNS). The dedicated domain transitioning branch instruction may be detectable by a different opcode value from other types of branch instruction, or it may be the same opcode as other types of branch instruction, but with a parameter value indicating that a secure to less secure domain transition is requested. Some implementations may combine the two approaches such that a secure to less secure domain transition request requires both the least significant bit of the branch target address to be 0, and the use of the dedicated domain transitioning instruction.

If the branch is not requesting a secure to less secure branch then at step 404 the branch can be processed as normal and the program counter register R15 is updated based on the branch target address specified by the branch instruction and then program flow continues with the execution of the instruction at the branch target address (in the same domain as prior to execution of the branch). It will be appreciated that in some implementations not all types of non-function call branch will be expected to be used for function returns. For example branches that determine the target address based on an immediate value encoded within the instruction opcode may always branch to the same location, as such they may not be suitable for function return branching where program flow may need to branch back to a variety of different functions that called the function being returned from. To simplify the design, some implementations may choose to only perform the steps described in FIG. 14 for the subset of non-function call branches that can be used to perform function returns. As descried above, there may be many types of instruction that can have the effect of performing a branch, even though the instruction may not be a dedicated branch instruction (for example it may be a load instruction that writes the value loaded into the program counter). The steps described in FIG. 14 may also apply to at least a subset of such non-branch instructions that have the effect of performing a branch.

If at step 402 it was determined that the branch is a secure to less secure branch then at step 406 the processing circuitry checks whether the current mode is the thread mode and whether the domain transition disable configuration parameter (TMID) is 1 indicating that inter-domain transitions are disabled in thread mode. If the current mode is thread mode and the TMID indicates that domain transitions are disabled in thread mode then at step 408 an INVTMI UsageFault is triggered which is processed in the secure domain. This allows the secure operating system which manages a secure thread to configure any MPU or stack resources as necessary to allow the secure thread to also operate in the less secure domain.

Alternatively if at step 406 it was determined that the current mode is handler mode or the TMID value 34 in control register 32 is 0 to indicate that domain transitions (interstating) is enabled then at step 410 the security domain is switched to the less secure domain (NS) and then at step 404 the branch to the target address is performed as described earlier.

If at step 400 it is determined that the target address is in the reserved range then this indicates that the branch may be intended to represent either a function return or an exception return. At step 412 the execute stage 12 of the processing circuitry 4 determines whether the target address of the branch is one of the valid dummy function return addresses 140 as indicated by the function return prefix 144 at its most significant bit portion. If the target address is one of the valid dummy function return addresses 140, then at step 414 function return branch handling is performed, which will be described in more detail with reference to FIG. 15 below.

Alternatively, if the target address of the branch is not one of the valid dummy function return addresses then at step 416 it is determined whether the target address is one of the valid dummy exception return addresses 142 as shown in FIG. 5. If not, then the attempt to branch to the target address is an error because the address represents a non-executable instruction address and it is not a dummy address used to signal exceptional function returns, and so at step 418 a fault may be triggered. Alternatively, instead of directly triggering the fault in response to detecting that the branch is to a non-executable address, the branch could be carried out as normal to set the program counter register to be branch target address (so FIG. 14 transitions from step 416 to step 404 in the event of a "N" determination for step 416), and then subsequently when the instruction fetching circuitry 8 attempts to fetch an instruction from the non-executable address then this may cause a fault to be signalled. Hence, the generation of the fault may be indirectly caused by the branch but may not be directly signalled in response to the branch instruction itself. Either approach can be valid.

If at step 416 it was determined that the target address is one of the valid dummy exception return addresses 142 then at step 420, at least if the exception return involves a less secure to secure domain transition (which can be determined from the security domain flag 156 in the dummy exception return address) then a cross-checking comparison is made between the TMIE flag 158 in the dummy exception return address 142 and the TMIE cross-check information 190 saved as part of the calling stack frame 182. If a mismatch is detected then at step 422 a fault is triggered as this may indicate that an attempt has been made to tamper with the TMIE flag 158 in the link register, or alternatively an inadvertent error has arisen. If the TMIE flag 158 matches the cross-check information 192, or alternatively the exception return transition is one which does not require this cross-check, then the method proceeds to step 424 where the exception return is handled.

The exception return handling at steps 420 and 424 may also include other operations as described in the earlier referenced PCT publications WO 2013/117899 A1 and WO 2014/053804 A1. Prior to checking the TMIE value at step 420, the exception return handling at step 424 may include unstacking of register state from the stack to the registers 14. A determination of whether the unstacking should involve unstacking of the caller stack frame 180 only or both the caller and calling stack frames 180, 182 can be made based on a status flag which may be stored as part of the exception return value 142 on taking the exception. For more detail on the decision on which registers need to be unstacked, see FIG. 13 of WO 2013/117899 A1 or FIG. 13 of WO 2014/053804 A1.

Also, the exception return handling may include a check of whether the predetermined signature 190 is expected to be present on the stack as part of the callee stack frame 182. This can be determined according to FIG. 14 of WO 2014/053804 A1. If the predetermined signature 190 is expected to be present but the contents of the location on the stack compared with the predetermined signature does not match, then a fault can be triggered as this can detect cases where an exception return mechanism has been attempted based on a stack frame saved in response to a function call. The generation of the fault is shown in FIG. 7 of WO 2014/053804 A1.

The exception return handling operations may also include other operations, such as updating the exception number value 36 restored based on the ERETPSR value in the loaded stack frame and changing the exception priority level based on the priority of processing being returned to.

In addition, at step 424 the TMID value 34 in the control register 32 may be restored, based on the TMIE flag 158 included within the dummy exception return address which was branched to. The restored value of the TMIED flag 34 may correspond to the inverse of the value of the TMIE flag 158, so as to indicate whether domain transitions in thread mode should be enabled or disabled to match the value which TMID 34 had before the corresponding exception was taken. It will be appreciated that many other operations could also be performed on handling exception returns which are not discussed here.

Figure 15:
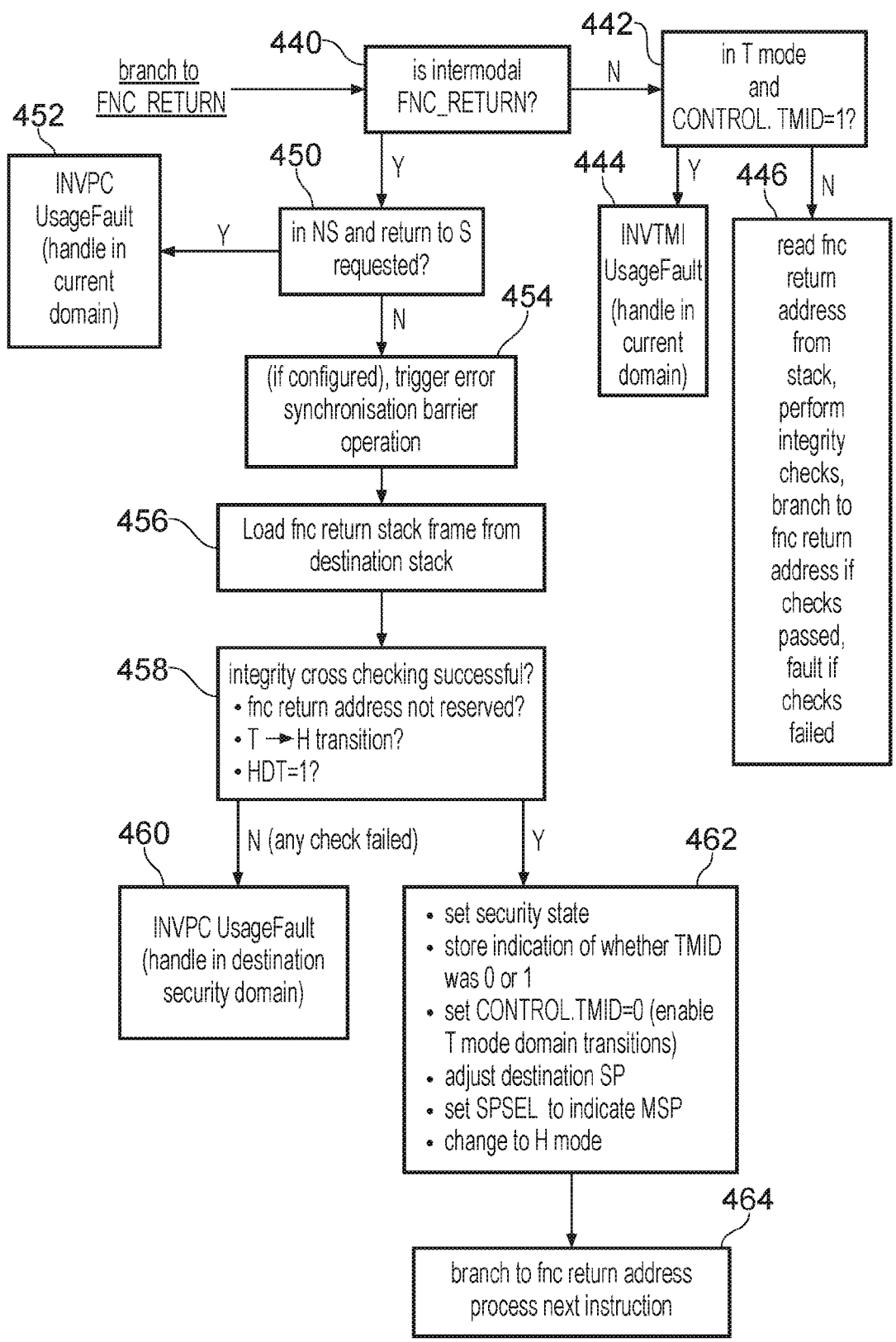
FIG. 15 is a flow diagram showing steps performed in response to a branch to the dummy function return address.

FIG. 15 shows in more detail operations performed for a branch to the function return address at step 414 of FIG. 14. At step 440 the processing circuitry determines whether the dummy function return address 140 detected as the branch target address for the branch indicates an intermodal function return. For example this can be a check of whether the intermodal indicator 146 is 0 to specify that the corresponding function return value was set on an intermodal call from handler to thread mode. If the function return attempted is not an intermodal function return, then it is an inter-domain function return (since if the corresponding function call was neither an intermodal call nor an inter-domain call then the link register would simply have been set to the function return address and there would have been no need to use the dummy function return address).

At step 442 for an inter-domain function return, a check of the thread mode interstating disabled flag TMID 34 is performed. If the current mode is the thread mode and the TMID flag 34 is 1 to indicate that domain transitions are disabled in thread mode then at step 444 the INVTMI UsageFault is again triggered as at step 308 of FIG. 12 or 408 of FIG. 14. However, at step 444 the INVTMI fault is handled in whichever domain is the current domain at the time when the branch was attempted (that is, the source domain from which the inter-domain function return is being attempted, rather than the secure domain as was the case in steps 308 and 408). This ensures that the process responsible for managing the thread that requested the branch can handle the fault and then configure the required resources for the destination domain as necessary.

If at step 442 the current mode was determined to be the handler mode or the TMID flag 34 was determined to be 0 indicating interstating is enabled then at step 446 the branch can be permitted to proceed. The function return address 174 to which the branch is to be made is read from the relevant stack determined based on the current mode of operation, the security domain being transitioned to and, if in thread mode, based on the stack pointer selection value 30. Any integrity checks needed to verify whether the inter-domain transition is allowed are performed. These integrity checks could for example include whether the exception number 179 in the function return stack frame 172 indicates the stack frame was created in the same mode as the current mode of operation (i.e. the exception number 179 is zero if the current mode of operation is thread mode, and non-zero if the current mode of operation is handler mode), as well as a check of whether the HDT flag 178 is 0 as expected for an inter-domain function return. Also, any other requirements restricting the domain transitions that are allowed may be checked. If the integrity checks are passed then the branch to the function return address 174 is permitted to succeed and then subsequent processing continues from the instruction fetched from the function return address 174 (this is the real function return address loaded from the function return stack frame 172 rather than the dummy function return address 140 which is actually specified as the target address of the attempted branch encountered at step 400 of FIG. 14). The stack pointer pointing to the function return stack frame 172 may be adjusted to account for the unstacking and removal of the function return stack frame from the stack data structure. If any of the required integrity checks fail then a fault is signalled (this may be a security fault which may be processed in the secure domain).

If at step 440 the attempted function return was determined to be an intermodal function return then at step 450 the processing circuitry determines whether the current domain is the less secure domain and the security domain indicator 148 in the dummy function return address 140 indicates that a return is requested to the secure domain. If this is the case then at step 452 an INVPC usage fault is triggered which is to be handled in the current domain (less secure domain). This fault is triggered to prevent the prohibited combined domain/mode transition from less secure thread mode to secure handler mode as shown in FIG. 9 above, which could otherwise pose a security vulnerability.

If the attempted intermodal function return is not from less secure domain to secure domain (either remaining within the same domain or being from secure domain to less secure domain) then the method proceeds to step 454 where, if configured, an error synchronisation barrier operation is triggered similar to the one at step 328 of FIG. 12. Again, by triggering an error synchronisation barrier on an intermodal function return this can help with pinpointing of errors so as to reduce the need for invasive system reset operations if the error can be attributed to the less privileged processing being executed before the intermodal function return.

At step 456, in response to the intermodal function return instruction, the processing circuitry loads the function return stack frame 172 from the main stack associated with the destination security domain to which the return is being made. At step 458 the processing circuitry performs integrity cross-checking operations and determines whether the outcome of that integrity cross-checking is successful. This integrity cross-checking may check a number of items on the function return stack frame. For example, the processing circuitry may check whether the function return address 174 is one of the reserved range 130 of addresses. If the function return address is one of the reserved range of addresses then this may be an indication that a function return is attempted based on a stack frame which is actually an exception stack frame which includes the predetermined signature 190 at the same relative location on the stack as the function return address 174 within the function return stack frame 172, and this mismatching of exception and function entries and returns may be an avenue for attack. Hence, if the function return address 174 on the stack frame is a reserved address 130 then the integrity cross-checking fails.

Also, as part of the integrity cross-checking the processing circuitry checks whether the current mode is the thread mode, based on the exception number value 36 in the control registers 20. If the current mode is handler mode then the integrity cross-checking fails.

Also, the integrity cross-checking includes checking the exception number field 179 in the function return stack frame, which if 0 triggers the integrity cross-checks to fail as the intermodal function return is expected to return from the thread mode to the handler mode.

Also, the integrity cross-checking uses the HDT flag 178 to detect whether the function return stack frame was saved in response to an intermodal calling branch instruction. If the HDT flag is 0 then this indicates that the function return stack frame was set up in response to an inter-domain function call not an intermodal function call (see step 312 of FIG. 12), and so then the integrity cross-checking fails. Again, this prevents mismatched sequences of function calls and returns to limit the opportunity for attacks based on mismatching stack frames, and also protects against potential modification of the intermodal flag 146 within the dummy function return address 140 while it is saved in the generally accessible link register, with the HDT flag 178 acting as a cross-check value for checking that the intermodal flag was correct.

If any of the integrity cross-checks fail, then at step 460 an INVPC usage fault is triggered which indicates that a failure of security checks has arisen and this type of fault is to be handled in the destination security domain associated with the code attempting to be branched to.

Alternatively, if all of the integrity cross-checks pass then at step 462 the intermodal function return can be acted upon. When the intermodal function return is performed then at step 462 a number of actions are performed. The security state is updated to be the security state indicated by the security domain indicator 148 in the dummy function return address 140. This ensures that the security domain is restored to the domain which was being executed before the corresponding intermodal function call was made.

Also, at step 462 an indication is saved to record whether, prior to the intermodal function return, the TMID flag 34 was 0 or 1. This indication is separate from the TMIE flag 158 which is saved on exception entry. The location at which the indication of the previous value of TMID is stored can vary from embodiment to embodiment. For example, the indication could be saved to a general purpose register 16, or could be saved to a control register 20, such as the condition flags in a flags register which can be directly tested by subsequent conditional instructions.

Also, at step 462 the TMID value 34 in the control register 32 may be set to 0 to indicate that thread mode domain transitions are now enabled again. This ensures that regardless of whether a deprivileged section of exception handler code executed prior to the intermodal function return had attempted to switch security domains or not, on returning to more privileged wrapper code the domain transition disabling configuration value 34 can be in a consistent state.

Also, at step 462 on the intermodal function return the destination stack pointer from which the function return stack frame was loaded may be adjusted to account for the unstacked data having been removed from the stack. Also, the stack pointer selection value 30 for the destination domain is updated to indicate that the main stack pointer should be selected and the current mode of operation is switched to handler mode by restoring the exception number register 36 from the exception number field 179 in the function return stack frame 172 (previous integrity checks at step 458 may have checked that the exception number field 179 is non-zero, and therefore that restoring the exception number register 36 will switch the current mode to handler mode). At step 464 a branch to the real function return address 174 obtained from the function return stack frame 172 is carried out, so that the next instruction to be processed is the instruction at the function return address.

Hence, by using the dummy function return address 140 saved on calling a function (the main body of the ISR 201) to signal whether a subsequent function return should be an intermodal function return, this means that the instruction which triggers the function return itself does not need to be aware of whether it is switching modes or not, which means that legacy exception handler code written completely unaware of the support for intermodal function calls and returns can still be used. This is particularly useful for the interrupt deprivileging scenario described with respect to FIGS. 7 and 8 above. That is, the function return branch instruction may have the same encoding regardless of whether it is an intermodal branch or not.

Note that in FIGS. 14 and 15, the instruction which triggers a branch to a given target address could be any of a variety of instructions which cause the program counter register R15 to be modified to the branch target address. In some cases this may be a dedicated branch instruction, but it could also be a register move instruction which moves the branch target address into the program counter register, or a stack pop instruction which pops information from a stack data structure and loads it into the program counter register. Particularly in the case where the branch is to one of the dummy function return addresses 140 or dummy exception return addresses 142, which may end up being saved to a stack if a further function call is made before the corresponding function/exception return, it may be more efficient for a compiler to generate code which directly pops the return address from the stack frame into the program counter register, rather than first loading it into the link register and then executing a return branch specifying the link register. Hence, although a real function return address, dummy function return or dummy exception return address may initially be saved into the link register at the time of calling a function or taking an exception, by the time the corresponding return is executed it may no longer be in the link register, and it will be appreciated that the instruction which triggers the branch operations in FIGS. 14 and 15 may not actually be a dedicated branch instruction.

FIGS. 16A to 16D illustrate examples of possible attacks that can be prevented using the checks described above. These attacks may be based on a mismatching sequence of exception or function calls and returns, which may try to exploit mismatching stack frames set up by the call and expected on the return.

Figure 16A:
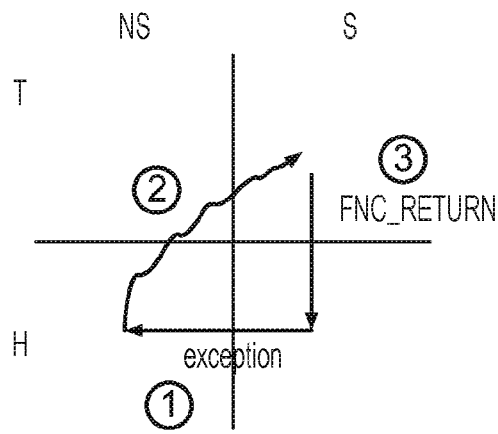
FIGS. 16A-16D illustrates potential attacks which can be detected using the integrity cross-checks shown in FIG. 15.

In the example of FIG. 16A an exception occurs at step 1 during processing in the secure handler mode and the exception is to be taken in the less secure domain and so both caller and callee stack frames 180, 182 are saved to the stack. At step 2 in FIG. 16A a series of exception returns and/or function calls are made which eventually result in processing being performed in the secure thread mode. Once in secure thread mode, at step 3 an attempt is made to perform an intermodal function return based on the exception stack frames 180, 182 set at step 1. For example, this could be done by branching to one of the dummy function return values 140. This type of attack can be detected because the integrity cross-checking at step 458 of FIG. 15 on the function return will detect that the function return address 174 is one of the reserved range of addresses 130 (as the predetermined signature 190 would be at the bottom of the exception stack frame loaded at step 3, rather than the expected function return stack frame 172).

Figure 16B:
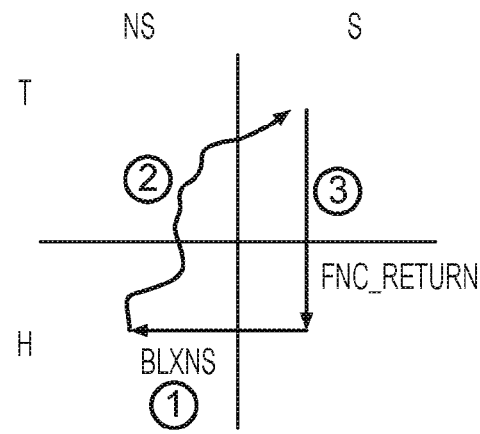

FIG. 16B shows a second example where an inter-domain function call is made at step 1 from the secure domain to the less secure domain, causing a function return stack frame 172 to be saved to the secure main stack. Again, at step 2 a series of other transitions is carried out and then at step 3 an intermodal function return is attempted based on the inter-domain stack frame set at step 1. This intermodal function return should not be allowed to succeed because the corresponding call was an inter-domain call not an intermodal call. This is detected because the HDT value 178 in the function return stack frame will be set to 0 on the inter-domain function call at step 1 and it should be 1 for an intermodal function return at step 3 and so the integrity cross-checks at step 458 of FIG. 15 will fail.

Figure 16C:
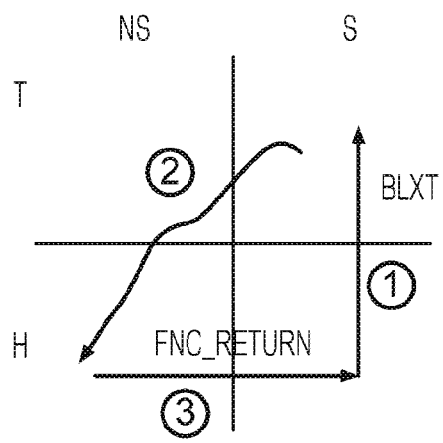

FIG. 16C illustrates another potential attack where first an intermodal function call is made at step 1 which deprivileges from handler mode to thread mode and then following a series of other transitions at step 2, later on an attempt to perform an inter-domain function return at step 3 is made to transition from the less secure domain to the secure domain, based on the intermodal function return stack frame set at step 1. At step 446 of FIG. 15 the integrity check of whether the HDT value 178 in the function return stack frame 172 is equal to 0 is performed, and if the HDT value is equal to 1 then a fault may be triggered. Hence in the scenario of FIG. 16C where an intermodal function call is made an inter-domain function return is attempted then the HDT check will detect the mismatch and ensure that the intermodal stack frame created at step 1 can't be interpreted as an inter-domain stack frame at step 3. Note that the HDT checks at steps 446 and 458 can be considered equivalent to a comparison between the intermodal flag M 146 in the dummy function return address and the HDT flag 178 in the function return stack frame, as any mismatch identified in this comparison will trigger a fault either in the case of the intermodal return (FIG. 16B) or in the case of the inter-domain return (FIG. 16C).

Referring still to FIG. 16C, instead of performing an inter-domain return (with intermodal flag M=0) at step 3, the attacker could have attempted an intermodal function return (with intermodal flag M=1). While the corresponding function call was indeed an intermodal call, it still does not match the attempted intermodal function return because the current mode before step 3 is handler mode not thread mode. In this case then while the intermodal call value 146 may match the HDT value 178 within the function return stack frame set on the intermodal call at step 1, the attack is prevented because an intermodal function return is not allowed when the current state is handler mode, which will be caught by the integrity check at step 458 of FIG. 15 which checks whether the current mode is thread mode.

Figure 16D:
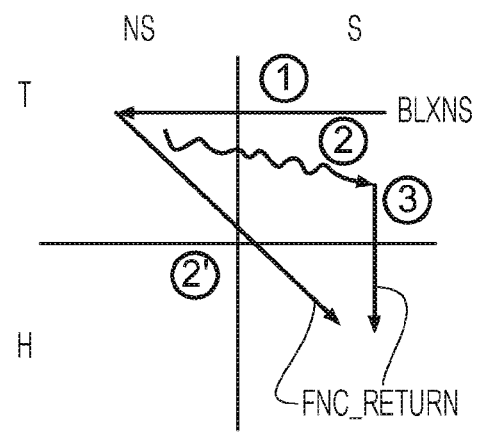

FIG. 16D shows another example in which an inter-domain stack frame is set up at step 1 due to an inter-domain branch instruction from secure to less secure domain and subsequently at step 2 a series of transitions are made to return to the secure domain and then at step 3 an attempt is made to perform an intermodal function return using the stack frame set by the inter-domain branch at step 1. This type of attack would not be able to succeed because the exception number field 179 in the function return stack frame 172 would indicate that the stack frame set at step 1 was set in the thread mode not the handler mode which the intermodal function return would be requesting entry to. Alternatively, if as shown in step 2' a combined transition of domain and mode from non-secure thread mode to secure handler mode was attempted then again this would fail because at step 450 the non-permitted combined transition would be prevented.

If will be appreciated that some of the checks may overlap and the same type of attack could trigger failure of more than one type of check. For some architecture implementations, if some of these checks are considered redundant then they may be removed from the architectural requirements and so it is not necessarily essential to perform all of the different types of attack prevention mechanisms depending on what is considered important to protect against. However, any one or more of these checks may be provided. It will be appreciated that the attacks shown in FIG. 16 are only a small selection of vast number of different combinations of similar mismatch type attacks where an attacker seeks to corrupt the state of the system by attempting a return operation (either function or exception return) that does not match the original transition and therefore the type of stack frame that was created.

Figure 17:
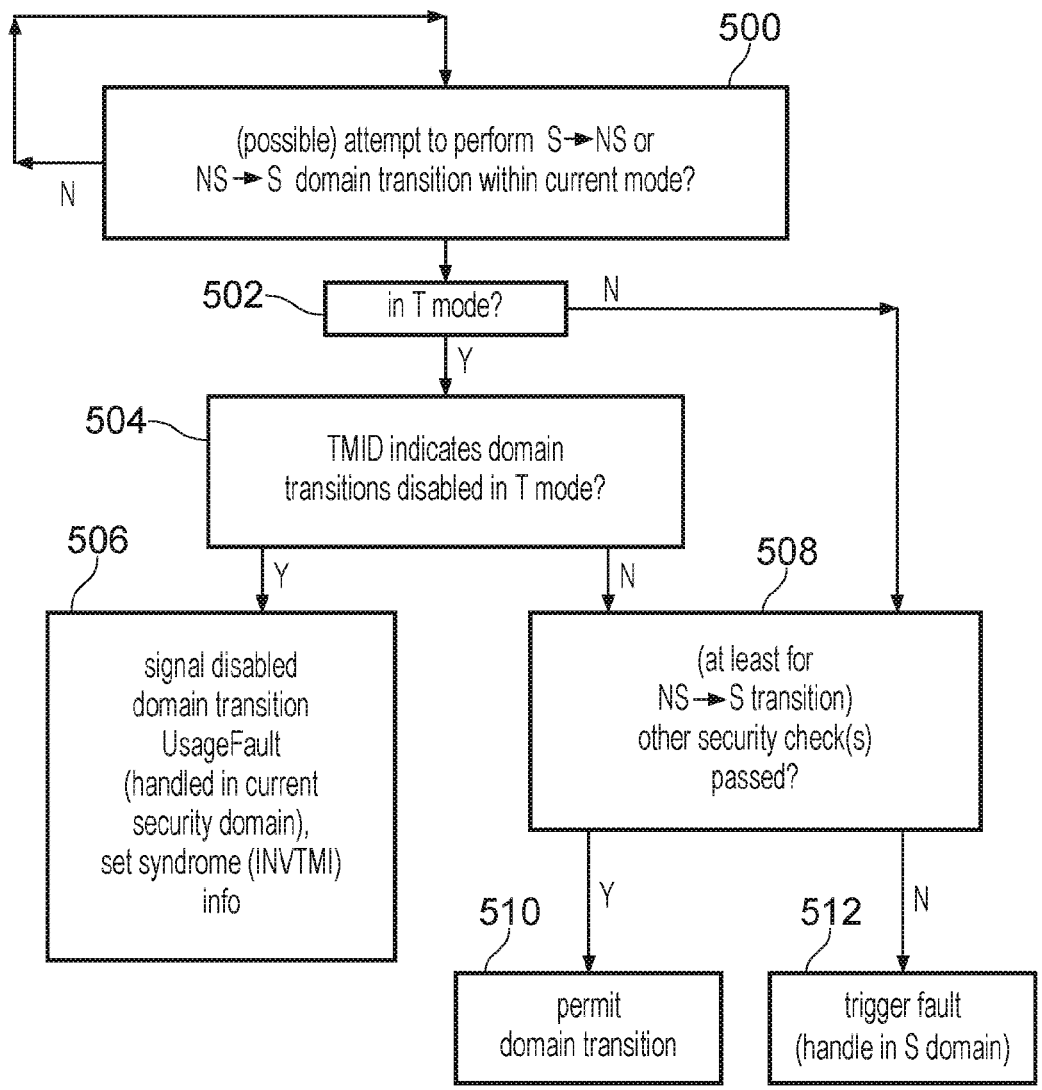
FIG. 17 is a flow diagram illustrating disabling of domain transitions in thread mode.

Steps 307, 406 and 442 in FIGS. 12, 14 and 15 show specific examples of checking the domain transition disable configuration parameter (TMID) 34 for a function calling branch, non-function calling branch and a function return respectively. However, in some architectures there may also be other valid means by which it is possible to trigger a transition between domains and FIG. 17 shows a more general approach to handling checks of the TMID value. At step 500 a possible attempt to perform either a secure to less secure domain transition within the current mode or a less secure to secure domain transition within the current mode is detected. The attempt may be an actual attempt to perform the domain transition or could merely be an operation which could sometimes trigger such a domain transition if other security or integrity checks are passed, but may not always trigger the domain transition, if the TMID checks are being performed sufficiently early that it cannot yet be detected whether the domain transition will actually be permitted, or whether another check will fail and a fault will be raised.

At step 502, if a possible attempt to trigger a domain transition is detected then it is determined whether the current mode is thread mode. If the current mode is thread mode then at step 504 the processing circuitry determines whether the TMID value 34 indicates that domain transitions are disabled in thread mode. If the current mode is thread mode and the domain transitions are disabled in thread mode, then at step 506 the disabled domain transition fault (e.g. the INVTMI UsageFault described above) is signalled. The fault is handled in the current security domain before the domain transition which was attempted is actioned so if the attempted domain transition is from secure to less secure then the fault is handled in the secure domain and if the attempted transition is from less secure to secure then it is handled in the less secure domain. Also, optionally some syndrome information can be stored to a control register indicating information about the attempted transition which was faulted. In some implementations, setting the syndrome information may comprise setting the INVTMI bit in a UsageFault status register (UFSR).

If either at step 502 it was determined that the current mode is handler mode or at step 504 it was detected that the TMID value 34 indicates that domain transitions are enabled in the thread mode, then the method proceeds to step 508 where, at least if the attempted transition is from the less secure domain to the secure domain, it is checked whether any other required security checks have been passed and if they are passed then at step 510 the transition is permitted. If no security checks were required (e.g. no checks may be needed for some types of secure to less secure domain transitions, because secure code may be trusted not to attack less secure code) then the transition can be permitted at step 510 without performing any security checks (i.e. step 508 could be omitted for such transitions). Alternatively if a security check was failed then at step 512 a fault may be triggered and this may be handled in the secure domain as it relates to the non-permitted entry or exit from the secure state. The type of fault triggered at step 512 and any syndrome that is set may depend on the type of security check that failed.

While FIG. 17 shows steps 502 and 504 being performed sequentially they could also be performed in the opposite order or in parallel in some examples.

Figure 18:
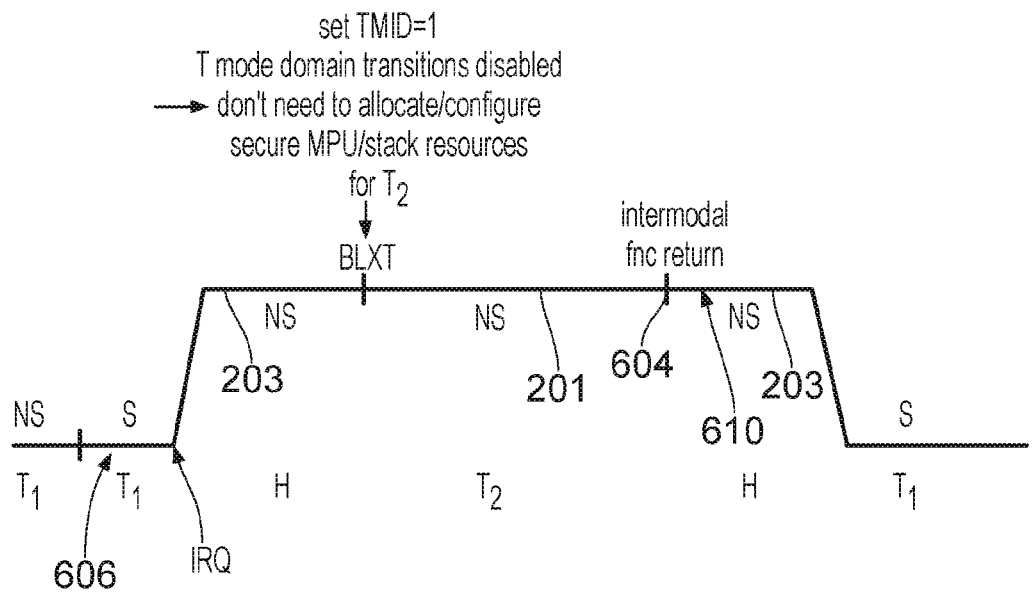
FIGS. 18-20 illustrate examples of using a domain transition disable configuration parameter.
Figure 19:
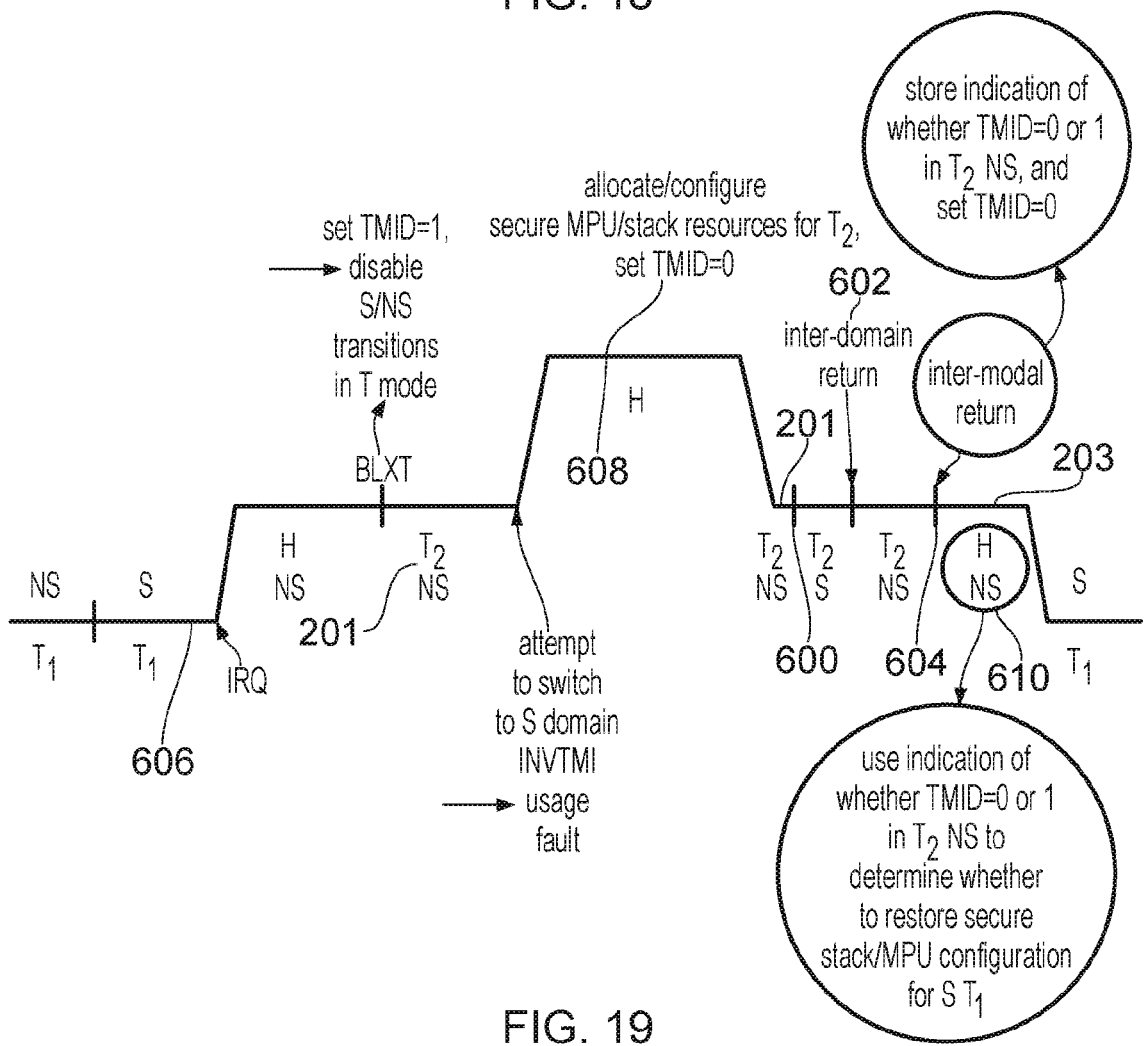
Figure 20:
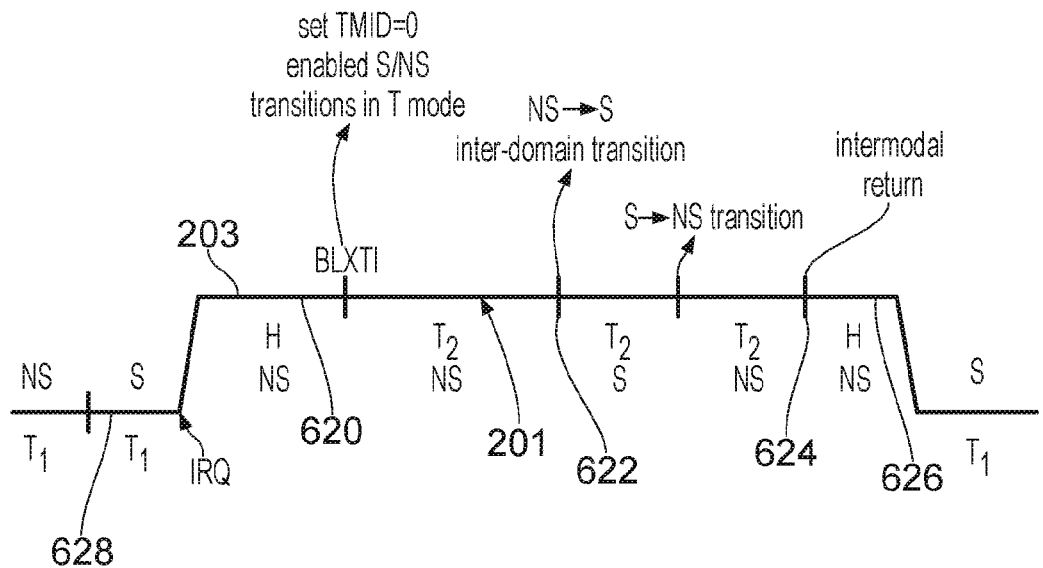

FIGS. 18 to 20 show some examples of use cases involving the TMID value 34. FIG. 18 essentially corresponds to the example of FIG. 8 involving intermodal calling so that an exception handler is deprivileged so that it includes a main body 201 processed in the thread mode. In this example the exception is a non-secure (also known as less secure) exception and so the exception handler processing including the wrapper 203 and the main body 201 is all in the non-secure domain. Any thread which crosses the secure/less secure domain boundary may need both secure resources and less secure resources to be established (such as the MPU configuration and the stack pointers of associated stack structures allocated in memory). For threads such as $T_2$ shown in FIG. 18 which operate only in one domain it may desirable to avoid allocating the resources for the other domain to avoid the waste of memory and increased context switching times. Hence, preferably the system could avoid the cost of allocating the extra resources for all threads regardless of whether the extra resources will be used. This ability to not configure both secure and less secure resources for all thread can also help improve interrupt latency for interrupts that need to be deprivileged back to thread mode as shown in FIG. 18 as it will mean that the wrapper code 203 does not need to take as long to execute, because it can omit configuring one of the secure and non-secure MPUs and one of the secure and non-secure stack pointers.

One approach to handle this could be that threads could be allocated with a stack and MPU configuration for a single security state (e.g. the less secure domain in the example of thread two in FIG. 18) and then only if that thread attempts to switch to the other security domain could be resources for the other domain be allocated. However, without the TMID parameter 34 the only way to enforce this and generate the fault required to trigger the lazy allocation would be to reconfigure the MPU 26 so that an address fault is generated on an attempt to access an address which the process does not have permission to access or for which region permission data has not been defined in the MPU 26. This would be a disadvantage because this would require MPU configurations to be handled per thread and not per process and also it would require considerably more secure/non-secure interaction as it would involve MPUs 26-S, 26-NS for both security domains, thus removing the advantages of being able to skip the MPU configuration operations for one of the security domains. For example, before running a secure thread the less secure operating system may need to reconfigure its less secure MPU 26-NS so that an attempt to branch to the less secure state raises a fault. Hence, using the MPU 26 to generate the fault can be difficult and performance intensive and harder to code for the different parties providing the secure and less secure operating system code. Alternatively, if it is known in advance which threads will only use one security domain and which will use both then this information can be used to avoid lazy allocation, however this cannot be relied on since it is possible that software could crash and attempt to access the other state, or an attacker may try to exploit this, so it may still be desirable to provide a mechanism to fault on detection of a transition to the other domain when resources have only been set up for one domain.

Instead, by providing the TMID parameter 34 which selectively disables domain transitions in the thread mode, this means that threads expected to only be in the less secure domain (as for $T_2$ in FIG. 18) can initially have its TMID parameter 34 set to disable the domain transitions, and then only if it does attempt to switch domains could the fault then be generated so that the appropriate resources can be configured.

Hence, FIG. 18 shows an example where the thread mode transitions are disabled on entry into the deprivileged exception handler body 201 (since the BLXT variant of the intermodal calling branch instruction is used to call into the exception handler body 201). In this case, the body 201 of the exception handler remains within the less secure domain and does not attempt to switch to the secure domain, so that by the time the main body 201 later does a function return to the wrapper code 203, no processing resource or memory allocation has been wasted in configuring MPU or stack resources for the secure domain for thread $T_2$. Hence this improves performance. When processing of the main body 201 is complete a branch to the intermodal dummy function return address 140 is performed at step 604. This triggers the return to handler mode and in some implementations may cause an indication of the TMID flag 34 in the control register 32 to be saved (for example to a general purpose register) before it is cleared as described in step 462 of FIG. 15. Program flow then continues back to the wrapper 203 where the wrapper checks the saved indication of the TMID flag 34 and determines that prior to the intermodal function return at step 604 TMID flag 34 was 1. Thus the wrapper 203 determines that the resources associated with the secure state are still configured for the background thread $T_2$, and that these resources do not need to be reconfigured before performing an exception return to return to the background processing of $T_2$.

FIG. 19 shows a similar scenario, but in this case after calling the deprivileged exception handler body 201 using the BLXT instruction and hence disabling the inter-domain transitions while in thread mode, this time the body does attempt a switch to the secure domain and this triggers a usage fault as described earlier. This fault causes an exception which is then handled by handler code 608 in the handler mode, which can then request allocation or configuration of the resources for thread $T_2$ in the secure MPU 26-S and the secure stack pointer registers, before then returning to the exception handler body 201 which can then reattempt the less secure to secure domain transition at point 600 of FIG. 19 (the gap between the point at which processing returns to non-secure $T_2$ and the inter-domain transition 600 is exaggerated in FIG. 19 for clarity—it will be appreciated that the inter-domain transition 600 may actually occur on the very first instruction after the return to $T_2$). After finishing the section of processing required to be in the secure domain, an interdomain return may be performed at point 602 and then subsequent processing is the same as in FIG. 18.

FIG. 19 illustrates a scenario where, on performing an intermodal return at part 604 of FIG. 19, to transition back from the deprivileged exception handler body 201 to the wrapper code 203, an indication is stored to indicate whether prior to that intermodal return the TMID value 34 was 0 or 1 for the non-secure processing in thread mode carried out for thread $T_2$. This is done before clearing the TMID flag on the intermodal return to re-enable domain transitions for the wrapper code 203. As explained above at step 462 of FIG. 15, this indication of whether TMID 34 was zero or one prior to step 604 of FIG. 19 can be saved to any convenient location, such as one of the control registers, a general purpose register or condition codes. This is useful because it allows the subsequent code at 610 to distinguish the situation shown in FIG. 18 from the one shown in FIG. 19 once processing has returned to the non-secure wrapper code 203 to be processed in handler mode. As in the scenario shown in FIG. 18 there has been no processing in the secure domain, any secure stack pointers and MPU configuration may still be as previously set at point 606 during previous processing of background code in the secure domain. In contrast, in FIG. 19 the entry into the secure domain for thread $T_2$ attempted at step 601 (which subsequently succeeded when retried at step 600) means that the configuration of MPU/stack resource for thread $T_2$ at point 608 of FIG. 19 will have changed the relevant MPU contents and stack pointer registers for thread mode. Hence, the remaining wrapper code 203 executed at part 610 of FIGS. 18 and 19 may need to determine whether it is necessary, before returning processing to the secure portion of thread $T_1$, to update the secure stack pointers and secure MPU configuration to restore the information which was present at part 606. The indication of whether TMID equalled zero or one prior to step 604 at the intermodal function return can be used to make this decision.

In other implementations, it is not essential for the indication of whether the domain transitions were disabled or enabled in thread mode prior to an intermodal return to be saved, and in this case then at step 610 of FIGS. 18 and 19 the wrapper code 203 could simply always perform the operations for restoring the secure resources that were present at step 606. However, the example shown in FIG. 19 which saves the indication of whether thread mode interstating was disabled or not can be better for performance by avoiding redundant stack pointer updates operations if not required.

For comparison, FIG. 20 shows another scenario where, when the IRQ exception handler is deprivileged, this time it is expected that the exception handler will use both secure and less secure domains and so during the wrapper code 203 executed at point 620 the appropriate operations to configure the secure and less secure resources for both domains are performed and the main body 201 of the exception handler to be executed in a deprivileged state in thread mode is called with the BLXTI variant of the intermodal function calling branch, instead of BLXT as in FIGS. 18 and 19. Therefore, this time on performing the intermodal function call from handler mode to thread mode, the TMID value 34 is set to 0 to indicate that domain transitions are enabled in thread mode and so this time at step 622 when the interrupt handler body attempts to transition to the secure domain this is permitted and no fault is needed as in the example of FIG. 19. Again, saving an indication at intermodal function return 64 that TMID was 0 prior to the intermodal return can be used by the wrapper code 203 executed at 626 to determine that it would be necessary to restore secure side stack pointers or MPU configuration associated with thread T1 to the state they were in at point 628 before the interrupt occurred. In some implementations of the wrapper code, the wrapper code 203 may not check the indication of the TMID flag that was saved during the intermodal function return in the example of FIG. 20, as since the wrapper performed the configuration of both domains prior to executing the main body 201, the wrapper will know in advance that the resources for both domains need to be restored before returning to the background thread $T_1$. Although this may appear to be a simpler approach than redundantly checking the indication of TMID that was saved during the intermodal function return, it may mean that it is more difficult to share code between different wrappers for different exception handlers. So both approaches may be useful.

Figure 21:
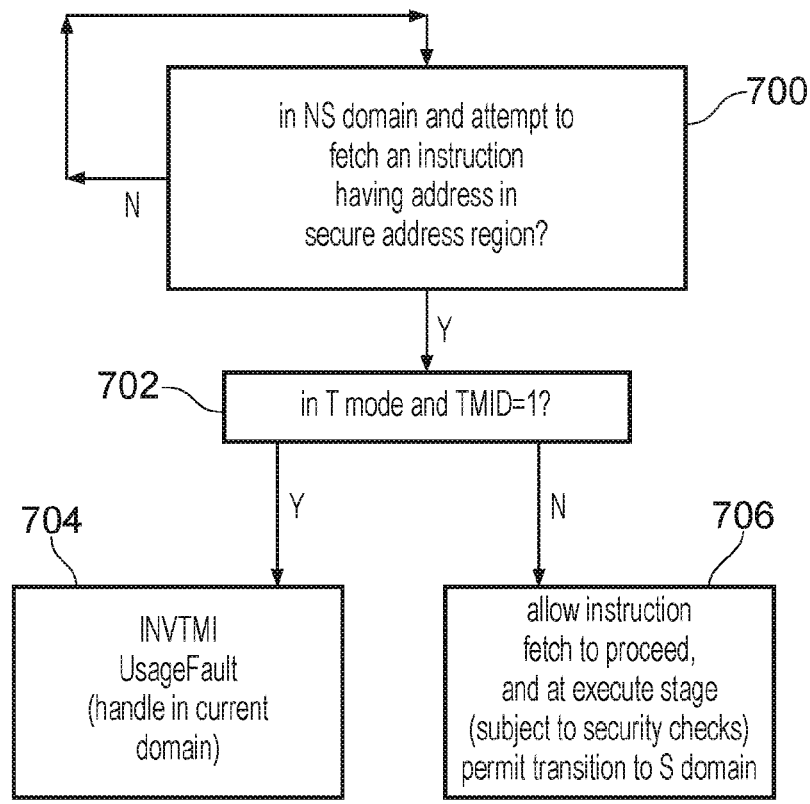
FIG. 21 is a flow diagram illustrating checking of the domain transition disable configuration parameter on fetching of an instruction having an address in a secure address region.

FIG. 21 shows another example of a more specific scenario in which it can be useful to check the TMID value 34 on an attempt to switch domains. This is another specific example falling within the generic approach in FIG. 17. Another way in which a domain transition may arise is when, in the less secure domain, there is an attempt to fetch an instruction from an address in one of the secure address regions defined by the SAU 24. At step 700 the instruction fetch circuitry 8 determines whether the current domain is the less secure domain and there has been an attempt to fetch an instruction having an address in one of the secure regions as defined by the SAU 24. If not, then instruction fetching continues as normal. If the current domain is the less secure domain and the instruction is attempted to be fetched from a secure address region then at step 702 it is checked whether the current mode is the thread mode and the interstating disabled flag (TMID 34) indicates that domain transitions in thread mode are disabled, and if so then at step 704 the INVTMI UsageFault is triggered to prevent the domain transition taking place. This fault is handled in the current domain, i.e. the less secure domain. Note that it is possible that the instruction fetched from the secure address region might not actually have triggered a domain transition, but nevertheless the fault is generated conservatively assuming that a transition could arise if subsequent security checks passed. By generating the fault at the fetch stage 8 this ensures that the UsageFault triggered by the disabled domain transition is evaluated relatively early compared to other types of security checks that may need to be performed, so that those other security checks do not fail merely because secure resources have not been configured yet.

On the other hand, if at step 702 it is determined at the fetch stage 8 that the current mode is handler mode or that TMID 34 indicates that thread mode domain transitions are enabled, then at step 706 the instruction fetch is allowed to proceed. If the instruction fetched from the secure address region is identified at the decode stage 10 as being an instruction that triggers a change of domain (e.g. a secure gateway instruction which marks the valid entry point to the secure domain) then once the instruction reaches the execute stage 12 it is subject to any additional security checks and if these checks are passed then the transition to the secure domain is permitted.

Hence, FIG. 21 is an example where the checking of the TMID value 34 does not necessarily happen at the execute stage 12 but could be performed on the instruction fetching.

Figure 22:
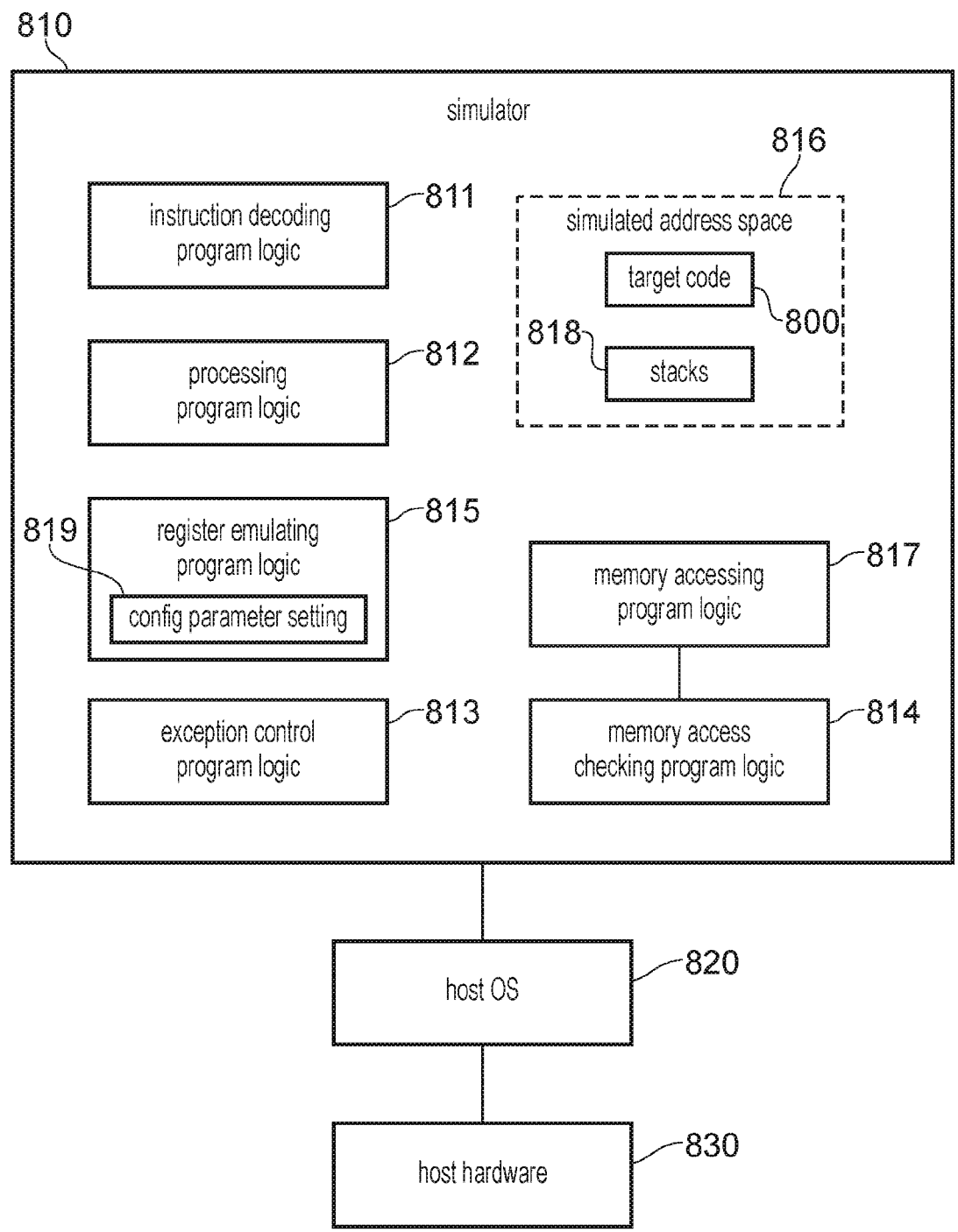
FIG. 22 illustrates a simulator example that may be used.

FIG. 22 illustrates a simulator implementation that may be used. While the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 830, optionally running a host operating system 820, supporting the simulator program 810. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 830), some simulated embodiments may make use of the host hardware, where suitable.

The simulator program 810 may be stored on a computer-readable storage medium (which may be a non-transitory medium), and provides a program interface (instruction execution environment) to the target code 800 (which may include applications, operating systems and a hypervisor) which is the same as the application program interface of the hardware architecture being modelled by the simulator program 810. Thus, the program instructions of the target code 800, including intermodal calling branch instructions as described above, may be executed from within the instruction execution environment using the simulator program 810, so that a host computer 830 which does not actually have the hardware features of the apparatus 2 discussed above can emulate these features.

As shown in FIG. 22, the simulator program 810 includes instruction decoding program logic 811, processing program logic 812, exception control program logic 813 and memory access checking program logic 814 which perform equivalent functionality to the instruction decoder 10, execute stage 12, exception control circuitry 28 and memory access checking circuitry 22 described above. The instruction decoding program logic 811 decodes the instructions of the target code 800 and, depending on the encoded instruction type, selects one of a number of program code sequences in the processing program logic 812 which control the host hardware 830 to perform the equivalent operations to those defined in the simulated instruction set architecture for the decoded instruction of the target code 800. If simulated exceptions arise, the exception control program logic 813 controls exception handling in a similar way to the exception control circuitry 28 described above. The simulator program 810 also includes register emulating program logic 815 which maps register references required by instructions of the target code 800 to equivalent memory accesses to a host memory address space used by the host apparatus, so that data structures can be maintained in the host memory address space which correspond to the contents of registers 14 of the target data processing apparatus being simulated by the simulator program. Similarly, memory accessing program logic 817 maps memory accesses and instruction fetches required by the target code 800, which are defined using addresses from a simulated address space 816, onto the host memory address space used by the host data processing hardware 830. For example, the memory accessing program logic 817 may control access to stack data structures 818 which are actually stored in the host memory address space, but from the point of view of the target code 800 appear to be stored in a simulated address space 816.

Hence, the control registers emulated by the register emulating program logic 815 may include the TMID flag 34 described above, and the processing program logic 812 may simulate whether inter-domain transitions in thread mode are permitted based on the TMID flag 34. The register emulating program logic 815 may include configuration parameter setting program logic 819 which sets the TMID flag 34 in response to events such as the execution of intermodal function calls and returns, exception entry or return, or other instructions for writing to the TMID flag 34. Also, the instruction decoding program logic 811 may respond to an intermodal calling branch instruction to switch the current mode of the simulated processor represented by the processing program logic 812 from handler mode to thread mode, as described above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry configured to perform data processing in one of a plurality of security domains including at least a secure domain and a less secure domain;
memory access checking circuitry configured to check whether a memory access is allowed depending on a current security domain of the processing circuitry; and
a control storage location configured to store a domain transition disable configuration parameter specifying whether domain transitions between the secure domain and the less secure domain are enabled or disabled in at least one mode of the processing circuitry; in which:
in said at least one mode of the processing circuitry, when the domain transition disable configuration parameter specifies that said domain transitions are disabled in said at least one mode, the processing circuitry is configured to:
trigger signalling of a disabled domain transition fault in response to an attempt to transition from the secure domain to the less secure domain; and,
trigger signalling of the disabled domain transition fault in response to an attempt to transition from the less secure domain to the secure domain.

2. The apparatus according to claim 1, in which:
in the secure domain the processing circuitry is configured to control access to memory using information stored in at least one secure configuration register; and,
in the less secure domain the processing circuitry is configured to control access to memory using information stored in at least one less secure configuration register.

3. The apparatus according to claim 1, comprising a plurality of stack pointer registers to store stack pointers for pointing to stack data structures, including at least one stack pointer register associated with the secure domain and at least one stack pointer register associated the less secure domain.

4. The apparatus according to claim 1, in which in response to an attempt to perform at least one type of transition from the less secure domain to the secure domain in said at least one mode, the processing circuitry is configured to perform disabled domain transition checking using the domain transition disable configuration parameter to determine whether to trigger signalling of said disabled domain transition fault, before performing at least one other security check to determine whether the attempt to transition from the less domain to the secure domain is allowed.

5. The apparatus according to claim 1, in which the processing circuitry is configured to perform the data processing in one of a privileged state and a less privileged state; and,
when the processing circuitry is in the privileged state, the domain transition disable configuration parameter is modifiable in both the secure domain and the less secure domain.

6. The apparatus according to claim 1, in which the processing circuitry has a thread mode and a handler mode;
in response to an exception condition, exception control circuitry is configured to control the processing circuitry is configured to switch to processing of an exception handler in the handler mode; and,
said at least one mode of the processing circuitry comprises the thread mode.

7. The apparatus according to claim 6, in which:
in the handler mode, the processing circuitry is configured to determine whether said domain transitions are permitted independent of the domain transition disable configuration parameter.

8. The apparatus according to claim 6, in which:
in response to an intermodal calling branch instruction specifying a branch target address, at least when the processing circuitry is in the handler mode, an instruction decoder is configured to control the processing circuitry to:
save a function return address to a function return address storage location; switch a current mode of the processing circuitry to the thread mode;
set the domain transition disable configuration parameter to specify whether said domain transitions are enabled or disabled in said at least one mode; and
branch to an instruction identified by the branch target address.

9. The apparatus according to claim 8, in which:
in response to a first variant of the intermodal calling branch instruction, the instruction decoder is configured to control the processing circuitry to set the domain transition disable configuration parameter to specify that said domain transitions are disabled in said at least one mode; and,
in response to a second variant of the intermodal calling branch instruction, the instruction decoder is configured to control the processing circuitry to set the domain transition disable configuration parameter to specify that said domain transitions are enabled in said at least one mode.

10. The apparatus according to claim 6, in which:
in response to an intermodal function return instruction, the processing circuitry is configured to:
switch the current mode of the processing circuitry to the handler mode;
update the domain transition disable configuration parameter; and,
branch to an instruction identified by a function return address.

11. The apparatus according to claim 10, in which:
in response to said intermodal function return instruction the processing circuitry is configured to set the domain transition disable configuration parameter to specify that said domain transitions are enabled in said at least one mode.

12. The apparatus according to claim 10, in which in response to the intermodal function return instruction, the processing circuitry is configured to record an indication of whether, prior to the intermodal function return instruction, the domain transition disable configuration parameter specified that said domain transitions were enabled or disabled in said at least one mode.

13. The apparatus according to claim 1, in which, when the disabled domain transition fault is signalled in response to an attempt to transition from a first security domain to a second security domain, when the processing circuitry is in said at least one mode, exception control circuitry is configured to control the processing circuitry to process an exception handler in the first security domain.

14. The apparatus according to claim 1, in which exception control circuitry is responsive to an exception condition to update the domain transition disable configuration parameter to specify that said domain transitions are enabled in said at least one mode.

15. The apparatus according to claim 1, in which exception control circuitry is responsive to an exception condition to perform state saving to save architectural state associated with processing performed before the exception condition occurred, and the architectural state saved in the state saving includes a value indicative of the domain transition disable configuration parameter prior to the exception condition.

16. The apparatus according to claim 15, in which, in the state saving, the exception control circuitry is configured to save to a stack data structure a first stack frame including an exception return address and a first subset of architectural state, and to save the value indicative of the domain transition disable configuration parameter to a predetermined register accessible to an exception handler to be executed in response to the exception condition.

17. The apparatus according to claim 16, in which:
at least in response to an exception condition triggering a transition from the secure domain to the less secure domain, the exception control circuitry is configured to save to the stack data structure the first stack frame and a second stack frame including a second subset of architectural state and cross-checking information for checking the domain transition disable configuration parameter; and,
at least on an exception return transition from the less secure domain to the secure domain, the exception control circuitry is configured to trigger signalling of a fault when a mismatch is detected between the value indicative of the domain transition disable configuration parameter and the cross-checking information in the second stack frame.

18. The apparatus according to claim 1, in which:
in response to an inter-domain calling branch instruction requesting a transition from the secure domain to the less secure domain, an instruction decoder is configured to control the processing circuitry to perform an inter-domain calling branch operation comprising:
saving a function return address to a function return address storage location;
switching the processing circuitry to the less secure domain; and,
branching to an instruction identified by a branch target address specified by the inter-domain calling branch instruction.

19. The apparatus according to claim 18, in which in response to the inter-domain calling branch instruction, the instruction decoder is configured to control the processing circuitry to:
when the domain transition disable configuration parameter specifies that said domain transitions are enabled in said at least one mode or the processing circuitry is in a mode other than said at least one mode, perform said inter-domain calling branch operation; and,
when the processing circuitry is in said at least one mode and the domain transition disable configuration parameter specifies that said domain transitions are disabled in said at least one mode, trigger signalling of the disabled domain transition fault.

20. The apparatus according to claim 1, in which:
in response to an inter-domain calling branch instruction requesting a transition from the secure domain to the less secure domain, an instruction decoder is configured to control the processing circuitry to save a function return address to a stack data structure and to save a dummy function return address to a link register;
in response to an attempt to branch to the dummy function return address when the dummy function return address indicates an inter-domain function return, the processing circuitry is configured to control the processing circuitry to trigger signalling of the disabled domain transition fault when the processing circuitry is in said at least one mode and the domain transition disable configuration parameter specifies that said domain transitions are disabled in said at least one mode.

21. The apparatus according to claim 1, in which:
the memory access checking circuitry is configured to maintain security attribute data indicative of whether respective address regions are secure address regions or less secure address regions;
the apparatus comprises instruction fetch circuitry to fetch an instruction from a cache or memory for decoding by the instruction decoder; and,
in response to an attempt to fetch an instruction having an address in a secure address region, when the processing circuitry is in the less secure domain, the processing circuitry is in said at least one mode, and the domain transition disable configuration parameter specifies that said domain transitions are disabled in said at least one mode, the instruction fetch circuitry is configured to trigger signalling of the disabled domain transition fault.

22. The apparatus according to claim 1, in which triggering signalling of the disabled domain transition fault comprises setting a syndrome flag indicative of a disabled domain transition fault.

23. A data processing method, comprising:
performing data processing using an apparatus comprising processing circuitry to perform data processing in one of a plurality of security domains including at least a secure domain and a less secure domain, and memory access checking circuitry to check whether a memory access is allowed depending on a current security domain of the processing circuitry;
storing, in a control storage location, a domain transition disable configuration parameter specifying whether domain transitions between the secure domain and the less secure domain are enabled or disabled in at least one mode of the processing circuitry; and,
in said at least one mode of the processing circuitry, in response to an attempt a domain transition between the secure domain and the less secure domain, when the domain transition disable configuration parameter specifies that said domain transitions are disabled in said at least one mode, triggering signalling of a disabled domain transition fault regardless of whether the domain transition attempted is from the secure domain to the less secure domain or from the less secure domain to the secure domain.

24. A non-transitory, computer-readable storage medium storing computer program for controlling a host data processing apparatus to provide an instruction execution environment for execution of instructions; the computer program comprising:
processing program logic to perform data processing in one of a plurality of security domains including at least a secure domain and a less secure domain;
memory access checking program logic to check whether a memory access is allowed depending on a current security domain of the processing program logic; and, configuration parameter setting program logic to set, in a control storage location, a domain transition disable configuration parameter specifying whether domain transitions between the secure domain and the less secure domain are enabled or disabled in at least one mode of the processing program logic; in which:

in said at least one mode of the processing program logic, when the domain transition disable configuration parameter specifies that said domain transitions are disabled in the at least one mode, the processing program logic is configured to:

trigger signalling of a disabled domain transition fault in response to an attempt to transition from the secure domain to the less secure domain; and, trigger signalling of the disabled domain transition fault in response to an attempt to transition from the less secure domain to the secure domain.

\* \* \* \* \*